(12) United States Patent
Leichsenring et al.

(10) Patent No.: US 8,437,603 B2
(45) Date of Patent: May 7, 2013

(54) RECORDING MEDIUM, REPRODUCTION DEVICE, INTEGRATED CIRCUIT, REPRODUCTION METHOD, AND PROGRAM

(75) Inventors: Germano Leichsenring, Osaka (JP); Hidetaka Oto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/121,507

(22) PCT Filed: May 19, 2010

(86) PCT No.: PCT/JP2010/003372
§ 371 (c)(1),
(2), (4) Date: Jun. 17, 2011

(87) PCT Pub. No.: WO2010/137261
PCT Pub. Date: Dec. 2, 2010

(65) Prior Publication Data
US 2011/0235988 A1 Sep. 29, 2011

(30) Foreign Application Priority Data
May 25, 2009 (JP) .................................. 2009-125275

(51) Int. Cl.
*H04N 5/775* (2006.01)
(52) U.S. Cl.
USPC ........................................................ 386/230
(58) Field of Classification Search .................. None
See application file for complete search history.

(56) References Cited

U.S. PATENT DOCUMENTS 5,956,452 A * 9/1999 Oketa et al. .................... 386/200
6,925,250 B1 8/2005 Oshima et al.
7,616,864 B2 11/2009 Tanaka et al.
2002/0118275 A1 8/2002 Harman
2002/0191113 A1* 12/2002 Siefken ......................... 348/700
2005/0024535 A1* 2/2005 Tatemori et al. .............. 348/445
2007/0086727 A1 4/2007 Tanaka et al.
2008/0036854 A1 2/2008 Elliott et al.
(Continued)

FOREIGN PATENT DOCUMENTS

| JP | 11-191895 | 7/1999 |
| JP | 2008-507795 | 3/2008 |
| JP | 2008-199415 | 8/2008 |
| WO | 2005/119675 | 12/2005 |
| WO | 2006/009305 | 1/2006 |

OTHER PUBLICATIONS

Office Action in Japanese Patent Application No. 2011-515867, mailing date of Jul. 5, 2011.

(Continued)

*Primary Examiner* — Thai Tran
*Assistant Examiner* — Sunghyoun Park
(74) *Attorney, Agent, or Firm* — Greenblum & Bernstein, P.L.C.

(57) ABSTRACT

A recording medium 100 on which an index table, an operation mode object, and byte-code applications are recorded. The index table shows correspondence between one or more titles and one or more operation mode objects. The operation mode object includes an application management table and display rate initialization information. The application management table indicates a byte-code application to be started to a playback device when a title corresponding to the operation mode object is selected as a current title. The display rate initialization information indicates how to initialize a display rate of a display device connected to the playback device when the title corresponding to the operation mode object is selected as the current title.

3 Claims, 32 Drawing Sheets

U.S. PATENT DOCUMENTS

| | | |
|---|---|---|
| 2008/0145031 A1 | 6/2008 | Tanaka et al. |
| 2009/0142041 A1* | 6/2009 | Nagasawa et al. ............ 386/124 |
| 2009/0324202 A1 | 12/2009 | Okubo et al. |
| 2010/0014580 A1 | 1/2010 | Tanaka et al. |
| 2010/0021145 A1 | 1/2010 | Oashi et al. |
| 2010/0142930 A1 | 6/2010 | Tanaka et al. |
| 2010/0303437 A1 | 12/2010 | Leichsenring et al. |

OTHER PUBLICATIONS

International Search Report in PCT/JP2010/003372, dated Aug. 24, 2010.

Lenny Lipton, "Foundations of the Stereoscopic Cinema: A Study in Depth", Van Nostrand Reinhold Co. pp. 68-69 and 260-262 (1982).

* cited by examiner

Switch between display rates

FIG. 16
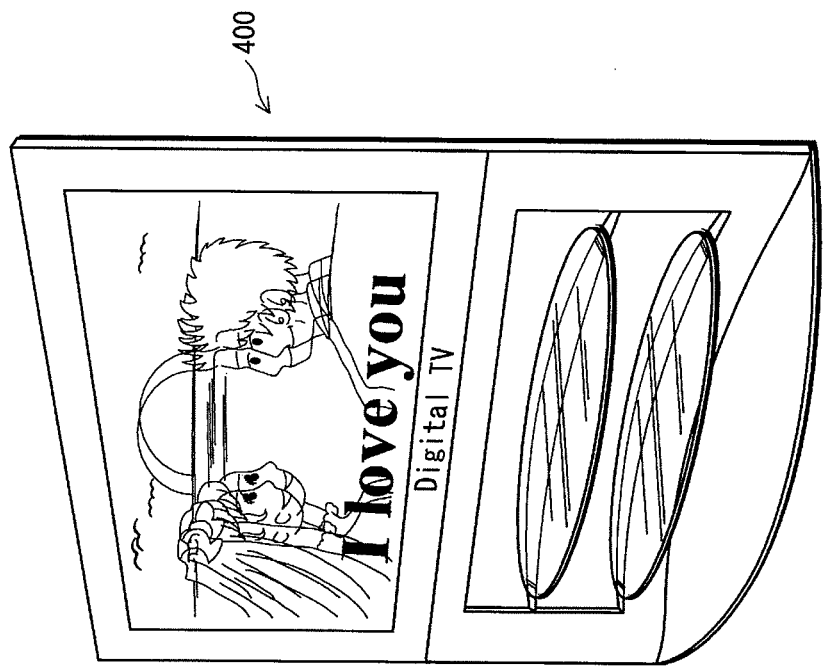
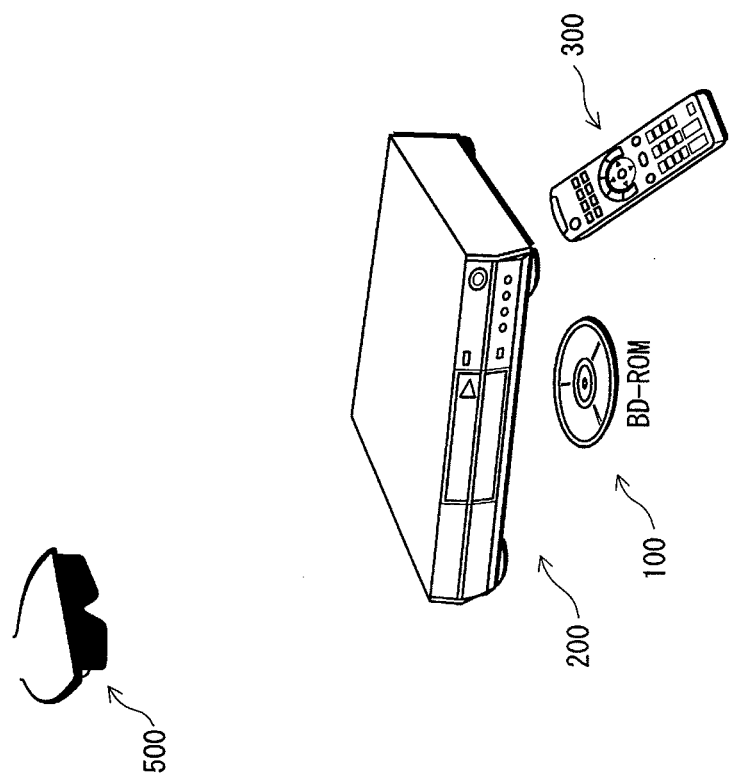

FIG. 27

| Overlay parameters | Available values |
|---|---|
| Overlay resolution | 1920x1080/23.976p / 1280x720/59.94p / 720x480/59.94i |
| Display mode | 3D display mode/2D display mode |
| Interactive graphics plane overlay mode | Stereo mode ON/stereo mode OFF |
| Interactive graphics plane overlay offset | Integer |
| Background plane overlay mode | Stereo mode ON/stereo mode OFF |
| Video plane overlay mode | Stereo mode ON/stereo mode OFF |

FIG. 28

| Overlay info | Available values | Meaning |
|---|---|---|
| Overlay resolution | 0 | 1920x1080 |
| | 1 | 1280x720 |
| | 2 | 720x480 |
| Overlay frequency | 0 | Arbitrary |
| | 1 | 23.976p |
| | 2 | 59.94p |
| | 3 | 59.94i |
| Display mode | 0 | Maintain previous state |
| | 1 | 2D display mode |
| | 2 | 3D display mode |
| Interactive graphics plane overlay mode | 0 | Maintain previous state |
| | 1 | Stereo mode OFF |
| | 2 | Stereo mode ON |
| Interactive graphics plane overlay offset | Integer | 0: maintain previous state<br>1-127: Offset + 64 |
| Background plane overlay mode | 0 | Maintain previous state |
| | 1 | Stereo mode OFF |
| | 2 | Stereo mode ON |
| Video plane overlay mode | 0 | Maintain previous state |
| | 1 | Stereo mode OFF |
| | 2 | Stereo mode ON |

FIG. 30

| Mode number | Overlay resolution | Overlay frequency | Display mode |
|---|---|---|---|
| 1 | 1920x1080 | 23.976p | 2D display/3D display |
| 2 | 1920x1080 | 59.94p | (Prohibited) |
| 3 | 1920x1080 | 59.94i | 2D display/3D display |
| 4 | 1280x720 | 23.976p | 2D display/3D display |
| 5 | 1280x720 | 59.94p | 2D display/3D display |
| 6 | 1280x720 | 59.94i | (Prohibited) |
| 7 | 720x480 | 23.976p | (Prohibited) |
| 8 | 720x480 | 59.94p | (Prohibited) |
| 9 | 720x480 | 59.94i | 2D display | though the stereoscopic display can be realized by various methods, the basic principle is to cause the left eye and right eye of a viewer to see different display images so that a pseudo stereoscopic image is created by the parallax between the eyes.

RECORDING MEDIUM, REPRODUCTION DEVICE, INTEGRATED CIRCUIT, REPRODUCTION METHOD, AND PROGRAM

TECHNICAL FIELD

The present invention belongs to a technical field of stereoscopic playback.

BACKGROUND ART

Stereoscopic playback is a technology for realizing a stereoscopic viewing by preparing images for two or more view points. Although the stereoscopic display can be realized by various methods, the basic principle is to cause the left eye and right eye of a viewer to see different display images so that a pseudo stereoscopic image is created by the parallax between the eyes.

For example, one stereoscopic display method uses shutter glasses. In this method, respective display images for the left and right eyes are updated at a high speed. The shutter glasses are controlled to block views of the left and right eyes alternately in synchronization with the update timings. With this arrangement, the images for the left eye are viewed only by the left eye, and the images for the right eye are viewed only by the right eye.

Currently, a mainstream playback of a stereoscopic video stream is in the movie theaters, but in the future, the playback of a stereoscopic video stream on a home playback device will become popular as well.

Especially, package media, which are recording media for over-the-counter sales of movies or the like, contain not only video images but also background images, subtitles, and drawing images on respective separate planes, and display devices can display an image in which they are all superimposed. Thus by presenting each of the background images, subtitles, and drawing images stereoscopically, it is possible to realize a highly interactive stereoscopic playback. Of these, the video images and subtitles are displayed clearly without flickering since they are played back in synchronization with the image output signals of the playback device in units of frames.

Accordingly, when a video stream in a package medium is to be played back stereoscopically, it is necessary for the video stream to have been encoded at a rate of, for example, 120 frames per second. Other methods for providing the stereoscopic effect include realizing the stereoscopic viewing by the "side-by-side" method recited in Patent Literature 1 identified below.

Also, Patent Literature 2 identified below discloses a method using a checkered pattern.

Furthermore, Patent Literature 3 discloses a technology for displaying the screen stereoscopically in which a 3D image is created by extracting the number of objects from 2D images, creating as many layers as the extracted number of objects, and changing the depth of each layer.

[Citation List]
[Patent Literature]
[Patent Literature 1]
PCT International Publication No. WO2005/119675 Pamphlet.
[Patent Literature 2]
U.S. Patent Application Publication No. 2008/0036854 Specification.
[Patent Literature 3]
U.S. Patent Application Publication No. 2002/0118275 Specification.
[Non-Patent Literature]
[Non-Patent Literature 1]
"Foundations of the stereoscopic cinema". Lenny Lipton.

SUMMARY OF INVENTION

Technical Problem

Meanwhile, in the stereoscopic playback, generally the playback device is connected with the display device of a TV system, and picture data to be viewed by the left eye and right eye are transmitted in a non-compressed state from the playback device to the display device for the picture data to be displayed. In a transmission system in which the picture data to be displayed is transmitted to the display device in a non-compressed state, a change of display rate is treated as a "re-connection of cables". The reasons are as follows. In such a transmission system, the picture data to be displayed in each frame period of the display device needs to be transmitted in a non-compressed state to the display device from the playback device connected thereto.

The picture data in a non-compressed state is composed of an enormous number of pieces of pixel data, such as 1920×1080 or 1280×720, and basically, such a number of pieces of pixel data need to be transmitted to the remote display device before the horizontal display period of each frame is reached. In the circumstances, when the display rate is changed, the transmission deadline is changed, wherein the transmission deadline is a time by which a block of pixel data constituting a picture should be transmitted to the remote display device. Thus the change in the display rate of the connected display device directly affects and changes the transmission rate that should be ensured on the transmission path. A change in the transmission rate causes a "re-connection of cables".

A display interruption is caused by the "re-connection of cables". Other than this, in conventional playback devices, a display interruption occurs during an execution of the application signaling that is caused when switching between titles is performed. That is to say, in conventional playback devices, the interruption occurs once when the title is switched, and the interruption due to the "re-connection of cables" occurs at least once during the playback of the title. Thus the playback interruption necessarily occurs twice or more. Such a high incidence of interruption is uncomfortable for the user who, wearing the glasses, is going to participate in the virtual reality.

To prevent the interruption due to the "re-connection of cables" from occurring, what is called upconversion technology may be applied. With the upconversion, the display rate of the playlist is converted to a predetermined display rate, and then picture data in the non-compressed plain text format is transmitted to the display device. For example, suppose a recording medium to be played back stores a playlist with 1280×720/50p and a playlist with 1280×720/59.94p. When the two playlists are converted into a same format, for example, 1920×1080/59.94p, and then output to the display device, the above-mentioned problem of a high incidence of black out period is solved. However, to perform the upconversion, an enormous amount of hardware resource is required. Especially, the amount of processing capability, circuit area, and processing performance required for the upconversion in the 3D playback are double those for the normal upconversion. Thus, from the standpoint of the cost, it is difficult to load the upconversion into the 3D playback device. In this way, since the application of the upconversion to the 3D playback to unify the display rate increases the implementation cost, it is far from practical.

An object of the present invention is therefore to provide a recording medium that achieves a minimum number of occurrences of display interruptions.

Solution to Problem

The above-described object is fulfilled by a recording medium on which an index table, an operation mode object, and byte-code applications are recorded, wherein the index table shows correspondence between one or more titles and one or more operation mode objects, the operation mode object includes an application management table and display rate initialization information, the application management table indicates a byte-code application to be started to a playback device when a title corresponding to the operation mode object is selected as a current title, and the display rate initialization information indicates how to initialize a display rate of a display device connected to the playback device when the title corresponding to the operation mode object is selected as the current title.

Advantageous Effects of Invention

In the above-described structure, when a title corresponding to the operation mode object is selected as a current title, the display rate initialization information indicates how to initialize a display rate of a display device. With this structure, a byte code application preliminarily writes combinations of a "resolution" and a "display rate" into an operation mode object, wherein the resolution is used in the GUI (Graphical User Interface) display, and the display rate is applied to the playback of the video stream. Then when the current title is switched, the display device is initialized based on the combinations of a "resolution" and a "display rate" written preliminarily. This enables the "initialization of resolution" and a "initialization of display rate" at once, wherein the "initialization of resolution" is performed for the GUI display to be performed by the byte code application based on the non-AV playback, and the "initialization of display rate" is performed for the video stream to be played back by the playlist. With this structure, it is possible to reduce the number of occurrences of blackouts when instructing the display device to initialize the resolution or display rate.

Accordingly, the above-described structure can shift the timing of the interruption that occurs due to a "re-connection of cables" to the timing when the title is switched. This reduces the number of interruptions occurring due to the "re-connection of cables" to one, wherein the one interruption occurs when the title is switched. Therefore the present structure reduces the uncomfortable feeling that would be experienced by the user when the display interruption occurs frequently.

BRIEF DESCRIPTION OF DRAWINGS

FIG. 16 shows a usage act of the stereoscopic video playback device.

FIG. 27 shows overlay parameters required for the overlay performed by the adder and available values for the overlay parameters.

FIG. 28 shows the "overlay information" in the BD-J object recorded on the medium.

FIG. 30 shows a list of overlay modes supported by the playback device.

DESCRIPTION OF EMBODIMENTS

The invention of the present application pertaining to the recording medium can be implemented as a package medium for distributing movie works, whereas the invention of the present application pertaining to the playback device, integrated circuit, playback method, and program can be implemented as a player device supporting the package medium.

Figure 1:
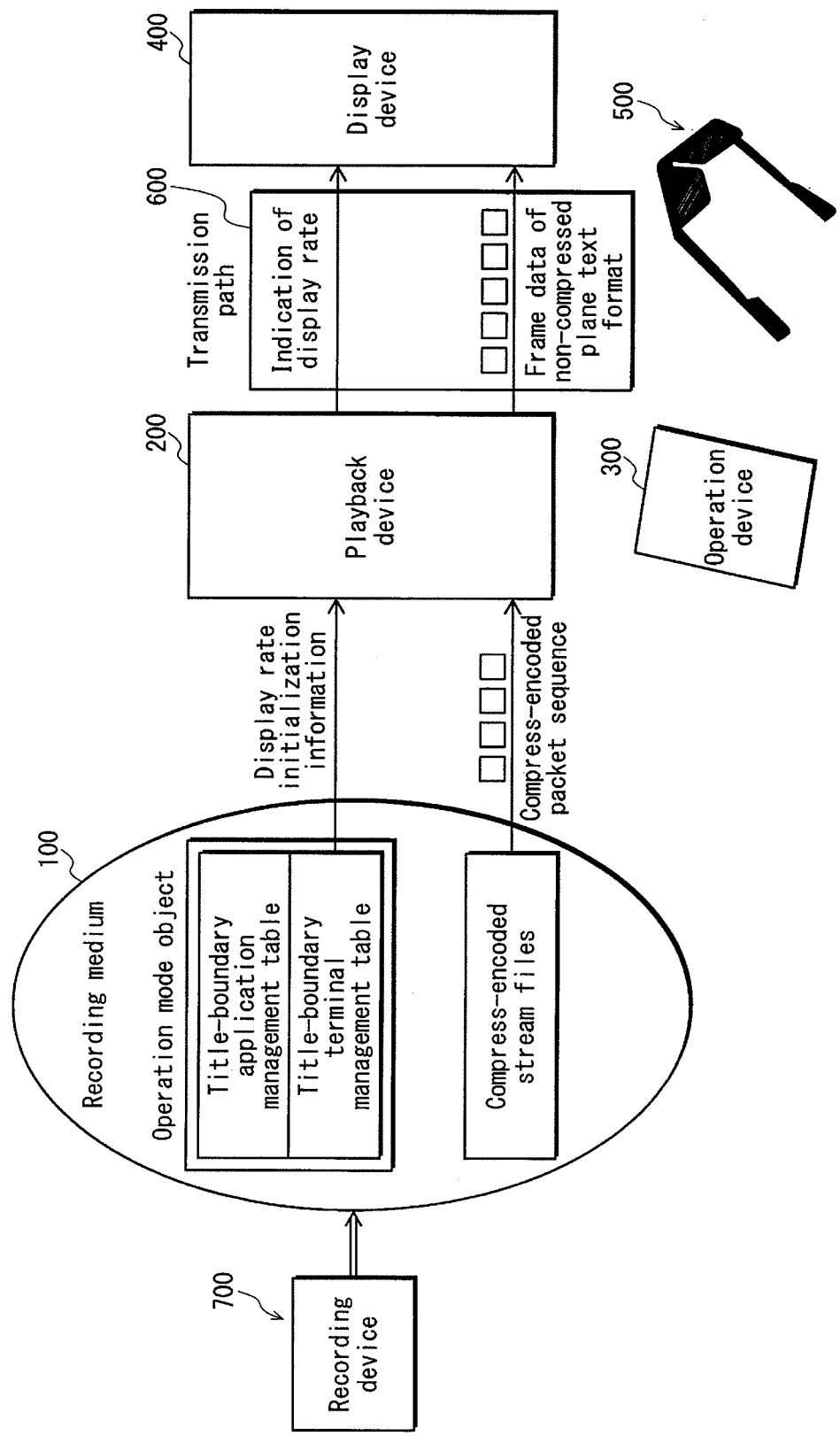
FIG. 1 is a schematic diagram showing a system including a package medium and a player device, as well as the characteristic technical items of the system.

FIG. 1 is a schematic diagram showing a system including a package medium and a player device, as well as the characteristic technical items of the system. The system is composed of a recording medium 100 which is the package medium, a playback device 200 which is the player device, an operation device 300, a display device 400, glasses 500, and a transmission path 600, and is implemented together with a recording device 700.

The recording medium 100 is a disc medium on which compress-encoded stream files and an operation mode object are recorded, wherein the operation mode object causes the playback device to perform the title-boundary application signaling. Originally, an operation mode object includes an application management table so that the application signaling can be performed at boundaries between titles. In contrast, the recording medium 100 includes, as a characteristic technical item, a terminal management table that becomes valid at boundaries between titles.

The playback device 200 executes the title-boundary application signaling by using the application management table in the operation mode object, and also reads the compress-encoded stream files from the recording medium 100. The playback device 200 also reads a compress-encoded stream file from the recording medium 100, decompress-decodes it, and outputs decompress-decoded frame data to the display device 400. A characteristic of the operation is that before the output of the decompress-decoded frame data, a display rate is indicated to the display device 400 by using initialization information included in the terminal management table of the operation mode object that is premised on the title-boundary application signaling.

The frame data is a group of data that is to be displayed in one frame period of the image signal, and is a group of pixel data having a predetermined resolution. Basically, the frame data is picture data composed of one screen of pixel data. However, a drawing image representing a GUI, a graphics representing a subtitle, or a composite bitmap is treated as the frame data, as well.

The operation device 300 is a device for receiving a user operation. The operation device 300 outputs a signal indicating a user operation to the playback device 200 to cause an event to occur within the playback device, wherein the event becomes a trigger for operation of an application.

The display device 400 receives an instruction specifying a display rate from the playback device 200 via the transmission path 600, initializes the display device 400 itself in accordance with the display rate, and then receives frame data in the non-compressed plain text format output from the playback device 200, and supplies the received frame data as a display output. Videos that can be displayed by the display device 400 include 2D videos and 3D videos. A 2D video is composed of images that are each represented by pixels at display positions in a display screen of the display device, wherein a plane including the display screen is recognized as an X-Y plane. The 2D video images may also be referred to as monoscopic images.

In contrast, a 3D video is composed of images that each appear three-dimensional, or appear in front of or behind the screen to the human eyes. Those are realized by applying the structure of the present embodiment to the pixels constituting the display screen of the display device in the X-Y plane, wherein a straight line perpendicular to the X-Y plane is regarded as the axis (in the present embodiment, the straight line perpendicular to the X-Y plane is defined as the axis (Z axis)). A display mode in which a 2D video is output on the display device 400 is called "2D display mode", and a display mode in which a 3D video is output on the display device 400 is called "3D display mode".

The glasses 500, equipped with shutters, need to be worn by the user when the display device 400 performs a 3D output so that they provide the user with a stereoscopic viewing under a predetermined optical control.

The transmission path 600 includes a cable connecting the playback device 200 with the display device 400, and an interface thereof.

The recording device 700 records the compress-encoded stream files and the operation mode object onto the recording medium 100.

This completes a description of the system. Next is a description of an optical control for providing the user with a stereoscopic viewing.

Figure 2:
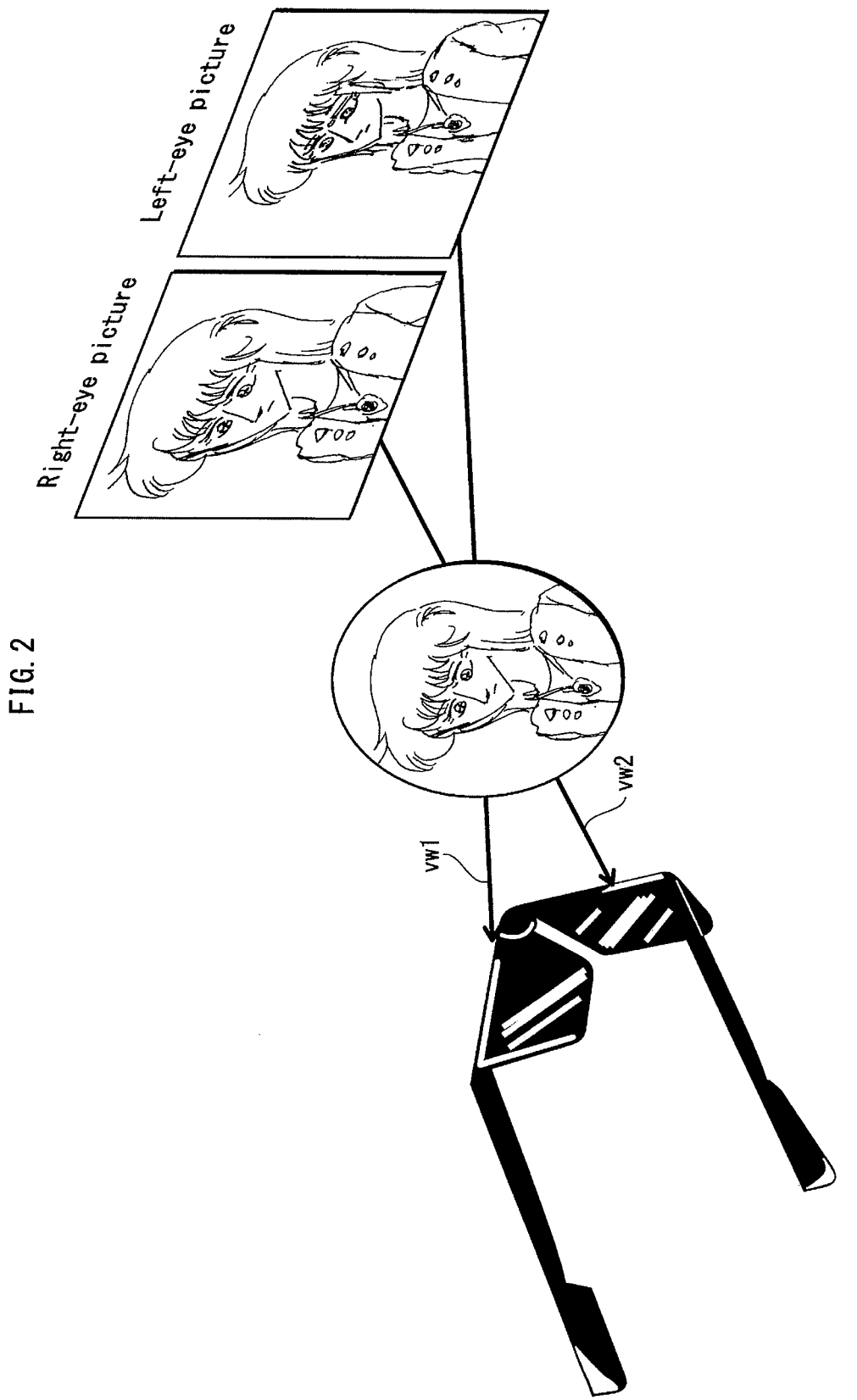
FIG. 2 shows how the left-eye picture data and the right-eye picture data appear to the user wearing the glasses 500.

FIG. 2 shows how the left-eye picture data and the right-eye picture data appear to the user wearing the glasses 500.

In FIG. 2, an arrow vw1 indicates an image input for a viewpoint in a left-view period, and an arrow vw2 indicates an image input for a viewpoint in a right-view period, wherein in the left-view period, images of the left-eye picture data come into view of the left eye of the user via the glasses 500, and in the right-view period, images of the right-eye picture data come into view of the right eye of the user via the glasses 500, as indicated by the arrows vw1 and vw2, respectively.

Figure 3A:
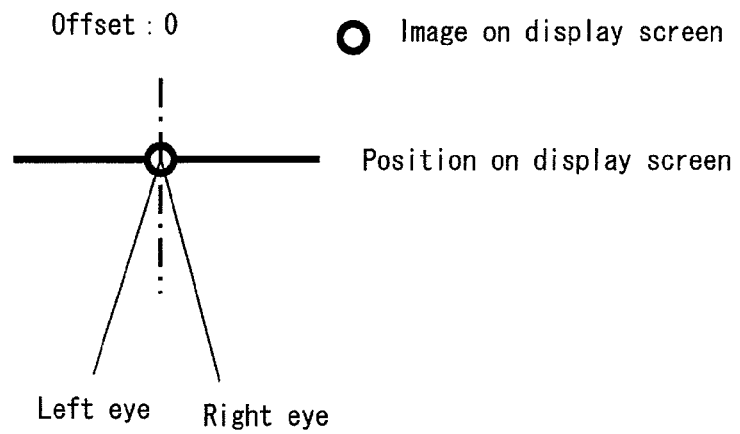
FIGS. 3A through 3C illustrate the principle of causing an image to appear in front of the display screen when the plane offset is set to a positive value (when the writing position of the drawing image in the left-view period is shifted rightward, and the writing position of the drawing image in the right-view period is shifted leftward).
Figure 3B:
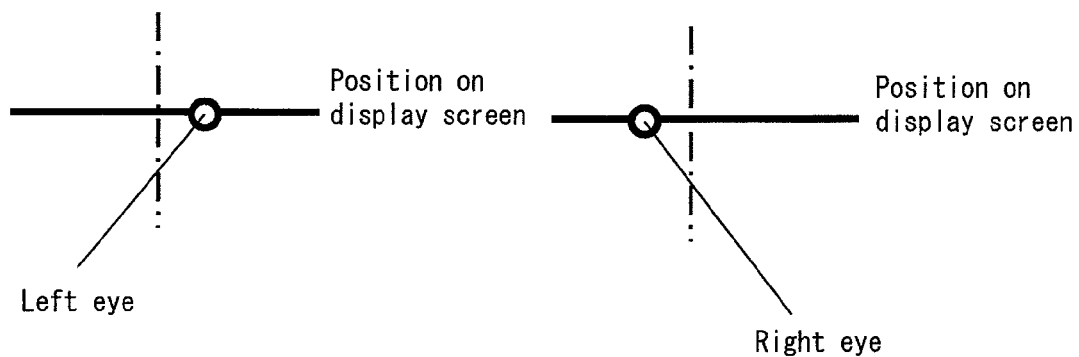
Figure 3C:
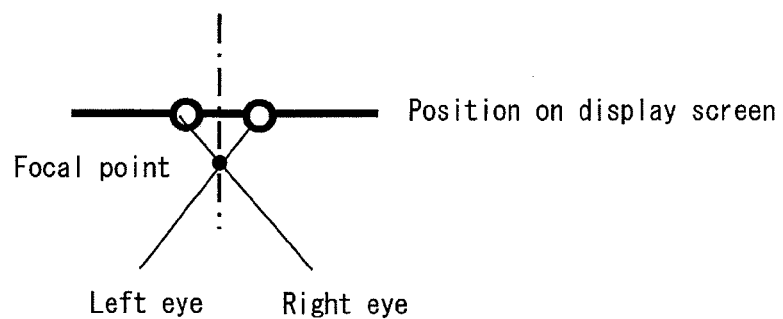

FIGS. 3A through 3C illustrate the principle of causing an image to appear in front of the display screen when the plane offset is set to a positive value (when the writing position of the drawing image in the left-view period is shifted rightward, and the writing position of the drawing image in the right-view period is shifted leftward).

In FIGS. 3A through 3C, the circles represent images displayed on the display screen. In the 2D display mode, the right eye and the left eye see a same image at a predetermined position on the display screen, and the focal point is on the display screen when both eyes are used to see the image (FIG. 3A). As a result, the display image is on the display screen.

In the left-view period, the left eye sees an image which has been shifted rightward relative to the position when the plane offset is "0", whereas in the same period, the view of the right eye is blocked by the shutter of the glasses 500 and the right eye cannot see anything. On the other hand, in the right-view period, the right eye sees an image which has been shifted leftward relative to the position when the plane offset is "0", whereas in the same period, the view of the left eye is blocked by the shutter of the glasses 500 and the left eye cannot see anything (FIG. 3B).

Humans focus on an image using both eyes and recognize that the image is at the focal point. Accordingly, when the state in which the left eye sees an image through the glasses 500 and the state in which the right eye sees the image are switched continuously at short time intervals, the eyes of humans tend to focus on the focal point at a position in front of the display screen, and as a result of this, have an optical illusion as if the image is at a focal point in front of the display screen (FIG. 3C).

Figure 4A:
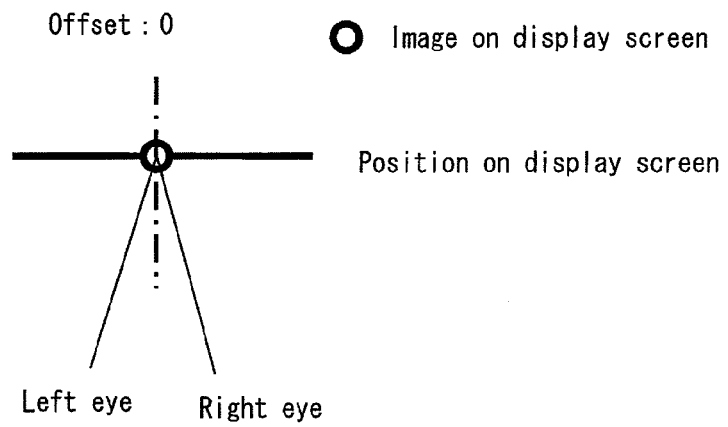
FIGS. 4A through 4C illustrate the principle of causing an image to appear behind the display screen.
Figure 4B:
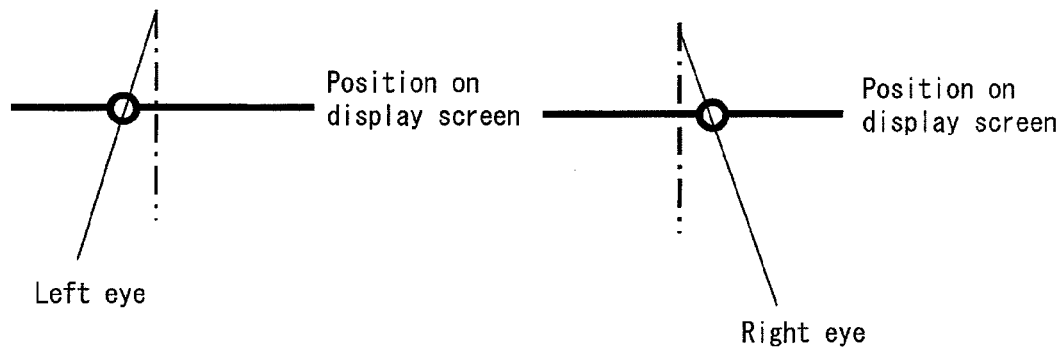
Figure 4C:
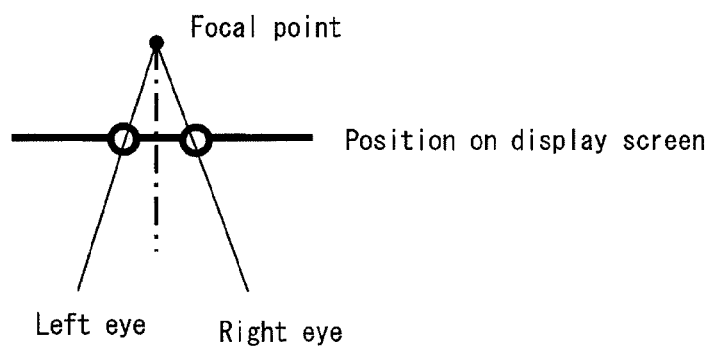

FIGS. 4A through 4C illustrate the principle of causing an image to appear behind the display screen.

In FIGS. 4A through 4C, the circles represent images displayed on the display screen. In the 2D display mode, the right eye and the left eye see a same image at a predetermined position on the display screen, and the focal point exists on the display screen when both eyes are used to see the image (FIG. 4A). As a result, the display image is on the display screen.

In the left-view period, the left eye sees an image which has been shifted leftward relative to the position when the plane offset is "0", whereas in the same period, the view of the right eye is blocked by the shutter of the glasses 500 and the right eye cannot see anything. On the other hand, in the right-view period, the right eye sees an image which has been shifted rightward relative to the position when the plane offset is "0", whereas in the same period, the view of the left eye is blocked by the shutter of the glasses 500 and the left eye cannot see anything (FIG. 4B).

When switching between the state in which the left eye sees an image through the glasses 500 and the state in which the right eye sees the image continues to be performed at short time intervals, the eyes of humans tend to focus on the focal point at a position behind the display screen, and as a result of this, would have an optical illusion as if the image is at a focal point behind the display screen (FIG. 4C).

This completes the description of the glasses 500. Next, the transmission path 600 will be described in detail.

Figure 5A:
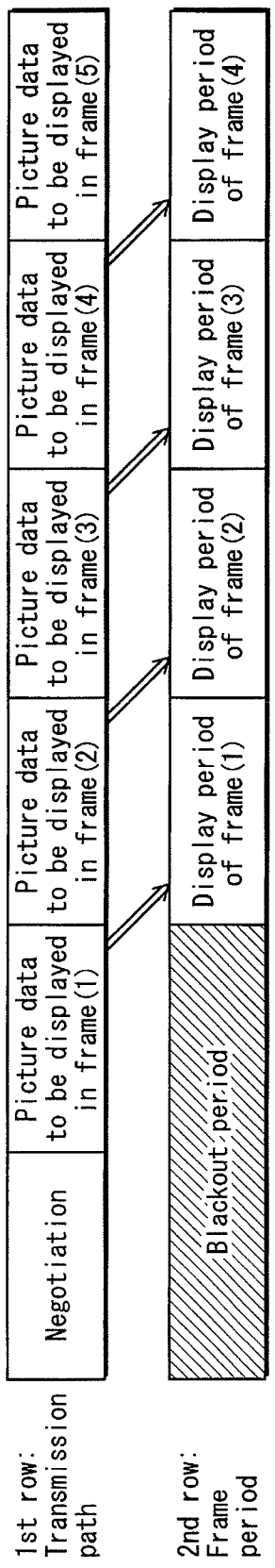
FIGS. 5A and 5B show correspondence between the transmission path and frame periods.
Figure 5B:
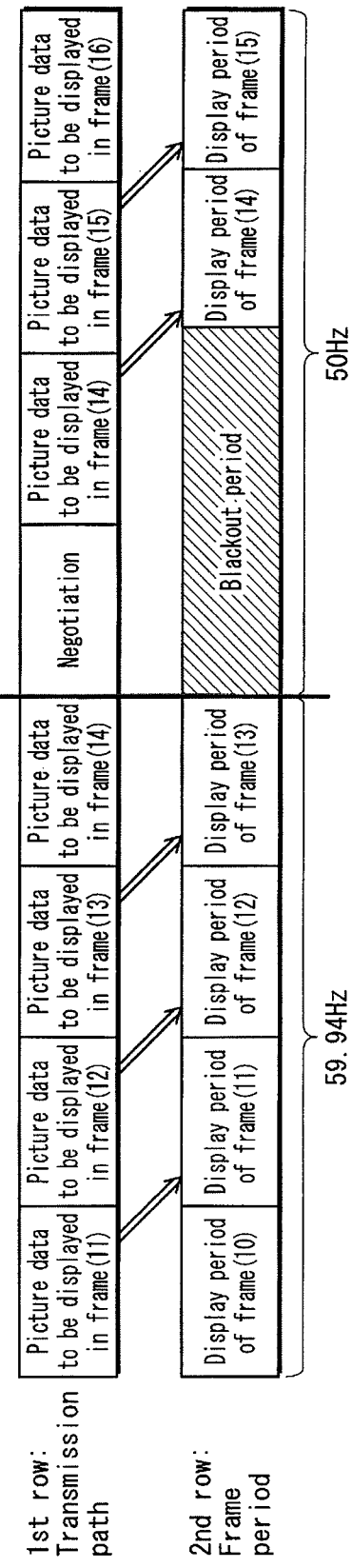

FIGS. 5A and 5B show correspondence between the transmission path and frame periods.

The second row of FIG. 5A shows the frame period including a blackout period and respective display periods of frames (1) through (4).

The first row of FIG. 5A shows the transmission path including a negotiation period and respective transmission periods of picture data to be displayed in the frames (1) through (5). The arrows between the first and second rows indicate the correspondence between the display periods of frames (hereinafter also referred to as "frame periods") and picture data to be displayed in each frame. Each frame period starts only after the picture data to be displayed in the frame period is received. The blackout period is a period in which no picture data to be displayed in the frame period has been received, and thus in the example of FIG. 5A, the blackout period corresponds to a period that includes the negotiation period and a period during which the picture data to be displayed in the frame (1) has not been received yet.

FIG. 5B shows the states of the transmission path and frame periods before and after the display rate is changed. The left-hand side of FIG. 5B shows that the picture data is transmitted at 59.94 Hz, the right-hand side of FIG. 5B shows that the picture data is transmitted at 50 Hz, and the middle of FIG. 5B indicates a time point at which the display rate is changed. In the left-hand side of FIG. 5B, the picture data is transmitted in conformance with a rule that the picture data should be transmitted before the corresponding frame period is reached. However, the change of display rate causes a negotiation to occur, and the picture data to be displayed in the frame (14) is not received. This causes a blackout period to occur, as shown in the second row of FIG. 5B, that extends from immediately after the change of the display rate to a time when the picture data to be displayed in the frame (14) is received.

This completes the description of the transmission path. The following describes the recording medium in detail.

Figure 6:
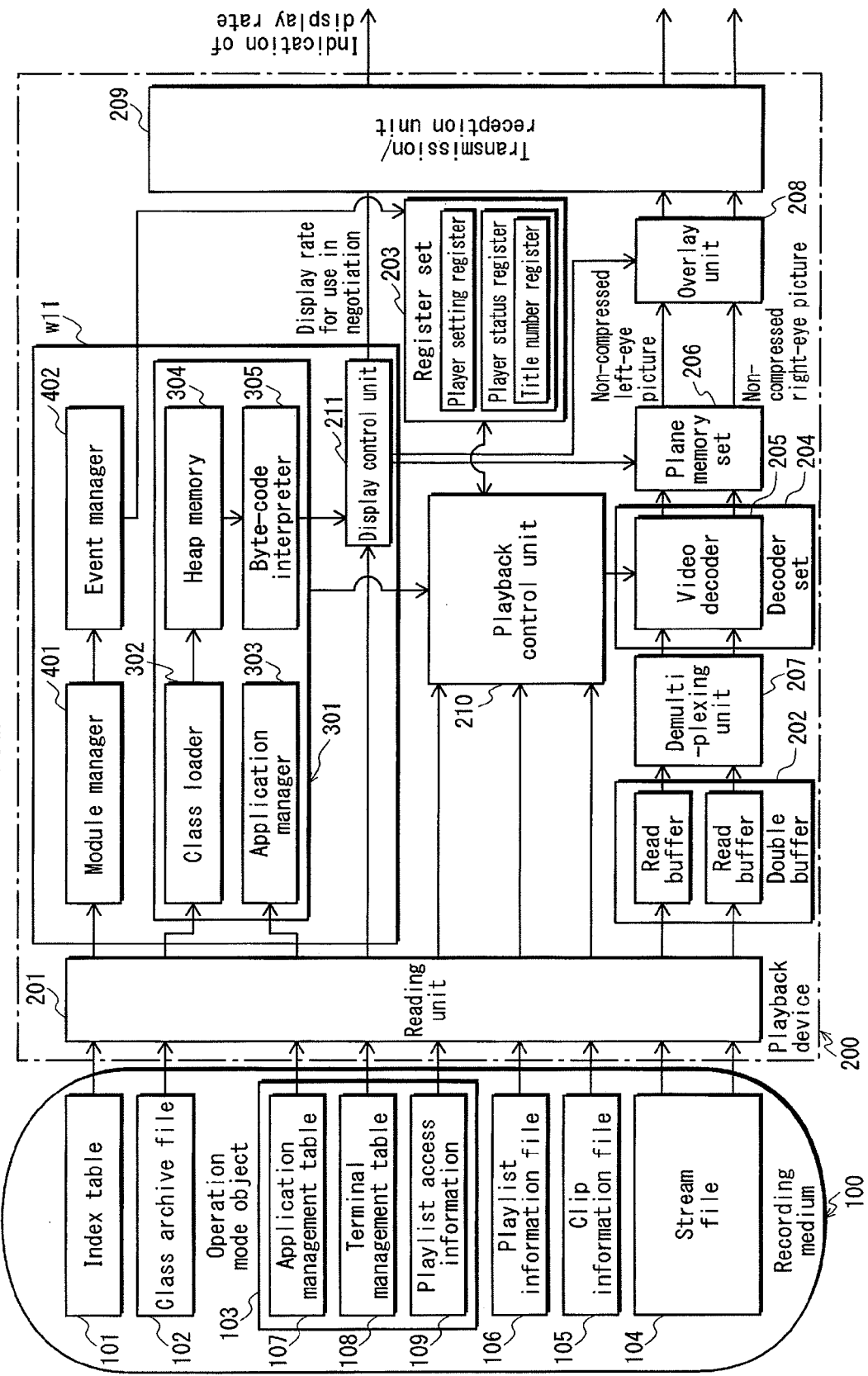
FIG. 6 shows the internal structures of the recording medium 100 and the playback device 200.

FIG. 6 shows the internal structures of the recording medium 100 and the playback device 200. As shown in FIG. 6, the recording medium 100 includes an index table 101, a class archive file 102, an operation mode object 103, a stream file 104, a clip information file 105, and a playlist information file 106.

<Index Table 101>

The index table 101 is management information of the entire recording medium, and shows correspondence between the operation mode objects (which define the operation modes of the playback device) and a plurality of title numbers that can be stored in the title number register provided in the playback device. Titles recorded on the recording medium are pairs of (i) an operation mode object identified by a title number and (ii) a playlist played back from that operation mode object. Here, the playlist is a unit of playback that is identified by a playback order defined in a digital stream including the video stream.

It should be noted here that title numbers that can be stored in the title number register include "0", "1" through "999", and an undefined value "0xFFFF". A title number "0" is a title number of the top menu title. The top menu title is a title that can be called by a menu call operation performed by the user, and is a title for receiving a selection of one of a plurality of titles from the user. The title number by the undefined value "0xFFFF" is a title number of the first play title. The first play title is a title that displays a warning to the viewer, a logo of the content provider and so on immediately after the recording medium is loaded.

The index table includes entries (index table entries) in one-to-one correspondence with title numbers. Each index table entry includes an operation mode object that defines an operation mode. With this structure, the index table defines in detail how each title operates in a corresponding operation mode.

In the playback device, the value of the title number register changes in the order of undefined value "0xFFFF"->any of "1" through "999"->"0". This change in the title number stored in the title number register indicates the following. Upon a loading of the recording medium, first the first play title is played back; after the first play title, titles having any of title numbers "1" through "999" are played back; and after these title, the top menu title is played back to wait for a selection by the user. A title having a title number currently stored in the title number register among the title numbers "1" through "999" is the current playback target, namely, the "current title". How the numbers to be stored in the title number register are set is determined by the user operation made in response to the top menu title and by the setting of the title number register by the program.

<Class Archive File 102>

The class archive file 102 is a file generated by archiving a file of the class structure of the byte code application (class file) together with a digital certificate manifest file, a disc signature file, a disc signature encryption key file, and a permission request file. A loading of an application is made by handling the entire class archive file.

The byte code application is an execution-format program obtained by compiling a class structure being a source code written in an object-oriented programming language. The byte code application is structured from a code (byte code) that does not depend on the device. The byte code application in the present embodiment is event-driven, and the state transfers according to the event. There are four states: "loaded"; "pause"; "active"; and "destroyed". A key event is registered in the byte code application, wherein the key event is a trigger for operation of the byte code application. The registration of the key event being a trigger for operation of the byte code application is performed by an event listener.

<Operation Mode Object 103>

The operation mode object 103 is information defining an operation mode in which the playback device is controlled in a corresponding title when the title is selected as the current title in the index table. As shown in FIG. 6, the operation mode object 103 is composed of application management table 107, terminal management table 108, and playlist access information 109.

Since the title is a unit of playback defined by the corresponding operation mode object, the operation mode object that controls the operation of a title is determined by the correspondence between titles and operation mode objects indicated in the index table. When a title, which corresponds to an operation mode object that performs only a GUI display without performing an AV playback, is selected, only the GUI display is performed. When a title, which corresponds to an operation mode object that browses Web pages with use of a browser, is selected, only the browser is displayed. When a title, which corresponds to an operation mode object that performs only an AV playback, is selected, only the AV playback is executed.

<Stream File 104>

The stream file 104 stores a transport file that is obtained by multiplexing a video stream, one or more audio streams, and a graphics stream.

The stream files fall into two types: 2D-only; and 2D-3D-double. The 2D-only stream files are in a normal transport stream format, and the 2D-3D-double stream files are in a stereoscopic interleaved stream file format.

The stereoscopic interleaved stream file format is a format in which Extents of a main transport stream (main TS) including the base-view video stream and Extents of a sub-transport stream (sub-TS) including the dependent-view video stream are arranged in an interleaved manner.

The base-view video stream is a video stream, among the video streams having been compress-encoded by using the correlation between view points, that can be decoded independently. The base-view video stream is composed of a plurality of view components that can be played back in the 2D playback. MPEG4-MVC is one of compress-encoding methods that use the correlation between view points.

The dependent-view stream is a video stream, among the video streams having been compress-encoded by using the correlation between view points, that can be decoded in combination with the base-view video stream. The dependent-view video stream is composed of a plurality of view components that have been compress-encoded by using the frame correlation with the view components of the base-view video stream.

The view component is each of a plurality of pieces of picture data that are played back simultaneously for the stereoscopic playback in one frame period. The compress-encoding using the correlation between view points is realized as a compress-encoding using the correlation between pictures in which the view components of the base-view and dependent-view streams are used as the picture data. A set of view components of the base-view and dependent-view streams assigned to one frame period constitutes one access unit, wherein the random access can be performed in unit of the access unit.

Each set of Extents of main TS and sub-TS is defined to have a data size that does not cause an underflow in a double buffer during the playback. The playback device can read these sets of Extents seamlessly.

This completes the description of the stream file 104.

<Clip Information File 105>

The clip information file 105 is a stream information file that ensures an execution of a random access to an arbitrary source packet constituting a transport stream, and ensures a seamless playback with another transport stream. The stream files are managed as "AV clips" via the clip information file. The clip information file includes an entry map that shows correspondence among (i) presentation time stamps of frame periods, (ii) information such as the encoding format of the stream of the AV clip, the frame rate, the bit rate, and the resolution, and (iii) the source packet numbers of the packets at the starts of the GOPs. Thus by loading the clip information onto the memory before a stream file is accessed, it is possible to grasp the transport stream in the stream file that is to be accessed. With this structure, execution of the random access is ensured. The clip information file falls into two types: 2D; and 3D. The 3D clip information file includes clip information for the base view (clip base information), clip information for the dependent view (clip dependent information), and a stereoscopic entry map.

The clip base information includes base-view Extent start point information, and the clip dependent information includes dependent-view Extent start point information. The base-view Extent start point information includes a plurality of source packet numbers. Each source packet number indicates a packet number of a packet including a boundary between Extents in the main TS. The dependent-view Extent start point information also includes a plurality of source packet numbers. Each source packet number indicates a packet number of a packet including a boundary between Extents in the sub-TS. By using these Extent start point information, the stereoscopic interleaved stream file is divided into an ATC sequence 1 constituting the main TS and an ATC sequence 2 constituting the sub-TS, wherein "ATC" stands for "Arrival Time Clock".

The stereoscopic entry map indicates, in correspondence with the presentation time stamps representing the frame periods at the starts of GOPs, source packet numbers of access unit delimiters being starting positions of view components at the starts of GOPs in the dependent-view video stream.

On the other hand, the normal entry map in the 3D clip information file indicates, while maintaining the compatibility with the 2D clip information file, in correspondence with the presentation time stamps representing the frame periods at the starts of GOPs, source packet numbers of access unit delimiters being starting positions of view components at the starts of GOPs in the base-view video stream.

When, among the Extents constituting the main TS, the $i^{th}$ Extent identified by the identification number "i" has a source packet of the base-view video stream referenced by an entry of the normal entry map, the $i^{th}$ Extent among the Extents constituting the sub-TS identified by the same identification number "i" should have a source packet of the dependent-view video stream referenced by an entry of the stereoscopic entry map.

<Playlist Information File 106>

The playlist information file 106 is a file storing information that is used to cause the playback device to play back a playlist. The "playlist" indicates a playback path defined by logically specifying a playback order of playback sections, where the playback sections are defined on a time axis of transport streams (TS). The playlist has a role of defining a sequence of scenes to be displayed in order, by indicating which parts of which transport streams among a plurality of transport streams should be played back. The playlist 1 information defines "patterns" of the playlists. The playback path defined by the playlist information is what is called "multi-path". The multi-path is composed of a "main path" and one or more "sub-paths". The main path is defined for the main transport streams. The sub-paths are defined for sub streams. A plurality of sub-paths can be defined while one main path is defined. By defining a playback path of the left-eye video stream in the main path and defining a playback path of the right-eye video stream in the sub-path, it is possible to suitably define a set of video streams for performing a stereoscopic playback.

An AV playback by the multi-path can be started when the byte code application instructs to generate a frame work player instance that plays back the playlist information.

The playlist information includes one or more pieces of playitem information. The playitem information is playback section information that defines one or more pairs of an "in_time" time point and an "out_time" time point on the video stream playback time axis.

The playlist information has a hierarchical structure composed of playitem information, clip information, and transport stream. It is possible to set a one-to-many relationship between (i) a pair of transport stream and clip information and (ii) playitem information so that one transport stream can be referenced by a plurality of pieces of playitem information. This makes it possible to adopt, as a bank film, a transport stream created for a title so that the bank film can be referenced by a plurality of pieces of playitem information in a plurality of playlist information files, making it possible to create a plurality of variations of a movie effectively. Note that the "bank film" is a term used in the movie industry and means an image that is used in a plurality of scenes.

In general, the users do not recognize the unit called playlist, and recognize a plurality of variations (for example, a theatrical version and a TV broadcast version) branched from the stream files as the playlists.

In the following description, it is presumed that a playback of a playlist is started after the current title selection process in which the byte code application displays a playlist selection menu (a menu for selecting a playlist), and causes the user to select a desired playlist.

The playlist information falls into two types: 2D playlist information; and 3D playlist information. A difference between them is that the 3D playlist information includes a base-view indicator and a stereoscopic stream selection table.

The "stereoscopic stream selection table" is a table that shows, in correspondence with stream numbers, stream attributes and stream entries of elementary streams that are to be played back only in the 3D display mode. The elementary streams that are to be played back only in the 3D display mode include the dependent-view video stream and the pair of left-eye and right-eye graphics streams. Each stream entry in the stereoscopic stream selection table indicates a packet identifier associated with the dependent-view video stream and the pair of left-eye and right-eye graphics streams. The stereoscopic stream selection table further indicates references of offset sequences in correspondence with the stream numbers. The offset sequence is a group of offsets any of which can be specified for each frame period in execution of a output mode in which the stereoscopic viewing is realized by giving offsets for the left eye and the right to one plane memory. With use of the stereoscopic stream selection table showing correspondence between the references and the stream numbers, it is possible to playback a most suitable elementary stream for the current stream number.

The "base-view indicator" is information indicating either the left eye or the right eye for which the base-view video stream is to be indicated, wherein the base-view video stream is the base of the compress-encoding using the correlation between view points. By changing the base-view indicator of the playlist information, it is possible to change the assignment of the left eye and right eye at the level of the playlist.

Since the assignment of the left eye and right eye can be changed at the level of the playlist that does not depend on the structure of the stream, when, for example, there is a playlist in which the position and angle of an object in the image is set as "base view=left eye" and "dependent view=right eye", it is possible to generate a playlist in which the position and angle of an object in the image is set as "base view=right eye" and "dependent view=left eye", as another version.

By reversing the assignment of the left eye and right eye to the base-view and dependent-view video streams at the level of the playlist, it is possible to reverse the stereoscopic effect. For example, when there has already been generated a playlist intending a stereoscopic effect that the object appears in front of the screen, it is possible to generate another playlist intending a stereoscopic effect that the object appears behind the screen. This produces an advantageous effect that variations of 3D playlists with different stereoscopic effects can be generated easily.

The following explains the element files archived in the class archive files.

The "digital certificate chain" refers to a chain of a plurality of certificates in which the first certificate (root certificate) signs the second certificate and the $n^{th}$ certificate signs the $(n+1)^{th}$ certificate.

The "permission request file" contains information indicating which permission is given to the byte-code application to be executed. More specifically, the contained information may permit the credential (digital credential certificate), or the inter-application communication.

The "credential" is information used for sharing files stored in an organization directory belonging to a specific organization. The sharing of the files is realized by a structure in which a right to use a file for an application belonging to an organization is given to another application belonging to another organization. For this purpose, the credential contains a provider organization ID identifying the organization that provides the usage right and a recipient organization ID identifying the organization that receives the right.

The class file defining the byte-code application is loaded collectively with the signature file, manifest file, digital certificate chain and permission request file described above. Therefore, when the byte-code application is executed, the playback device can sign the byte-code application using the manifest file, digital certificate chain and permission request file. Note that a byte-code application having been signed with use of the manifest file, digital certificate chain and permission request file is called "signed application". On the other hand, a byte-code application that has not been signed and part or all of its functions are limited is called "unsigned application". With the above-described signature, the byte-code application is limited to such operations that are not disadvantageous to creation of the content. By using the above-described permission request file, it is possible to limit the playback of playlist or image drawing for the stereoscopic playback, to a byte-code applications assigned with a specific right.

This completes the description of the class archive file. The following explains the data elements in the operation mode object.

The "application management table" includes a plurality of entries. The entries included in the application management table each include a "control code", an "application ID", and "application detail information". The control code indicates how an application should be started in a title: the application should be automatically started (AutoStart); or the application should be started upon receiving a call from another application (Present). The application ID indicates a target application by using the file name of the class archive file and a five-digit number. The application detail information stores, for each application, "priority", "binding information", a character sequence, "language code", and "icon locator". The "priority" indicates the priority of the target application in loading. The "binding information" indicates whether or not the target application is title-unbound or disc-bound. The character sequence indicates the name of the target application. The "language code" indicates a language attribute of the target application. The "icon locator" indicates the location of an icon associated with the target application. The "application management table" manages titles as life cycles so that it can manage the consumption of the memory resource by each application, in units of titles that are units of playback. With this structure, even if, while a title is played back, a plurality of applications compete against each other for a use of a resource and the competition reaches a deadlock, all those applications are terminated when the user selects another title, and in this way, the deadlock is forcibly resolved. Also, even if, while a title is played back, an application runs away and occupies a memory, the application is forcibly terminated when the user selects another title, and with this arrangement, the problem with the memory capacity is forcibly resolved. With this structure, it is possible to realize a stable management of the memory resource by which the memory resource is not consumed unnecessarily. Since, as described above, the structure of the present embodiment can realize a stable management of the memory resource, the structure is especially effective in the implementation of home appliances that have limited capacity of memory resources.

The terminal management table 108 is a management table that defines the contents of processing when the application in operation acts as an European digital broadcast terminal (DVB-MHP). The terminal management table 108 includes configuration information for GUI display to be executed, font data to be used in GUI, and a mask flag that defines whether or not to mask a menu call for a GUI or a title call made by the user. The configuration information is information that, when an application to be started by the application management table in the operation mode object is to draw a graphics, instructs the playback device to ensure a graphics plane, which has a size associated with the resolution of the video stream to be played back, on a memory device provided in the playback device.

The playlist access information 109 includes a specification of an auto playback playlist that is to be played back automatically when a title corresponding to the operation mode object has become the current title. Also, the playlist access information 109 includes a specification of a playlist selectable by an application that can be run when a title corresponding to the operation mode object has become the current title.

When a title is selected, the playback device starts playing back a playlist specified by the playlist access information corresponding to the selected current title, without waiting for a playback instruction from the application. And when an execution of the byte-code application ends before the playback of the playlist ends, the playback device continues the playback of the playlist.

With this structure, even when, during a playback, a loading of classes of application takes time, thus the drawing image cannot be displayed, and the output of the interactive screen is delayed, the playlist is played back and the playback image is output as it is. That is to say, even if a start of an application is apparently delayed, the playback image of the playlist is displayed to be viewed by the user in the meantime. Thus a state in which "something is displayed on the screen" is provided during a starting delay of an application. This gives a sense of assurance to the user.

Also, even if, due to different ending timings, an application ends abnormally due to depletion of resource and the GUI of the application is automatically deleted, the display of the playlist can be continued and the playback image of the playlist is output onto the display device. With the continued output, even if the byte-code application ends abnormally, the playback device is in the state of in which "something is displayed on the screen". With such an arrangement, it is possible to prevent the case where the screen blacks out due to an abnormal end of the application.

As described above, when the auto playback playlist has been defined, it is possible to initialize the display rate when titles are switched at the display rate of the auto playback playlist. However, when the byte code application attempts to perform a GUI display, it is often disturbed by the playback image of the auto playback playlist, and the initial display using the auto playback playlist is not always performed. In that case, since the auto playback playlist is not specified, there may be a case where the display rate cannot be initialized when titles are switched.

In view of this, in the present embodiment, display rate initialization information is provided in the operation mode object for application signaling. And the display rate is specified based on the display rate initialization information when the title is switched.

Other than the above-described ones, the operation mode object includes data elements such as application cache information for storing class archive files in the cache, and a key interest table indicating whether or not key events can be generated. These data elements will be described later.

Next, the structural elements of the playback device will be described. As shown in FIG. 6, the playback device includes a reading unit 201, a double buffer 202, a register set 203, a decoder set 204, a video decoder 205, a plane memory set 206, a demultiplexing unit 207, an overlay unit 208, a transmission/reception unit 209, a playback control unit 210, a display control unit 211, a platform unit 301, a class loader 302, an application manager 303, a heap memory 304, a byte-code interpreter 305, a module manager 401, and an event manager 402.

The frame w11 encircled by the thick solid line in FIG. 6 indicates a portion that is to be packaged into one system LSI. As a result, the display control unit 211, platform unit 301, module manager 401, and event manager 402 within this frame are packaged into one system LSI.

<Reading Unit 201>

The reading unit 201 reads out, from the recording medium, the index table, program file of the operation mode object, playlist information file, clip information file, and stream file. When reading the stereoscopic interleaved stream file, the reading unit 201 performs a process in which it divides the stereoscopic interleaved stream file into (i) an ATC sequence 1 corresponding to the main TS and (ii) an ATC sequence 2 corresponding to the sub-TS, by using (a) the Extent start point information of the clip base information in the 3D clip information file and (b) the Extent start point information in the clip dependent information, and stores the ATC sequences 1 and 2 into different read buffers. This division is realized by repeating two processes: the first process of extracting, from the stereoscopic interleaved stream file, as many source packets as the number of packets corresponding to the source packet number indicated by the Extent start point information in the clip dependent information, and adding the extracted source packets into the ATC sequence 1; and the second process of extracting, from the stereoscopic interleaved stream file, as many source packets as the number of packets corresponding to the source packet number indicated by the Extent start point information in the clip base information, and adding the extracted source packets into the ATC sequence 2.

<Double Buffer 202>

The double buffer 202 is composed of two read buffers that are provided for adjustment of speed between the reading unit 201 and the demultiplexing unit 207. The double buffer 202 temporarily stores the ATC sequences 1 and 2 obtained by dividing the stereoscopic interleaved stream file.

<Register Set 203>

The register set 203 is composed of a plurality of player status registers and a plurality of player setting registers. The player status register is a hardware resource for storing values that are to be used as operands when the MPU of the playback device performs an arithmetic operation or a bit operation. The player status register is also reset to initial values when an optical disc is loaded, and the validity of the stored values is checked when the status of the playback device changes. The values that can be stored in the player status register are the current title number, current playlist number, current play-item number, current stream number, current chapter number, and so on. The values stored in the player status register are temporary values because the player status register is reset to initial values each time an optical disc is loaded. The values stored in the player status register become invalid when the optical disc is ejected, or when the playback device is powered off. In particular, a register for storing a title number is called a title number register.

The player setting register differs from the player status register in that it is provided with power handling measures. With the power handling measures, the values stored in the player setting register are saved into a non-volatile memory when the playback device is powered off, and the values are restored when the playback device is powered on. The values that can be set in the player setting register include: various configurations of the playback device that are determined by the manufacturer of the playback device when the playback device is shipped; various configurations that are set by the user in accordance with the set-up procedure; and capabilities of a partner device that are detected through negotiation with the partner device when the device is connected with the partner device.

<Decoder Set 204>

The decoder set 204 is composed of a video decoder, a presentation graphics stream decoder, an interactive graphics stream decoder, and an audio decoder.

<Video Decoder 205>

The video decoder 205 is a representative decoder among the decoders constituting the decoder set 204. The video decoder 205 preloads view components that constitute the dependent-view video stream, and decodes view components of a picture type for which the Instantaneous Decoder Refresh (IDR) at the start of the closed GOP in the base-view video stream is intended (IDR type). In this decoding, all the coded data buffers and decode data buffers are cleared. After decoding the view components of the IDR type in this way, (i) view components following the base-view video stream compress-encoded based on the correlation with these view components and (ii) view components of the dependent-view video stream, are decoded. Non-compressed picture data is obtained by this decoding of the view components. The obtained non-compressed picture data is stored in the decode data buffer to be used as the reference picture.

By using the reference picture, the motion compensation is performed onto (i) view components following the base-view video stream and (ii) view components of the dependent-view video stream. Non-compressed picture data with regard to (i) view components following the base-view video stream and non-compressed picture data with regard to (ii) view components of the dependent-view video stream are obtained by the motion compensation. The obtained non-compressed picture data are stored in the decode data buffer to be used as reference pictures. The above-described decoding is performed each time the decode start time indicated in the decode time stamp of each access unit is reached.

<Plane Memory Set 206>

The plane memory set 206 is composed of a plurality of plane memories. These plane memories constitute a layer model, and the data stored in each plane memory are used to overlay the layers with each other. The plane memory set includes a left-eye plane memory and a right-eye plane memory. Respective non-compressed picture data obtained by decoding the base-view and dependent-view components of each access unit are written into the left-eye and right-eye plane memories. The writing is performed each time the playback start time indicated by the presentation time stamp of each access unit is reached.

To which of the left-eye plane memory and the right-eye plane memory the picture data after decoding is to be written is determined in accordance with the base-view indicator in the playlist information. When the base-view indicator specifies the base-view video stream as "for the left eye", the picture data of the base-view video stream is written to the left-eye plane memory, and the picture data of the dependent-view video stream is written to the right-eye plane memory.

When the base-view indicator specifies the base-view video stream as "for the right eye", the picture data of the base-view video stream is written to the right-eye plane memory, and the picture data of the dependent-view video stream is written to the left-eye plane memory. These view components are output to the display device in sequence. More specifically, in one frame period, the picture data stored in the left-eye plane memory and the picture data stored in the right-eye plane memory are output simultaneously.

<Demultiplexing Unit 207>

The demultiplexing unit 207 converts source packets having packet identifiers written in stream entries of the basic stream selection table in the 3D playlist information into TS packets, and outputs the TS packets to the decoder. Also, the demultiplexing unit 207 converts source packets having packet identifiers written in stream entries of the stereoscopic stream selection table in the 3D playlist information into TS packets, and outputs the TS packets to the decoder. Which packet identifiers, among a plurality of packet identifiers written in a plurality of stream entries of the basic and stereoscopic stream selection tables, are to be used is determined in accordance with the setting in the stream number register among the player setting registers of the register set. The stream number register is a register for storing the current stream number.

<Overlay Unit 208>

The layer overlay unit 208 overlays the layers in the plurality of plane memories. The layer overlay is achieved by executing a superimposing process onto all combinations of the layers in the layer model. In the superimposing process, pixel values of pixel data stored in the plane memories of the layers are superimposed. The layer overlay performed by the layer overlay unit 208 is achieved by executing a superimposing process in which pixel values of pixel data stored in the plane memories of the two layers are superimposed, onto all combinations of the two layers in the layer model.

The superimposing between layers is performed as follows. A transmittance $\alpha$ as a weight is multiplied by a pixel value in unit of a line in the plane memory of a certain layer, and a weight of ($1$—transmittance $\alpha$) is multiplied by a pixel value in unit of a line in the plane memory of a layer below the certain layer. The pixel values with these brightness weights are added together. The resultant pixel value is set as a pixel value in unit of a line in the layer. The layer overlay is realized by repeating this superimposing between layers for each pair of corresponding pixels in a unit of a line in adjacent layers in the layer model.

<Transmission/Reception Unit 209>

The transmission/reception unit 209 transits to a data transfer phase via a negotiation phase, when playback device is connected with another device in the home theater system via an interface. The transmission/reception unit 209 performs data transfer in the transfer phase.

In the negotiation phase, the capabilities of the partner device (including the decode capability, playback capability, and display frequency) are grasped, and the capabilities are set in the player setting register, so that the transfer method for the succeeding data transfers is determined. The negotiation phase includes a mutual authentication phase. After the negotiation phase, one line of the pixel data in the non-compression/plaintext format in the picture data after the layer overlaying is transferred to the display device at a high transfer rate in accordance with the horizontal sync period of the display device. On the other hand, in the horizontal and vertical blanking intervals, audio data in the non-compression/plaintext format is transferred to other devices (including an amplifier and a speaker as well as the display device) connected with the playback device. With this structure, the devices such as the display device, amplifier and speaker can receive the picture data and audio data both in the non-compression/plaintext format, and a reproduced output is achieved. Further, when the partner device has the decode capability, a pass-through transfer of the video and audio streams is possible. In the pass-through transfer, it is possible to transfer the video stream and audio stream in the compressed/encrypted format, as they are.

In the transfer phase, the transmission/reception unit 209, before the data transfer, links the picture data to be viewed by the left eye with the picture data to be viewed by the right eye. The methods for liking the picture data include the side-by-side method and the top-and-bottom method.

With the side-by-side method, the picture data to be viewed by the left eye and the picture data to be viewed by the right eye are linked in the horizontal direction and displayed.

With the top-and-bottom method, the picture data to be viewed by the left eye and the picture data to be viewed by the right eye are linked in the vertical direction and displayed.

<Playback Control Unit 210>

The playback control unit 210 executes a random access from an arbitrary time point on the time axis of the video stream. More specifically, when it is instructed to play back from an arbitrary time point on the time axis of the video stream, the playback control unit 210 search for a source packet number of an access unit corresponding to the arbitrary time point, by using a normal entry map in the 3D clip information file and a stereoscopic entry map. The access unit includes a pair of a view component of the base-view video stream and a view component of the dependent-view video stream, and this searching identifies a source packet number of a source packet storing an access unit delimiter for the access unit. Reading from the source packet number and decoding enable a random access to be performed. When a 3D playlist is to be played back, random accesses to the main TS and the sub-TS are executed by using the in-time and the out-time defined in the main-path information and the in-time and the out-time defined in the sub-path information of the 3D playlist information, to start the playback of the playlist.

<Display Control Unit 211>

The display control unit 211 is composed of a program embedded in the playback device, and performs a display control onto the plane memory set 206 and the demultiplexing unit 207. The display control includes a control for, when a new current title number is set during a title switch, initializing the display device 400 by using the initialization information of the operation mode object corresponding to the current title. When the HDMI is used as the transmission path 600, the video format identification code of AVInfoFrame is used in the initialization of the display device 400. This is because, in the HDMI, a pair of resolution and frequency can be specified by the video format identification code.

<Platform 301>

The platform unit 301 is a module for causing a byte code application to operate, and includes a class loader 302, an application manager 303, a heap memory 304, and a byte-code interpreter 305.

<Class Loader 302>

The class loader 302 loads a byte code application by generating, in a heap memory 111, an instance of a class structure of an application that is recorded on the recording medium 100.

<Application Manager 303>

The application manager 303 verifies the authenticity of a byte code application based on the application management table, and then performs an application signaling of the byte code application such as starting and ending of the byte code application.

<Heap Memory 304>

The heap memory 304 is a stack area that stores data to be used in the execution of a byte code application such as: byte codes constituting a byte code application; or system parameters used by a byte code application.

<Byte-Code Interpreter 305>

The byte-code interpreter 305 is what is called a virtual machine that converts the byte codes constituting a byte code application, stored in the heap memory 304, into native codes, and causes the MPU to execute them.

<Module Manager 401>

The module manager 401 holds an index table and performs the mode management and the branch control. The mode management is a control on assignment of either a command-base operation mode or a byte-code-application-base operation mode. Also, the branch control is a control for reading the current title and an operation mode object corresponding to a current operation mode, and executing it.

<Event Manager 402>

The event manager 402, when an event has occurred in correspondence with a user operation performed on the operation device 300, judges whether or not the event is written in the key interest table. When it judges that the event is written in the key interest table, the event manager 402 outputs a key event so that the byte code application can process the event.

In contrast, when it judges that the event is not written in the key interest table, the event manager 402 causes the playback control unit to execute an AV function corresponding to the event. With this arrangement, a playback control is performed by the playback control unit even if the byte code application fails to deal with the event or has a bug.

This completes the explanation of the platform unit. The following is a detailed explanation of the terminal management table.

Figure 7B:
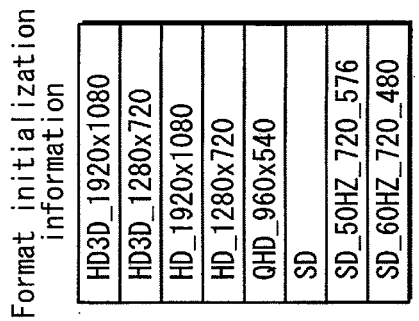
FIGS. 7A through 7E illustrate the terminal management table.
Figure 7C:
Figure 7A:
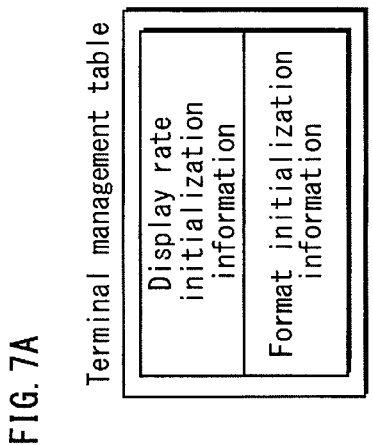

FIGS. 7A through 7E illustrate the terminal management table. FIG. 7A shows an internal structure of the terminal management table. As shown in FIG. 7A, the terminal management table is composed of "display rate initialization information" and "format initialization information".

The display rate initialization information is information that indicates, when a title corresponding to the operation mode object is set as the current title, what frequency should be used to initialize the display rate of the display device. Note here that the "display rate" is a unit indicating the number of frames per second, and is represented by a unit system called FPS (Frame Per Second). Here, when the frame period is considered as a wave length, the display rate can be represented by a "frequency". Thus a unit "Hz" may be used to indicate the display rate. The display rate initialization information indicates the display rate as one of a plurality of frequencies supported by the display device 400. FIG. 7B shows an internal structure of the display rate initialization information. As shown in FIG. 7B, the display rate initialization information can specify, as a frequency that is to be used in the initialization of the display device: 59.94 Hz (59.94 p) in the progressive format; 50 Hz (50 p) in the progressive format; or 23.976 Hz (23.976 p) in the progressive format.

The display rate initialization information may specify two frequencies out of 59.94 Hz, 50 Hz, and 23.976 Hz. When the display rate initialization information specifies two frequencies, the playback device selects one of the two frequencies that is supported by the display device connected to the playback device. When the display rate initialization information specifies two frequencies, and both the frequencies are supported by the connected display device, a frequency to be used is determined in accordance with the order of frequencies written in the display rate initialization information. More specifically, when the frequencies are written in the order of 23.976 Hz, 59.94 Hz, and 50 Hz: 23.976 Hz is selected if it is supported by the display device; 59.94 Hz is selected if 23.976 Hz is not supported but 59.94 Hz is supported by the display device; and 50 Hz is selected if neither 23.976 Hz nor 59.94 Hz is supported but 50 Hz is supported by the display device.

When a title corresponding to the operation mode object is set as the current title, the display rate initialization information also indicates either the 3D display mode or the 2D display mode as the display format to which the display device should be set, and how the resolution should be set.

FIG. 7C shows one example of the format initialization information. As shown in FIG. 7C, the format initialization information can be set to one of HD3D_1920×1080, HD3D_1280×720, HD_1920×1080, HD_1280×720, QHD_960×540, SD, SD_50HZ_720×576, and SD_60 HZ_720×480. Here, "HD" means a full hi-vision, and "HD3D" means that the display device is caused to present a 3D display in a full hi-vision, with a resolution of 1920×1080 or 1280×720.

The following describes the correspondence between the frame period and the display rate. The frame period in the display device 400 is a reverse of the frequency indicated by the display rate. FIG. 7D shows the correspondence among the frame period, picture data, and the view components. The first row of FIG. 7D shows the frame period in the 2D display mode, and the second row shows the frame period in the 3D display mode. As shown in the first row of FIG. 7D, in the 2D display mode, one picture is displayed in the frame period. On the other hand, as shown in the second row of FIG. 7D, in the 3D display mode, the left-eye view component and the right-eye view component are displayed in the frame period.

Figure 7E:
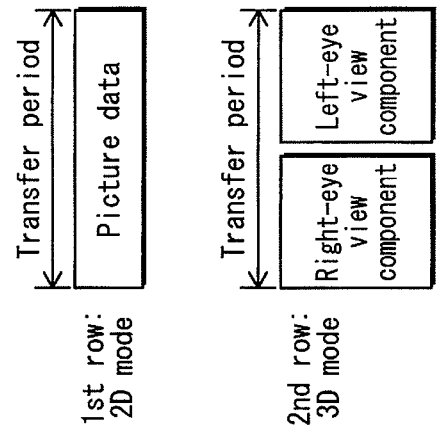
Figure 7D:
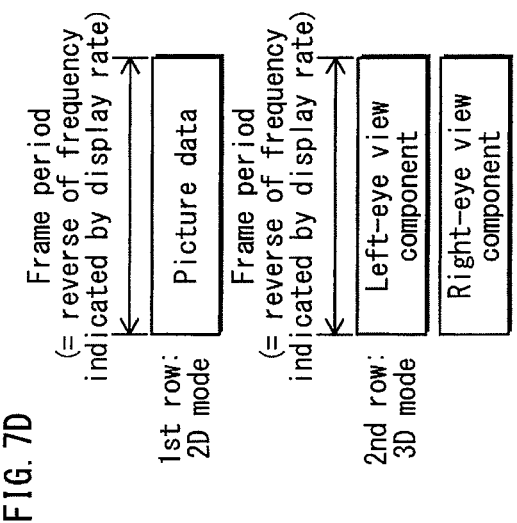

FIG. 7E shows the correspondence among the transfer period corresponding to the frame period, picture data, and the view components. The first row of FIG. 7E shows the transfer period in the 2D display mode, and the second row shows the transfer period in the 3D display mode. The picture data or view components to be displayed in a frame period need to have been transferred by the time immediately before the start of the frame period. Therefore, as shown in the first row of FIG. 7E, the transfer period in the 2D display mode is equal to a period that is required to transfer the picture data to be displayed in the frame period. Also, as shown in the second row of FIG. 7E, the transfer period in the 3D display mode is equal to a period that is required to transfer the left-eye and right-eye view components to be displayed in the frame period because the left-eye and right-eye view components to be displayed in the frame period need to have been transferred by the time immediately before the start of the frame period. As described above, in the 3D display mode, both the left-eye and right-eye view components need to be transferred to the display device in the frame period. Thus the bit size of data to be transferred is double the bit size in the 2D display mode. This means that when the display mode is switched from the 2D display mode to the 3D display mode, the frequency is the same but the amount of data to be transferred doubles. For this reason, the setting is made so that switching between output modes does not occur during a playback of a playlist.

<One Example of Display Rate Initialization>

Figure 8:
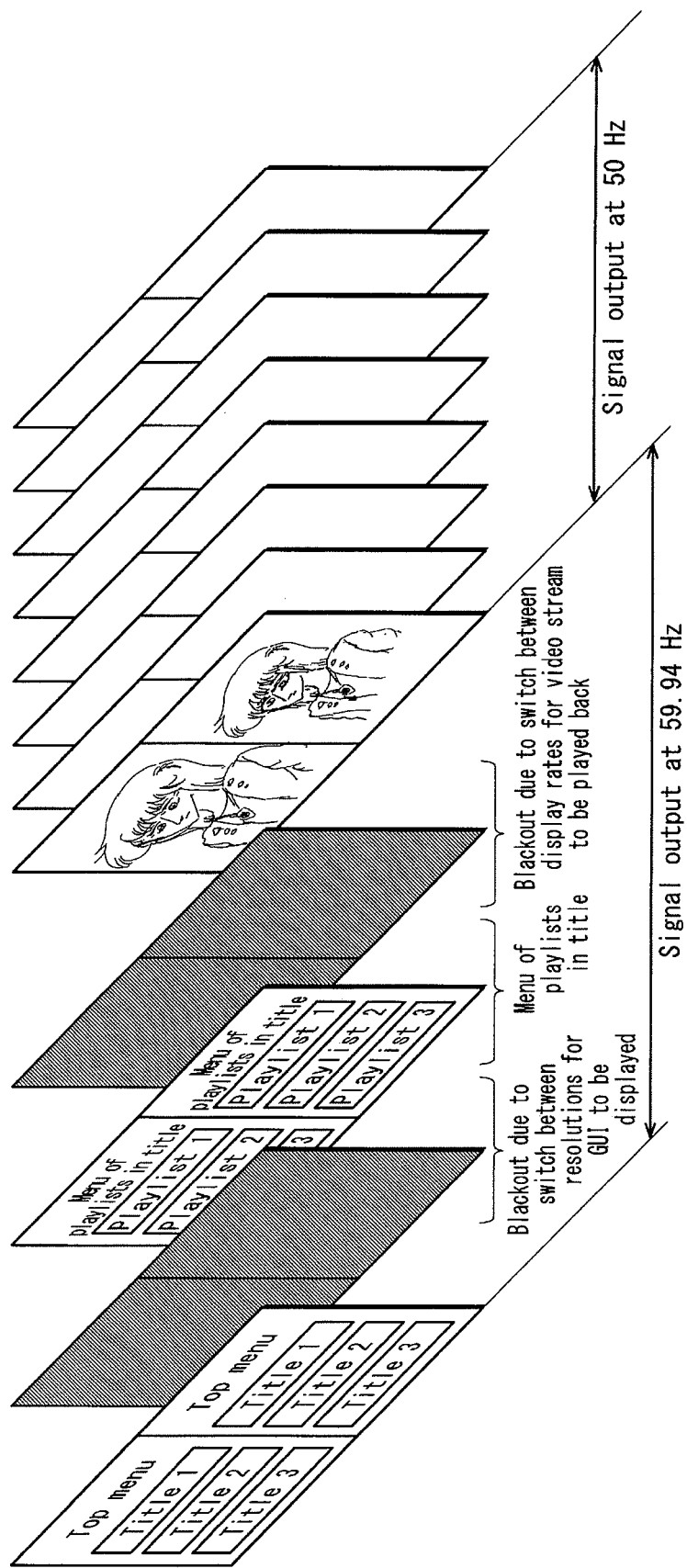
FIG. 8 shows transfer of contents of display on the display device in the case where the display rate is not initialized when the title is switched.
Figure 9:
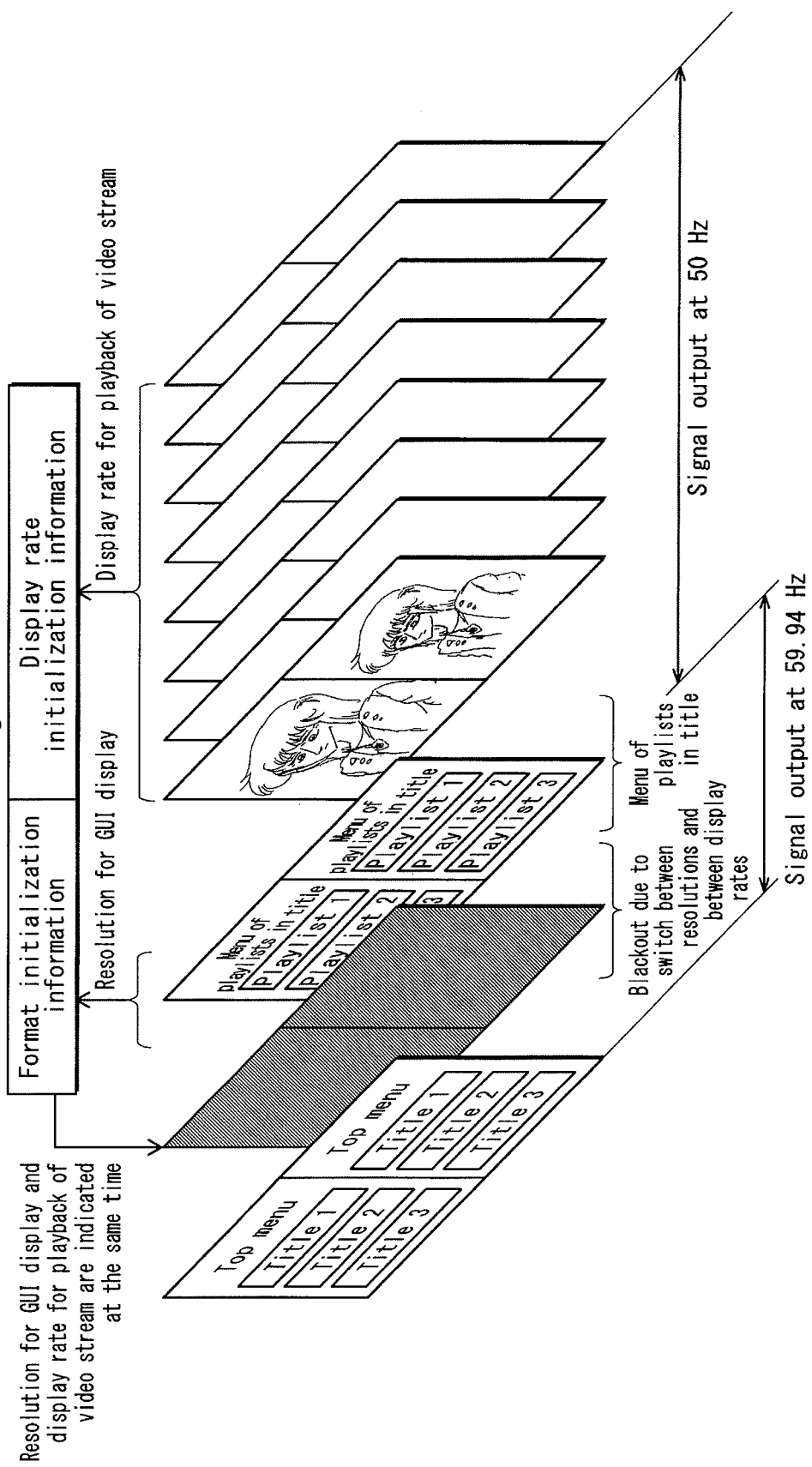
FIG. 9 shows transfer of contents of display on the display device in the case where the display rate is initialized when the title is switched.

The following describes how the display rate is initialized with use of the display rate initialization information, with reference to a concrete example of a content image. The content image selected for the explanation transfers among states unique to the package media, as shown in FIGS. 8 and 9. In this example, after the first play title according to the index table is played back, the operation mode object corresponding to the top menu and the byte code application are executed. And with the execution of the operation mode object and the byte code application, the top menu is displayed. Then after a title is selected from among a plurality of titles on the top menu, a playlist menu unique to the selected title is displayed. And after a playlist is selected by the user from among a plurality of playlists, the selected playlist starts to be played back.

It should be noted here that the first play title is a title that displays a warning regarding the copyright of the movie work or a logo of the content provider, and so on. Such warning or logo is often created in the form of a video stream, and thus when a disc is loaded into the playback device, the resolution and display rate for the video stream representing the warning or logo are set in the display device. The resolution and display rate to be applied to the first play title can be written in the index table.

The top menu is a menu for showing graphic representation of the titles stored in the disc medium so that a selection can be made therefrom.

The playlist menu is a menu for showing graphic representation of the playlists that can be played back from a certain title so that a selection can be made therefrom. The top menu and the playlist menu merely display graphic representation of titles and playlists, and do not play back a video stream. Accordingly, when the playlist menu is played back, only the resolution to be used in the GUI display needs to be set in the display device. Therefore, when the byte code application plays back the playlist menu, an arbitrary display rate may be specified to the display device. In the example shown in FIGS. 8 and 9, after the first play title is played back, the top menu and the playlist menu are played back. Accordingly, the display rate that was used in the playback of the first play title (in the example shown in FIGS. 8 and 9, 59.94 Hz) is applied to the playback of the top menu and the playlist menu as it is.

The GUI display of the top menu for receiving a selection of a title or the playlist menu for receiving a selection of a playlist does not depend on the display rate of the display device at all. On the other hand, the playlist includes the base-view video stream and the dependent-view video stream, and the view components of these video streams have display rates unique to the video materials. As a result, if a GUI display by an application is switched to a playback of a playlist, the display rate of the display device should change as well.

FIG. 8 shows transfer of contents of display on the display device in the case where the display rate is not initialized when the title is switched. In FIG. 8, the picture data to be viewed by the left eye and the right eye in each frame are drawn in the side-by-side format.

With respect to the example shown in FIG. 8, it is presumed that the display rate is set to 59.94 Hz when the top menu title is played back after a disc is inserted, and that the stream file to be stream file is a playlist that should played back at a display rate of 50 Hz.

In the operation example shown in FIG. 8, when the display content switches from the top menu to the "menu of playlists in the title", a blackout period occurs for the resolution for a GUI display to be set in the display device. Here, as described above, the display rate at the disc insertion differs from the display rate of the playlist, thus when the playlist is played back, the display device needs to be set to 50 Hz that is a display rate unique to the playlist. Accordingly, a blackout period occurs between the display of the menu of playlists in the title and the actual playback of the playlist. Therefore, the display content on the display device 400 transfers as follows: (1) display of the top menu; ->(2) blackout at switch between titles; ->(3) display of the menu of playlists in the title; ->(4) blackout due to switch between display rates; ->(5) playback of playlist at 50 Hz.

FIG. 9 shows transfer of contents of display on the display device in the case where the display rate is initialized when the title is switched. In FIG. 9, as in FIG. 8, it is presumed that the display rate is set to 59.94 Hz when a disc is inserted, and that the stream file to be stream file is a playlist that should played back at a display rate of 50 Hz. The upper row of FIG. 9 indicates the terminal management table including a pair of "resolution" and "display rate", wherein the resolution is used in the GUI display by the byte code application based on the non-AV playback, and the display rate is applied to the playback of the video stream in the playlist. As the terminal management table is set in this way, when the current title is switche, the pair of "resolution" and "display rate" are specified to the display device, wherein the resolution is used in the GUI display by the byte code application based on the non-AV playback, and the display rate is applied to the playback of the video stream in the playlist.

Since the pair of (i) the resolution that is used in the GUI display by the byte code application based on the non-AV playback, and (ii) the display rate that is applied to the playback of the video stream in the playlist, are specified to the display device when the title is switched, only one blackout occurs at the switch between titles. This means that the number of occurrences of blackout has been reduced.

Figure 10:
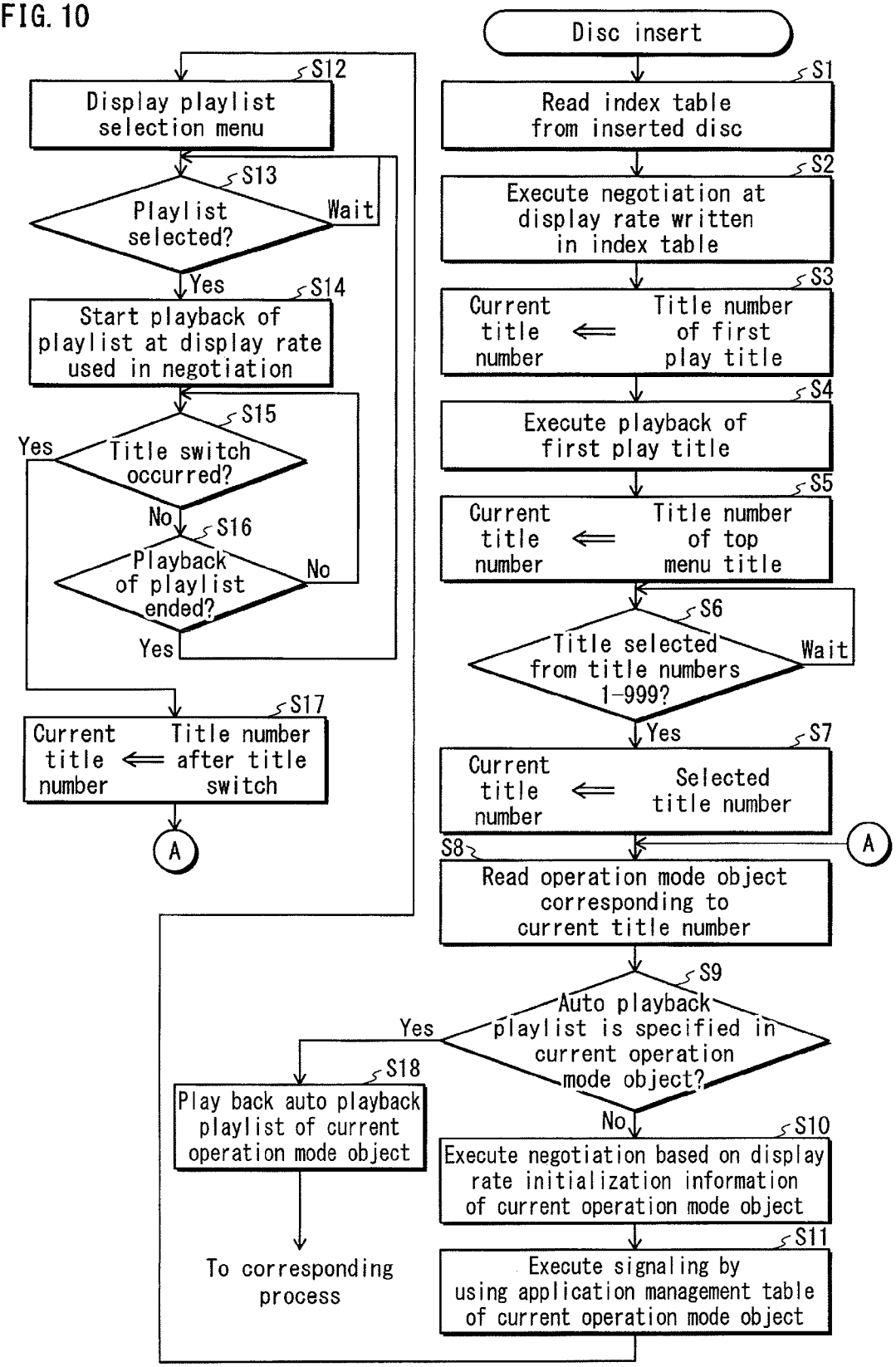
FIG. 10 is a flowchart showing the processing procedure of the playback device.

The operation described above can be realized by writing the processing procedure shown by the flowchart of FIG. 10 in a computer description language, and causes the MPU to execute the procedure.

FIG. 10 is a flowchart showing the processing procedure of the playback device. The playback device reads the index table from the inserted disc (step S1), executes the negotiation at the display rate written in the index table (step S2), sets the title number of the first play title as the current title number (step S3), and executes playback of the first play title (step S4).

The playback device sets the title number of top menu title as the current title number (step S5), and waits for a title to be selected from title numbers 1-999 (step S6). In step S7, the playback device sets the selected title number as the current title number, and in step S8, reads an operation mode object corresponding to the current title number. The control then moves to step S9 in which the playback device judges whether or not the auto playback playlist is specified in the current operation mode object. When it judges that the auto playback playlist is not specified in the current operation mode object, the playback device executes the negotiation based on the display rate initialization information of the current operation mode object (step S10), and executes the application signaling by using the application management table of the current operation mode object (step S11). After this, the playback device displays the playlist selection menu (step S12), and waits for a playlist to be selected (step S13). After a playlist is selected, the playback device starts the playback of the playlist at the display rate used in the negotiation (step S14), and moves to a loop composed of steps S15 through S16. In step S15, it is judged whether or not a title switch, namely a switch between titles, occurred. When it is judged that a title switch occurred, the playback device sets the title number after the title switch as the current title number (step S17). After the playback of the playlist ends, the control moves to step S13 in which the playback device waits for a playlist to be selected.

When it judges that the auto playback playlist is specified in the current operation mode object, the playback device plays back the auto playback playlist of the current operation mode object (step S18).

<Technical Meaning of Display Rate Setting>

The following describes the technical meaning of setting the display rate in the terminal management table for the playlist to be played back.

There may be a case where a selected playlist should be played back at a display rate that is different from a display rate specified to the display device by the display rate initialization information. When such a playlist is selected, even if an initialization is performed with use of the display rate initialization information in the terminal management table is composed, it is inevitable that a blackout occurs during a period in which the playback of the playlist menu transfers to the playback of the playlist. However, in the 3D display mode, the types of display rates that can be adopted are limited to three types: 23.976 Hz, 59.94 Hz, and 50 Hz. And thus patterns of combinations of a display rate and a resolution are limited.

In the following, the probability of blackout to occur is considered on the presumption that the combinations of a display rate and a resolution of the first playlist is 1280×720/59.94 Hz, and combinations of a display rate and a resolution of the playlists selectable from the playlist menu are: 1920×1080/23.976 Hz; 1280×720/59.94 Hz; and 1280×720/50 Hz.

(1) When 1920×1080 is Selected as Resolution for Display of Playlist Menu

In this case, the resolution initialization information in the terminal management table of the operation mode object should be set to 1920×1080. Also, the display rate initialization information should be set to 23.976 Hz. This is because there is no choice other than the display rate of 23.976 Hz with respect to the resolution of 1920×1080.

When the combination of a display rate and a resolution has been specified as described above, a blackout period for the resolution and display rate to be set to the specified ones occurs when a title is selected on the top menu. However, when a playlist of 1920×1080/23.976 Hz is selected on the playlist menu, a blackout for the display rate to be switched does not occur. Accordingly, it is possible to reduce the number of occurrences of blackouts to one when a playlist of 1920×1080/23.976 Hz is selected.

In contrast, when a playlist of 1280×720/59.94 Hz or 1280×720/50 Hz is selected on the playlist menu, the blackout occurs twice.

(2) When 1280×720 is Selected as Resolution for Display of Playlist Menu

In this case, the resolution initialization information in the terminal management table of the operation mode object should be set to 1280×720, and the display rate initialization information should be set to either 59.94 Hz or 50 Hz.

(2-1) Suppose that the display rate is set to 59.94 Hz. In this case, the blackout period for the resolution and display rate to be set does not occur when a title is selected on the top menu. This is because the resolution and the display rate of the first play title match the resolution and the display rate specified in the playlist menu. Also, the blackout period for the display rate to be switched does not occur when a playlist of 1280×720/59.94 Hz is selected on the playlist menu. Thus it is possible to reduce the number of occurrences of blackouts to zero. On the other hand, when a playlist of 1920×1080/23.976 Hz or 1280×720/50 Hz is selected on the playlist menu, the blackout occurs once during a period in which the playback of the playlist menu transfers to the playback of the playlist.

(2-2) Suppose that the display rate initialization information is set to 50 Hz. In this case, the blackout period for the resolution and display rate to be set occurs when a title is selected on the top menu. On the other hand, when a playlist of 1280×720/50 Hz is selected on the playlist menu, the blackout does not occur during a period in which the playback of the playlist menu transfers to the playback of the playlist. Accordingly, the blackout occurs only once when a playlist of 50 Hz is selected.

On the other hand, when a playlist of 1920×1080/23.976 Hz or 1280×720/59.94 Hz is selected on the playlist menu, the blackout occurs during a period in which the playback of the playlist menu transfers to the playback of the playlist. Accordingly, in this case, the blackout occurs twice.

In summary, when the resolution and the display rate of the first play title match the resolution and the display rate of the playlist to be played back actually, it is possible to restrict the number of occurrences of blackouts to zero by selecting the resolution as the resolution of the playlist menu, and writing the resolution and the display rate into the resolution initialization information and the display rate initialization information in the terminal management table of the operation mode object.

When the resolution and the display rate of the first play title do not match the resolution and the display rate of the playlist to be played back actually, it is possible to restrict the number of occurrences of blackouts to one by selecting the resolution of the playlist to be played back actually as the resolution of the playlist menu, and writing the resolution and the display rate of the playlist to be played back actually into the resolution initialization information and the display rate initialization information in the terminal management table of the operation mode object.

With this arrangement, the blackout occurs twice only when the resolution and the display rate of the first play title do not match the resolution and the display rate of the playlist to be played back actually, and the display rate of the playlist to be played back actually is different from the display rate specified in the display rate initialization information in the terminal management table. That is to say, it is possible to reduce the number of occurrences of blackouts by writing the resolution and the display rate of the playlist to be played back actually into the resolution initialization information and the display rate initialization information in the terminal management table, and selecting the resolution of the playlist to be played back actually as the resolution of the GUI.

In this way, since, in the 3D display mode, the number of display rates that can be adopted is limited, even if there are a plurality of playlists to be played back, it is possible to reduce the number of occurrences of blackouts to one or zero by writing the display rate of any of the plurality of playlists into the terminal management table.

The following describes in detail the structure of the operation mode object and the operation of the platform unit using the operation mode object.

It should be noted here that the operation mode object of the present embodiment additionally includes application cache information and a key interest table.

Figure 11:
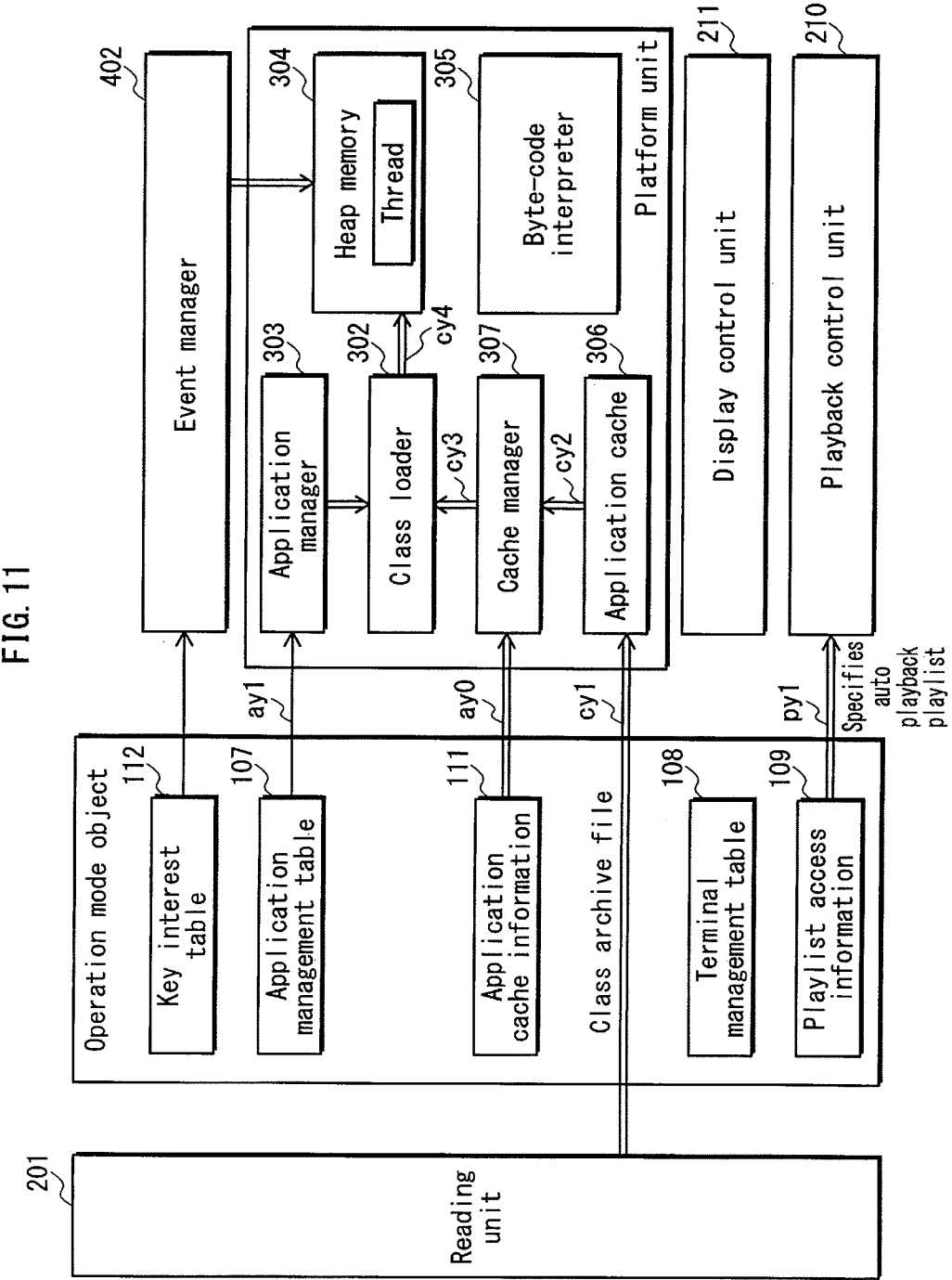
FIG. 11 shows the operation mode object in which application cache information 111 and a key interest table 112 have been added, and the structural elements (application cache 306, cache manager 307, and event manager 402) for processing the application cache information 111 and the key interest table 112.

FIG. 11 shows the operation mode object in which application cache information 111 and a key interest table 112 have been added, and the structural elements (application cache 306, cache manager 307, and event manager 402) for processing the application cache information 111 and the key interest table 112.

The above-mentioned application cache information is processed by the cache manager 307. Also, the key interest table is processed by the event manager 402. The following describes these structural elements.

The application cache information 111 is information that indicates, when a title corresponding to the operation mode object has become the current title, which files of applications should be read into the application cache 306 in the platform before the AV playback of the title is started. The application cache information 111 includes a plurality of entries which each are assigned with a rank so that the application cache information 111 can instruct the playback device to read an application corresponding to an entry with the highest rank first into the cache in the platform, and then to read the remaining applications into the cache in sequence in the same manner in the descending order of the rank until the cache becomes full.

The application cache 306 is a cache memory for storing the class archive file 102.

The cache manager 307 stores into the application cache 306 a class archive file 102 that, in the application cache information 111 of the current operation mode object, is specified to be stored into the cache. With this structure, when an application corresponding to the class archive file 102 is called, a high-speed class loading is performed using the class loader 302.

The arrows cy1 through cy4 shown in the drawing indicate the structural elements which the class archive file 102 passes through. As shown in FIG. 11, the class archive file 102 passes through the application cache 306 and then the cache manager 307 to reach the class loader 302, and the class loader 302 generates an instance of the class file in the heap memory 304. The arrow ay0 indicates a reference of the application cache information 111. As shown in FIG. 11, the application cache information 111 in this process is used for the class archive file 102 to be stored into the application cache 306. The arrow ay1 indicates a reference of the application management table. As shown in FIG. 11, the application management table is used so that the application manager 303 generates an instance of the class file in the heap memory 304. The arrow py1 indicates a reference of the playlist access information. That is to say, when the auto playback playlist has been specified, playlist information constituting the playlist specified as the auto playback playlist is read from the recording medium.

Figure 12:
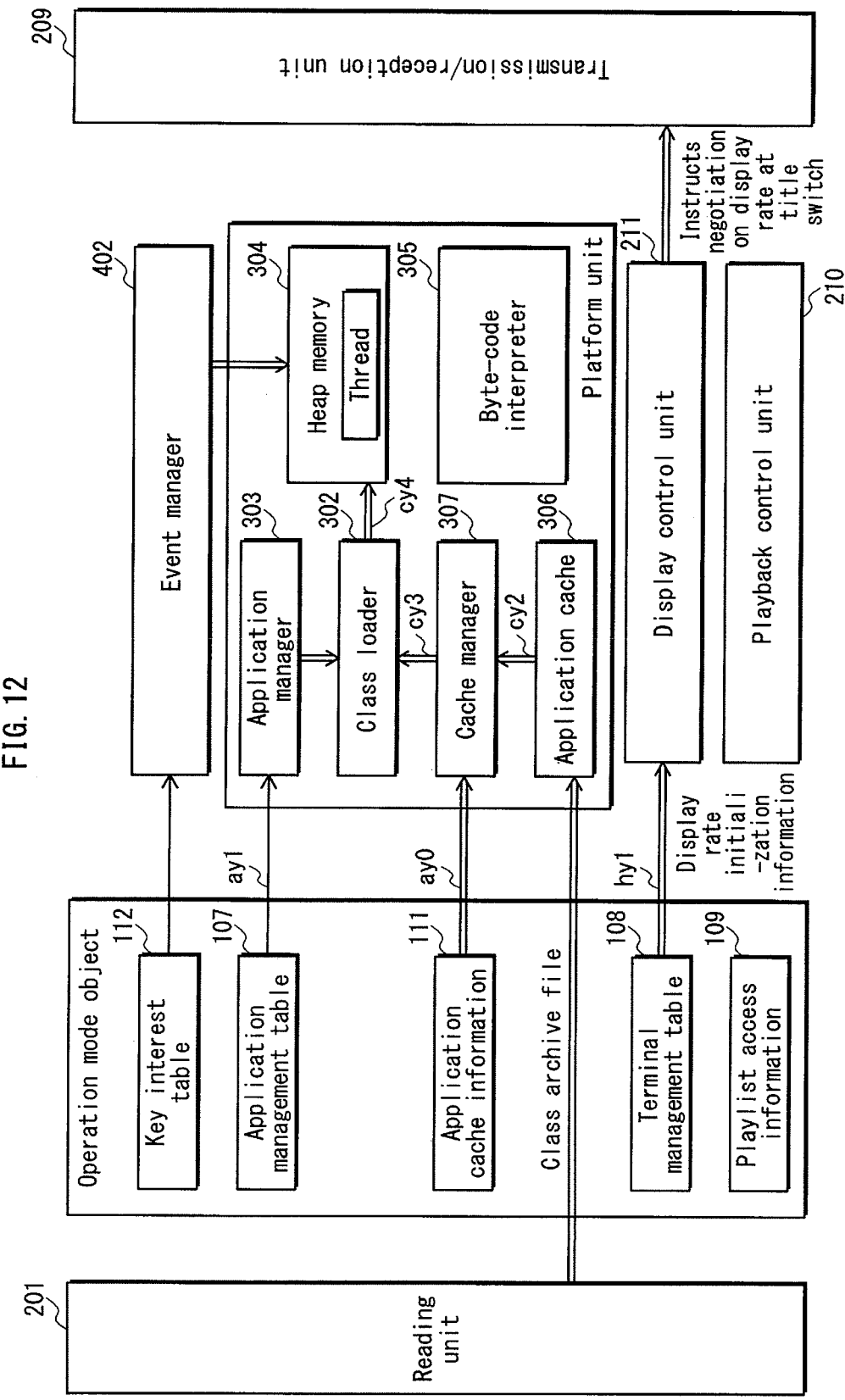
FIG. 12 shows a structure for the case where the auto playback playlist is not specified.

FIG. 11 shows the case where the auto playback playlist has been specified, whereas FIG. 12 shows the case where the auto playback playlist has not been specified. The arrow hy1 indicates a reference of the display rate initialization information. As indicated by the arrows cy2, cy3, and cy4 in FIG. 12, the display rate is initialized at the same time as the byte code application of the class archive file 102 is loaded via the application cache 306, the class loader 302, and the heap memory 304. Thus creation of the drawing image by the application is performed substantially at the same time as the initialization of the display rate.

As described above, according to the present embodiment, combinations of a "resolution" and a "display rate" are written in the terminal management table in advance, wherein the resolution is used in the GUI display by the byte code application based on the non-AV playback, and the display rate is applied to the playback of the video stream in the playlist. Then when the current title is switched, the display device is initialized based on the combinations of a "resolution" and a "display rate" written in the terminal management table. This enables the "initialization of resolution" and a "initialization of display rate" at once, wherein the "initialization of resolution" is performed for the GUI display to be performed by the byte code application based on the non-AV playback, and the "initialization of display rate" is performed for the video stream in the playlist to be played back. With this structure, it is possible to reduce the number of occurrences of blackouts when instructing the display device to initialize the resolution or display rate.

(Embodiment 2)

Embodiment 2 discloses the correspondence with the display capabilities. That is to say, in a playback device supporting the stereoscopic playback, the display capabilities of the display device are indicated in the player setting register. Thus the display rate initialization information disclosed in Embodiment 1 can be applied to realize an improvement that a display rate for use in the initialization is selected depending on whether or not the display rates in the display capabilities are available. The present embodiment is aimed to enhance the embodiments of the present invention included in the present application by encompassing the possibility of such improvement.

The present embodiment relates to an improvement that the display rate is initialized in accordance with the stereoscopic display capabilities of the display device.

The stereoscopic display capabilities are indicated in the stereoscopic display capability register. The stereoscopic display capability register is one of the player setting registers in the register set, and indicates whether or not the display device can process the display rate of 23.976 Hz at the resolution of 1920×1080, and whether the display device can process the display rate of 59.94 Hz or 50 Hz at the resolution of 1280×720.

The stereoscopic display capability register indicating the stereoscopic display capabilities is one of the registers in the register set, and is 32-bit long.

The least significant bit (b0) of the stereoscopic display capability register, when set to "0", indicates that the TV system connected thereto does not have a capability to display a 1920×1080/23.976 Hz progressive video or a 1920×1080/59.94 Hz progressive video.

The least significant bit (b0) of the stereoscopic display capability register, when set to "1", indicates that the TV system connected thereto has a capability to display the 1920×1080/23.976 Hz progressive video or the 1920×1080/59.94 Hz progressive video.

The first bit (b1) of the stereoscopic display capability register, when set to "0", indicates that the TV system connected thereto does not have a capability to display a 1280×720/50 Hz progressive video; and when set to "1", indicates that the TV system connected thereto has a capability to display the 1280×720/50 Hz progressive video.

The second bit (b2) of the stereoscopic display capability register, when set to "0", indicates that the TV system connected thereto requires for the user to use glasses to view the stereoscopic output mode; and when set to "1", indicates that the TV system connected thereto does not require for the user to use glasses to view the stereoscopic output mode.

This completes the explanation of the stereoscopic display capability register. Next, improvements of the display rate initialization information and the display control unit 211 in the present embodiment will be described.

A plurality of frequencies are written in the display rate initialization information, and the display control unit 211 selects a frequency, from the plurality of frequencies, that matches the stereoscopic display capabilities of the display device, the selected frequency being used in the initialization. The plurality of frequencies written in the display rate initialization information are assigned with respective priorities. For example, the priorities are assigned as follows: the first priority is 23.976 Hz; the second priority is 59.94 Hz; and the third priority is 50 Hz.

When there are, among the plurality of frequencies written in the display rate initialization information, two or more frequencies that match the stereoscopic display capabilities of the display device, the playback device uses a frequency with the highest priority among the two or more frequencies, in the initialization.

Figure 13:
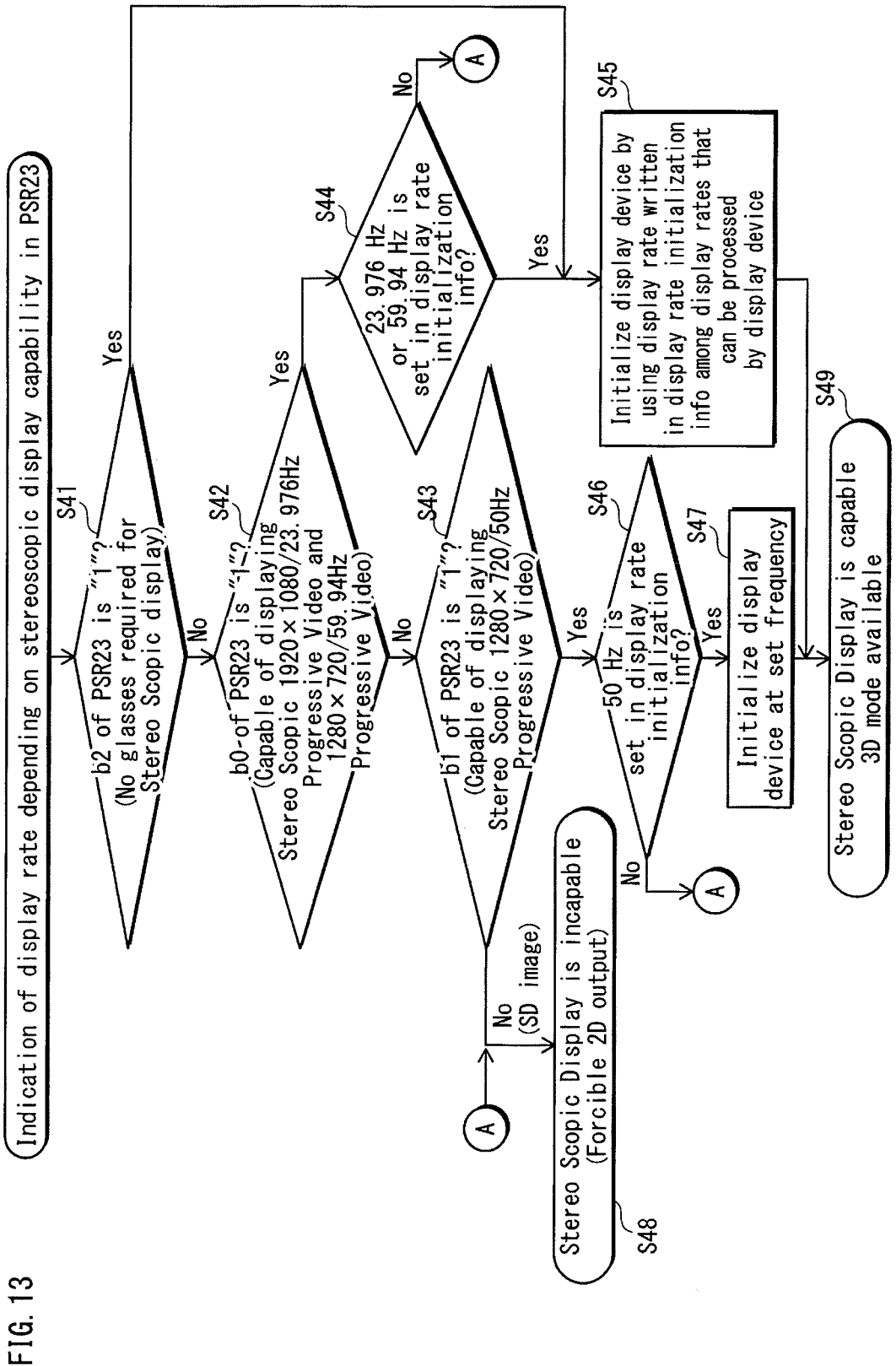
FIG. 13 is a flowchart showing the procedure of judging the stereoscopic display capability based on the stereoscopic display capability register.

FIG. 13 is a flowchart showing the procedure of judging the stereoscopic display capability based on the stereoscopic display capability register. In this flowchart, it is determined to initialize the display rate for the stereoscopic playback or to output for the 2D playback, according to the results of judgments performed in steps S41 through S43. In step S41, it is judged whether or not bit "b2" of the stereoscopic display capability register is "1". In step S42, it is judged whether or not bit "b0" of the stereoscopic display capability register is "1". In step S43, it is judged whether or not bit "b1" of the stereoscopic display capability register is "1". When it is judged that bit "b2" of the stereoscopic display capability register is "1" in step S41, it means that no glasses are required for viewing the stereoscopic display. Thus when it is judged so in step S41, the control goes to step S45 bypassing steps S42 and S43, and in step S45, the display device is initialized by using the frequency written in the display rate initialization information. This is because a display device on which the stereoscopic display can be viewed without glasses is a display device dedicated to the stereoscopic display, and on the dedicated display device, the stereoscopic playback is provided regardless of the resolution.

When it is judged that bit "b0" of the stereoscopic display capability register is "1" in step S42, it means that the stereoscopic playback at 1920×1080/23.976 Hz or at 1920×1080/59.94 Hz is available. Accordingly, even if it is judged No in step S41, the control goes to step S44 if it is judged Yes in step S42. In step S44, it is judged whether or not 23.976 Hz or 59.94 Hz is set in the display rate initialization information. When either one is set in the display rate initialization information (Yes in step S44), the display device is initialized by using the display rate written in the display rate initialization information among the display rates that can be processed by display device (step S45).

When it is judged that bit "b1" of the stereoscopic display capability register is "1" in step S43, it means that the stereoscopic playback at 1280×720/50 Hz is available although the stereoscopic playback at 1920×1080/23.976 Hz or 1920×1080/59.94 Hz is not available. When it is judged No in steps S41 and S42, and Yes in step S43, the control proceeds to step S46 in which it is judged whether or not 50 Hz is set in the display rate initialization information. When it is judged that 50 Hz is not set in the display rate initialization information, the display mode switches to the 2D display mode.

When it is judged that bit "b0" or "b1" of the stereoscopic display capability register is "0", it means that the image is a standard quality (SD) image. When it is judged No in step S46, it means that the stereoscopic playback is not available, and thus the 2D output is performed forcibly.

This is because, with the SD image, it is impossible to realize a stereoscopic playback with a sufficient quality.

As described above, according to the present embodiment, an appropriate display rate is indicated to the display device depending on the stereoscopic display capabilities of the display device. Therefore the display rate at switching between titles always matches the display rate during the playback of the playlist.

(Embodiment 3)

Embodiment 3 discloses the correspondence between the resolution and initialization of the display rate. That is to say, in the stereoscopic playback, there is a limited number of display capabilities for each resolution supported by the display device. Thus the display rate initialization information disclosed in Embodiment 1 can be applied to realize an improvement that a display rate for use in the initialization is selected depending on the resolution supported by the display device. The present embodiment is aimed to enhance the embodiments of the present invention included in the present application by encompassing the possibility of such improvement.

It is presumed here that when the resolution to be initialized is 1920×1080, then the display rate should be set to 23.976 Hz, with no other choices. On the other hand, when the resolution to be initialized is 1280×720, the display rate should be set to either 59.94 Hz or 50 Hz. To set both the resolution and the display rate, what display capabilities the display device has becomes the question. In view of this, in the present embodiment, a display rate is selected in accordance with the resolution supported by the display device.

Figure 14:
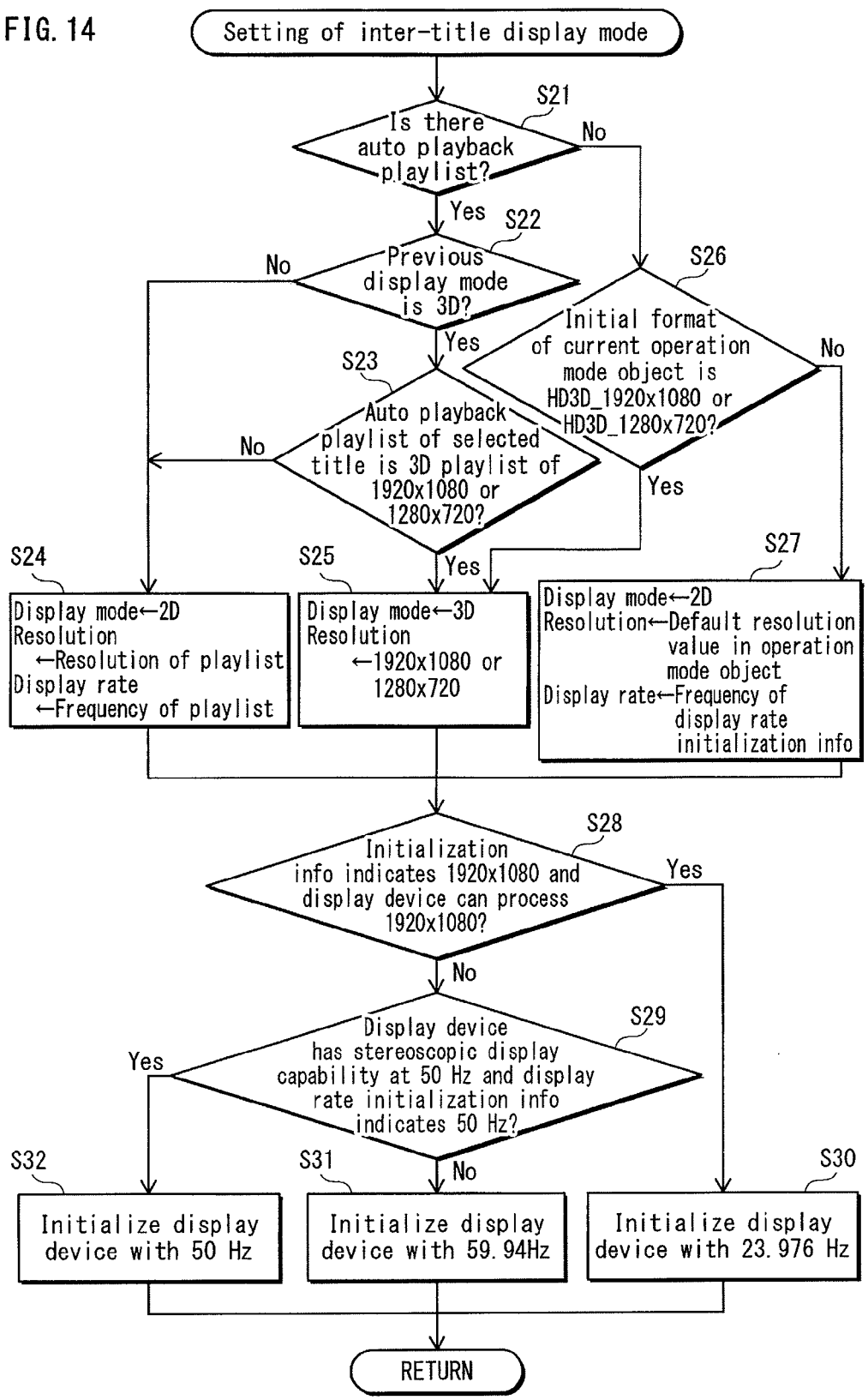
FIG. 14 is a flowchart showing one example of the procedure for setting the display mode when the title is switched.

FIG. 14 is a flowchart showing one example of the procedure for setting the display mode when the title is switched. Note that in this flowchart, any of steps S24, S25, and S27 is performed selectively depending on the results of the judgments performed in steps S21, S22, S23, and S26.

In step S21, it is judged whether or not there is an auto playback playlist. In step S22, it is judged whether or not the previous display mode is 3D. In step S23, it is judged whether or not the auto playback playlist of the selected title is a 3D playlist of 1920×1080 or a 3D playlist of 1280×720.

When it is judged in step S21 that there is no auto playback playlist, it is judged in step S26 whether or not the initial format of the operation mode object is HD3D_1920×1080 or HD3D_1280×720. When it is judged No in step S26, the control goes to step S27 in which the display mode is set to 2D, the resolution is set to the default resolution value in the operation mode object, and the display rate is set to the frequency of the display rate initialization information in the operation mode object.

When it is judged Yes in step S23 or S26, the control goes to step S26 in which the display mode is set to 3D, and the resolution is set to 1920×1080 or 1280×720 in accordance with the default resolution in the operation mode object. This is followed by the judgments in steps S28 and S29.

In step S28, it is judged whether or not the display rate initialization information indicates a resolution 1920×1080 and it is set in the display capability register that the display device can process the resolution 1920×1080. When it is judged Yes in step S28, the control goes to step S30 in which the display rate is set to 23.976 Hz. This is because, when the display device can process the resolution 1920×1080, namely, when the display device is full hi-vision, there is no other display rate other than 23.976 Hz to be supported by the display device. When it is judged No in step S28, namely, judged that the resolution is 1280×720, the control goes to step S29.

In step S29, it is judged whether or not the display device has the stereoscopic display capability at 50 Hz and the display rate initialization information in the current operation mode object indicates 50 Hz.

When it is judged No in step S29, the display rate is set to 59.94 Hz (step S31). When it is judged Yes in step S29, the display rate is set to 50 Hz (step S32).

When it is judged Yes in step S21 that there is an auto playback playlist, the control moves to step S22 in which it is judged whether or not the previous display mode is 3D, and when it is judged Yes, the control moves to step S23 in which it is judged whether or not the auto playback playlist of the selected title is a 3D playlist of 1920×1080 or a 3D playlist of 1280×720. When it is judged No in step S22 or S23, the control moves to step S24 in which the display mode is set to 2D, the resolution is set to the resolution of the auto playback playlist, and the display rate is set to the frequency of the playlist.

When it is judged Yes in step S22 and then Yes in step S23, the control moves to step S25 in which the display mode is set to 3D, and the resolution is set to either 1920×1080 or 1280×720 in accordance with the resolution of the auto playback playlist.

(Embodiment 4)

Embodiment 4 is directed to a recording medium or a recording device. Since the present application adopts a concept that the display rate at the start of a title is determined from the display rate of the playlist, the concept can be considered as a characteristic of a recording medium or a recording device.

The present embodiment is aimed to enhance the embodiments of the present invention by encompassing the possibility of improvement of implementing the recording device or recording method with the characteristic that the display rate at the start of a title is determined from the display rate of the playlist.

The recording method mentioned here includes a method for creating, namely producing, any of the recording mediums described in the embodiments so far.

That is to say, the recording method of the present embodiment includes not only the above-described real-time recording in which files are generated in real time, and are written into the recording area of the disc medium, but also a preformat recording in which bit streams to be recorded into the volume area are generated in advance, a master disc is generated based on the bit streams, and the master disc is pressed, thereby making possible a mass production of the disc medium. The recording method of the present embodiment is applicable to either the real-time recording or the pre-format recording.

The recording device of the present embodiment implements the invention of the above recording method. The following describes the processing procedure of the recording method for generating the display rate initialization information and recording it on a recording medium.

Figure 15:
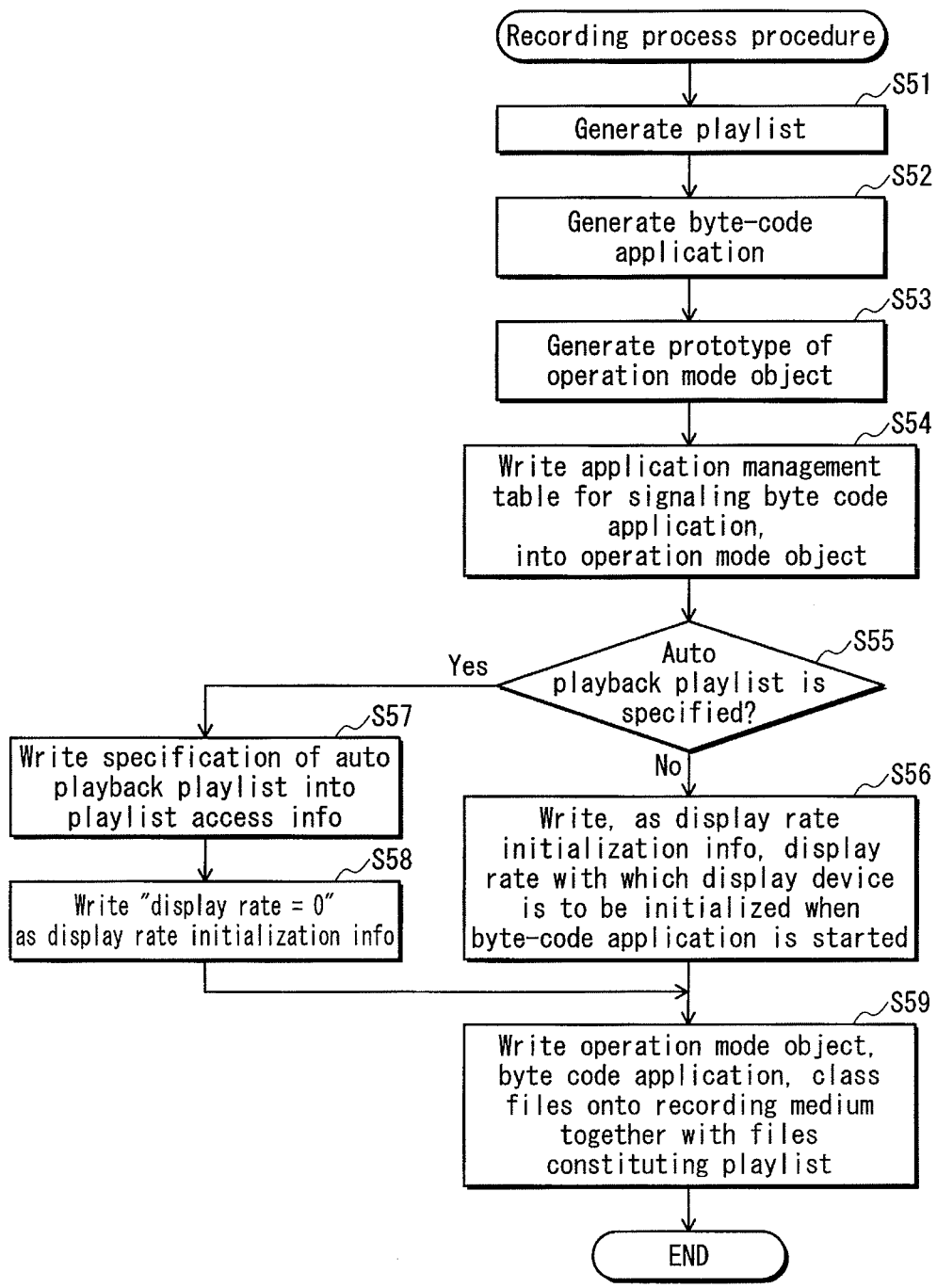
FIG. 15 is a flowchart showing the procedure of the recording method.

FIG. 15 is a flowchart showing the procedure of the recording method. In step S51, the playlist is generated. In step S52, the byte code application is generated. In step S53, the prototype of the operation mode object is generated. In step S54, the application management table for signaling the byte code application is written into the operation mode object. In step S55 it is judged whether or not the auto playback playlist has been specified.

When it is judged that the auto playback playlist has not been specified (No in step S55), a display rate, with which the display device is to be initialized when the byte-code application is started, is written into the display rate initialization information in the terminal management table (step S56). When it is judged that the auto playback playlist has been specified (Yes in step S55), the specification of the auto playback playlist is written into the playlist access information (step S57), and "display rate=0" is written as the display rate initialization information (step S58).

After this, the operation mode object, byte code application, class files are written onto the recording medium together with the files constituting the playlist (step S59).

When the playlist selection menu provides a plurality of playlists for selection and the playlists have different display rates, a display rate among 23.976 Hz, 59.94 Hz, and 50 Hz that is used by the largest number of playlists is written into the display rate initialization information in advance. In this case, when a playlist with a display rate different from the display rate written in the display rate initialization information is selected, a blackout period occurs even after a playlist is selected on the playlist menu. Therefore it is preferable that the correspondence between playlists and operation mode objects is defined in the authoring stage so that one title includes playlists having the same display rate, among the plurality of playlists. As the embodiment of the recording device, the recording device 700 shown in FIG. 1 is caused to execute the recording method shown in the flowchart of FIG. 15.

(Supplementary Notes)

To Embodiments 1 through 4 described above, further improvements or changes can be added regarding the following technical topics. Whether to select any of the embodiments or the improvements and changes to implement the invention is optional and may be determined by the subjectivity of the implementer.

(Stereoscopic Viewing Methods)

According to the parallax image method used in each Embodiment, the left-eye and right-eye images are displayed alternately in the time axis direction. As a result, for example, when 24 images are displayed per second in a normal two dimensional movie, 48 images, for the combination of the left-eye and right-eye images, should be displayed per second in a three dimensional movie. Accordingly, this method is suitable for display devices that rewrite each screen at relatively high speeds. The stereoscopic viewing using the parallax images is used in the play equipment of the amusement parks, and has been established technologically. Therefore, it may be said that this method is closest to the practical use in the homes. There have been proposed various other technologies such as the two-color separation method, as the methods for realizing stereoscopic viewing using the parallax images. In the embodiments, the sequential segregation method and the polarization glasses method have been used as examples. However, the present invention is not limited to these methods as far as the parallax images are used.

Also, not limited to the lenticular lens, the television 400 may use other devices, such as the liquid crystal element, that have the same function as the lenticular lens. It is further possible to realize the stereoscopic viewing by providing a vertical polarization filter for the left-eye pixels, and providing a horizontal polarization filter for the right-eye pixels, and causing the viewer to view the screen through a pair of polarization glasses that is provided with a vertical polarization filter for the left eye and a horizontal polarization filter for the right eye.

(Embodiments of Program)

The application program described in each embodiment of the present invention can be produced as follows. First, the software developer writes, using a programming language, a source program that achieves each flowchart and functional component. In this writing, the software developer uses the class structure, variables, array variables, calls to external functions, and so on, which conform to the sentence structure of the programming language he/she uses.

The written source program is sent to the compiler as files. The compiler translates the source program and generates an object program.

The translation performed by the compiler includes processes such as the syntax analysis, optimization, resource allocation, and code generation. In the syntax analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

The generated object program is composed of one or more program codes that cause the computer to execute each step in the flowchart or each procedure of the functional components. There are various types of program codes such as the native code of the processor, and Java™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program described here may be recorded on a computer-readable recording medium, and may be provided to the user in this form.

(Variations of Recording Medium)

The recording medium described in each Embodiment indicates a general package medium as a whole, including the optical disc and the semiconductor memory card. In each Embodiment, it is presumed, as one example, that the recording medium is an optical disc in which necessary data is preliminarily recorded (for example, an existing read-only optical disc such as the BD-ROM or DVD-ROM). However, the present invention is not limited to this. For example, the present invention may be implemented as follows: (i) obtain a 3D content that includes the data necessary for implementing the present invention and is distributed by a broadcast or via a network; (ii) record the 3D content into a writable optical disc (for example, an existing writable optical disc such as the BD-RE, DVD-RAM) by using a terminal device having the function of writing into an optical disc (the function may be embedded in a playback device, or the device may not necessarily be a playback device); and (iii) apply the optical disc recorded with the 3D content to the playback device of the present invention.

(Embodiments of Semiconductor Memory Card Recording Device and Playback Device)

The following describes embodiments of the recording device for recording the data structure of each Embodiment into a semiconductor memory, and the playback device for playing back thereof.

First, the mechanism for protecting the copyright of the data recorded on the BD-ROM will be explained, as a presupposed technology.

Some of the data recorded on the BD-ROM may have been encrypted as necessitated in view of the confidentiality of the data.

For example, the BD-ROM may contain, as encrypted data, the data corresponding to a video stream, an audio stream, or a stream including these.

The following describes decryption of the encrypted data among the data recorded on the BD-ROM.

The semiconductor memory card playback device preliminarily stores data (for example, a device key) that corresponds to a key that is necessary for decrypting the encrypted data recorded on the BD-ROM.

On the other hand, the BD-ROM is preliminarily recorded with (i) data (for example, a medium key block (MKB) corresponding to the above-mentioned device key) that corresponds to a key that is necessary for decrypting the encrypted data, and (ii) encrypted data (for example, an encrypted title key corresponding to the above-mentioned device key and MKB) that is generated by encrypting the key itself that is necessary for decrypting the encrypted data. Note here that the device key, MKB, and encrypted title key are treated as a set, and are further associated with an identifier (for example, a volume ID) written in an area (called BCA) of the BD-ROM that cannot be copied in general. It is structured such that encrypted data cannot be decrypted if these elements are combined incorrectly. Only if the combination is correct, a key (for example, a title key that is obtained by decrypting the encrypted title key by using the above-mentioned device key, MKB, and volume ID) that is necessary for decrypting the encrypted data can be derived. The encrypted data can be decrypted by using the derived key.

When a playback device attempts to play back a BD-ROM loaded in the device, it cannot play back the encrypted data unless the device itself has a device key that makes a pair (or corresponds to) the encrypted title key and MKB recorded on the BD-ROM. This is because the key (title key) that is necessary for decrypting the encrypted data has been encrypted, and is recorded on the BD-ROM as the encrypted title key, and the key that is necessary for decrypting the encrypted data cannot be derived if the combination of the MKB and the device key is not correct.

Conversely, when the combination of the encrypted title key, MKB, device key, and volume ID is correct, the video stream and audio stream are decoded by the decoder with use of the above-mentioned key (for example, a title key that is obtained by decrypting the encrypted title key by using the device key, MKB, and volume ID) that is necessary for decrypting the encrypted data. The playback device is structured in this way.

This completes the description of the mechanism for protecting the copyright of the data recorded on the BD-ROM. It should be noted here that this mechanism is not limited to the BD-ROM, but may be applicable to, for example, a readable/writable semiconductor memory (such as a portable semiconductor memory such as the SD card) for the implementation.

Next, the playback procedure in the semiconductor memory card playback device will be described. In the case in which the playback device plays back an optical disc, it is structured to read data via an optical disc drive, for example. On the other hand, in the case in which the playback device plays back a semiconductor memory card, it is structured to read data via an interface for reading the data from the semiconductor memory card.

More specifically, the playback device may be structured such that, when a semiconductor memory card is inserted into a slot (not illustrated) provided in the playback device, the playback device and the semiconductor memory card are electrically connected with each other via the semiconductor memory card interface, and the playback device reads out data from the semiconductor memory card via the semiconductor memory card interface.

The following describes the operation for recording data recorded on the recording medium 100 onto a semiconductor memory as distribution data by using, for example, an electronic distribution, wherein the data to be recorded is a part (for example, data for updating the data necessary for the playback) or all of the data (for example, video stream, audio stream, subtitle data, background image, GUI, application, and application management table) corresponding to the original contents recorded on the recording medium 100, or additional contents.

The above-mentioned operation may be structured so that the playback device explained in the Embodiment can perform the recording onto the semiconductor memory, or so that a dedicated terminal device (not the playback device explained in the Embodiment) for storing the distribution data onto the semiconductor memory can perform the recording. Here, a case where the playback device is used will be explained. Also, in this explanation, an SD card is used as the recording-destination semiconductor memory.

When the playback device is to record distribution data into an SD memory card inserted in a slot provided therein, the playback device first send requests a distribution server (not illustrated) that stores distribution data, to transmit the distribution data. In so doing, the playback device reads out identification information for uniquely identifying the inserted SD memory card (for example, identification information uniquely assigned to each SD memory card, more specifically, the serial number or the like of the SD memory card), from the SD memory card, and transmits the read identification information to the distribution server together with the distribution request.

The identification information for uniquely identifying the SD memory card corresponds to, for example, the volume ID having been described earlier.

On the other hand, the distribution server stores necessary data (for example, video stream, audio stream and the like) in an encrypted state such that the necessary data can be decrypted by using a predetermined key (for example, a title key).

The distribution server, for example, holds a private key so that it can dynamically generate different pieces of public key information respectively in correspondence with identification numbers uniquely assigned to each semiconductor memory card.

Also, the distribution server is structured to be able to encrypt the key (title key) itself that is necessary for decrypting the encrypted data (that is to say, the distribution server is structured to be able to generate an encrypted title key).

The generated public key information includes, for example, information corresponding to the above-described MKB, volume ID, and encrypted title key. With this structure, when, for example, a combination of the identification number of the semiconductor memory card, the public key contained in the public key information which will be explained later, and the device key that is preliminarily recorded in the playback device, is correct, a key (for example, a title key that is obtained by decrypting the encrypted title key by using the device key, the MKB, and the identification number of the semiconductor memory) necessary for decrypting the encrypted data is obtained, and the encrypted data is decrypted by using the obtained necessary key (title key).

Following this, the playback device records the received piece of public key information and distribution data into a recording area of the semiconductor memory card being inserted in the slot thereof.

Next, a description is given of an example of the method for decrypting and playing back the encrypted data among the data contained in the public key information and distribution data recorded in the recording area of the semiconductor memory card.

The received public key information stores, for example, a public key (for example, the above-described MKB and encrypted title key), signature information, identification number of the semiconductor memory card, and device list being information regarding devices to be invalidated.

The signature information includes, for example, a hash value of the public key information.

The device list is, for example, information for identifying the devices that might be played back in an unauthorized manner. The information, for example, is used to uniquely identify the devices, parts of the devices, and functions (programs) that might be played back in an unauthorized manner, and is composed of, for example, the device key and the identification number of the playback device that are preliminarily recorded in the playback device, and the identification number of the decoder provided in the playback device.

The following describes playing back the encrypted data among the distribution data recorded in the recording area of the semiconductor memory card.

First, it is checked whether or not the decryption key itself can be used, before the encrypted data is decrypted by using the decryption key.

More specifically, the following checks are conducted.
(1) A check on whether the identification information of the semiconductor memory card contained in the public key information matches the identification number of the semiconductor memory card preliminarily stored in the semiconductor memory card.
(2) A check on whether the hash value of the public key information calculated in the playback device matches the hash value included in the signature information.
(3) A check, based on the information included in the device list, on whether the playback device to perform the playback is authentic (for example, the device key shown in the device list included in the public key information matches the device key preliminarily stored in the playback device).

These checks may be performed in any order.

After the above described checks (1) through (3), the playback device performs a control not to decrypt the encrypted data when any of the following conditions is satisfied: (i) the identification information of the semiconductor memory card contained in the public key information does not match the identification number of the semiconductor memory card preliminarily stored in the semiconductor memory card; (ii) the hash value of the public key information calculated in the playback device does not match the hash value included in the signature information; and (iii) the playback device to perform the playback is not authentic.

On the other hand, when all of the conditions: (i) the identification information of the semiconductor memory card contained in the public key information matches the identification number of the semiconductor memory card preliminarily stored in the semiconductor memory card; (ii) the hash value of the public key information calculated in the playback device matches the hash value included in the signature information; and (iii) the playback device to perform the playback is authentic, are satisfied, it is judged that the combination of the identification number of the semiconductor memory, the public key contained in the public key information, and the device key that is preliminarily recorded in the playback device, is correct, and the encrypted data is decrypted by using the key necessary for the decryption (the title key that is obtained by decrypting the encrypted title key by using the device key, the MKB, and the identification number of the semiconductor memory).

When the encrypted data is, for example, a video stream and an audio stream, the video decoder decrypts (decodes) the video stream by using the above-described key necessary for the decryption (the title key that is obtained by decrypting the encrypted title key), and the audio decoder decrypts (decodes) the audio stream by using the above-described key necessary for the decryption.

With such a structure, when devices, parts of the devices, and functions (programs) that might be used in an unauthorized manner are known at the time of the electronic distribution, a device list showing such devices and the like may be distributed. This enables the playback device having received the list to inhibit the decryption with use of the public key information (public key itself) when the playback device includes anything shown in the list. Therefore, even if the combination of the identification number of the semiconductor memory, the public key itself contained in the public key information, and the device key that is preliminarily recorded in the playback device, is correct, a control is performed not to decrypt the encrypted data. This makes it possible to prevent the distribution data from being used by an unauthentic device.

It is preferable that the identifier of the semiconductor memory card that is preliminarily recorded in the semiconductor memory card is stored in a highly secure recording area. This is because, when the identification number (for example, the serial number of the SD memory card) that is preliminarily recorded in the semiconductor memory card is tampered with, unauthorized copying becomes easy. More specifically, unique, although different identification numbers are respectively assigned to semiconductor memory cards, if the identification numbers are tampered with to be the same, the above-described judgment in (1) does not make sense, and as many semiconductor memory cards as tamperings may be copied in an unauthorized manner.

For this reason, it is preferable that information such as the identification number of the semiconductor memory card is stored in a highly secure recording area.

To realize this, the semiconductor memory card, for example, may have a structure in which a recording area for recording highly confidential data such as the identifier of the semiconductor memory card (hereinafter, the recording area is referred to as a second recording area) is provided separately from a recording area for recording regular data (hereinafter, the recording area is referred to as a first recording area), a control circuit for controlling accesses to the second recording area is provided, and the second recording area is accessible only through the control circuit.

For example, data may encrypted so that encrypted data is recorded in the second recording area, and the control circuit may be embedded with a circuit for decrypting the encrypted data. In this structure, when an access is made to the second recording area, the control circuit decrypts the encrypted data and returns decrypted data. As another example, the control circuit may hold information indicating the location where the data is stored in the second recording area, and when an access is made to the second recording area, the control circuit identifies the corresponding storage location of the data, and returns data that is read from the identified storage location.

An application, which is running on the playback device and is to record data onto the semiconductor memory card with use of the electronic distribution, issues, to the control circuit via a memory card interface, an access request requesting to access the data (for example, the identification number of the semiconductor memory card) recorded in the second recording area. Upon receiving the request, the control circuit reads out the data from the second recording area and returns the data to the application running on the playback device. It sends the identification number of the semiconductor memory card and requests the distribution server to distribute the data such as the public key information, and corresponding distribution data. The public key information and corresponding distribution data that are sent from the distribution server are recorded into the first recording area.

Also, it is preferable that the application, which is running on the playback device and is to record data onto the semiconductor memory card with use of the electronic distribution, preliminarily checks whether or not the application is tampered with before it issues, to the control circuit via a memory card interface, an access request requesting to access the data (for example, the identification number of the semiconductor memory card) recorded in the second recording area. For checking this, an existing digital certificate conforming to the X.509 standard, for example, may be used.

Also, the distribution data recorded in the first recording area of the semiconductor memory card may not necessarily be accessed via the control circuit provided in the semiconductor memory card.

(Embodiment 5)

Hereinafter, an invention that is identical with the invention described in the Description of the application claiming a priority of the present application is called "present invention", and the following describes an embodiment of the stereoscopic video playback device of the present invention. Firstly, of the implementation acts of the playback device, a usage act is described.

FIG. 16 shows a usage act of the stereoscopic video playback device of the present invention. In FIG. 16, the device of the present invention is the playback device 200. The playback device 200 is used to supply a stereoscopic movie work to a home theater system which is composed of, for example, a remote control 300, a display device 400, shutter glasses 500, and an HDMI cable 600. The audio and video are supplied by the playback device 200 to the display device 400 via the HDMI cable 600. The data to be transferred via the HDMI (High-Definition Multimedia Interface) is encrypted after a mutual authentication between the devices for the copyright protection. The HDCP (High-bandwidth Digital Content Protection) is used as the protocol for the mutual authentication and encryption.

Figure 17:
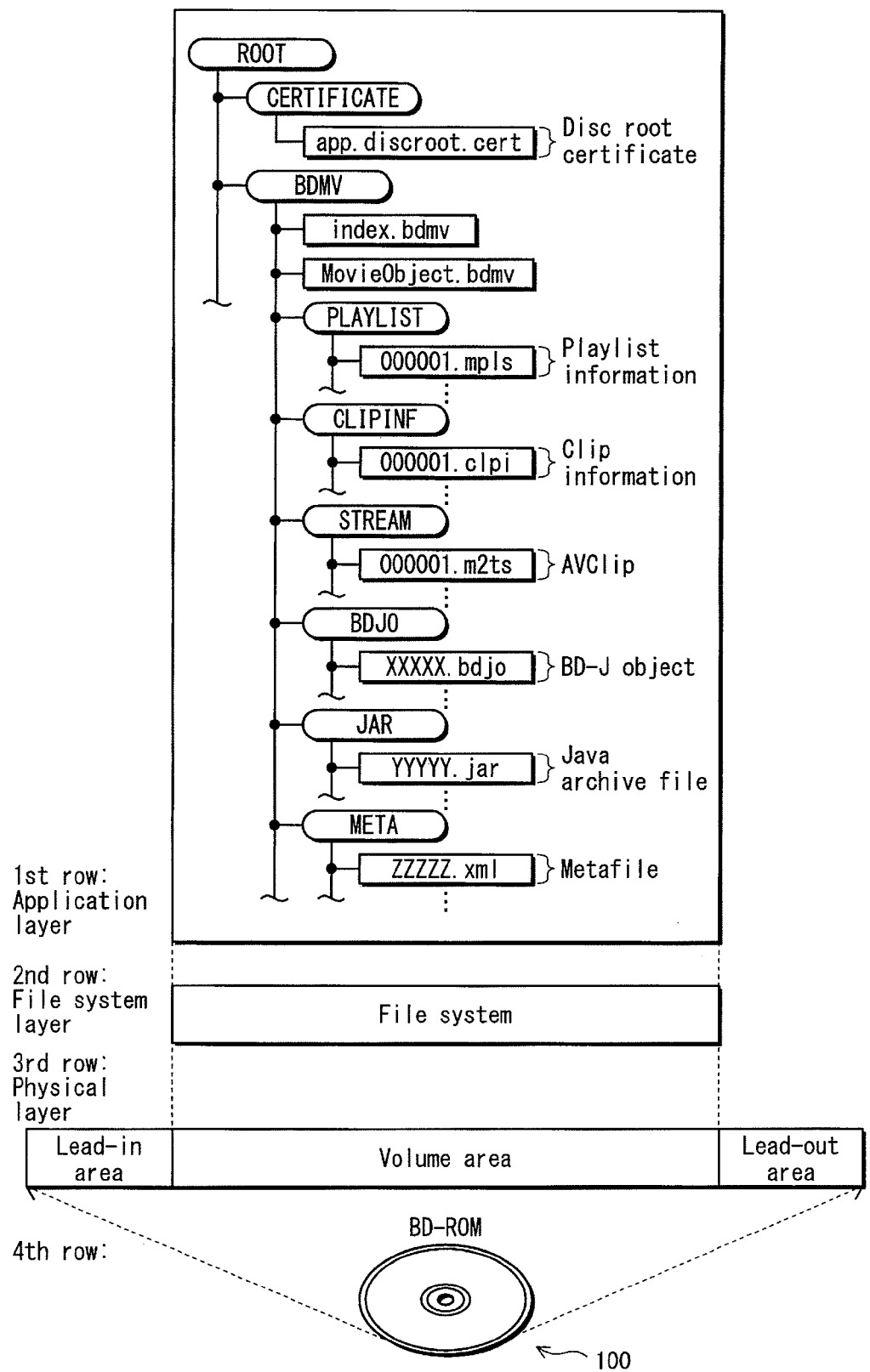
FIG. 17 shows the internal structure of the BD-ROM.

Next, the recording medium that is the target of playback by the playback device 200 will be described. The recording medium that is played back by the playback device 200 is a BD-ROM 100. FIG. 17 shows the internal structure of the BD-ROM 100.

The fourth row of FIG. 17 shows the BD-ROM. The third row shows a track on the BD-ROM. FIG. 17 shows the track in the horizontally extended state although it is actually formed spirally from the inner circumference to the outer circumference of the BD-ROM. The track is composed of a lead-in area, a volume area, and a lead-out area. A special area, called BCA (Burst Cutting Area), is provided inside the lead-in area. The BCA can be read only by the drive. Since the BCA cannot be read by an application, it is often used for copyright protection technologies, for example.

As shown in FIG. 17, the volume area has a layer model that is composed of a physical layer, a file system layer, and an application layer. In the volume area, application data such as image data is recorded starting with file system information (volume). The file system is, for example, the UDF or the ISO9660 that enables the logical data, which is recorded in the same manner as in an everyday PC (personal computer), to be read out with use of a directory/file structure. And it is possible to read out directory/file names of 255 characters. The first row of FIG. 17 shows the application layer format (application format) of the BD-ROM that is represented by the directory structure. As shown in the first row, the BD-ROM has the CERTIFICATE directory and the BDMV directory under the ROOT directory.

Under the CERTIFICATE directory, there is a file of a disc root certificate (app.discroot.cert). The file "app.discroot.cert" is a digital certificate that is used in a process (hereinafter referred to as "signature verification") in which, when a program of a Java™ application, which performs a dynamic scenario control by using a Java™ virtual machine, is executed, it is checked whether or not the application has been tampered with, and the authenticity of the application is checked.

The BDMV directory is a directory in which data such as AV content and management information used in the BD-ROM are recorded. Six sub-directories called "PLAYLIST directory", "CLIPINF directory", "STREAM directory", "BDJO directory", "JAR directory", and "META directory" exist below the BDMV directory. Also, two types of files (i.e. index.bdmv and MovieObject.bdmv) are arranged under the BDMV directory.

The STREAM directory is a directory storing a transport stream file. In the STREAM directory, a file with an extension "m2ts" ("000001.m2ts") exists.

In the PLAYLIST directory, a file with an extension "mpls" ("000001.mpls") exists.

In the CLIPINF directory, a file with an extension "clpi" ("000001.clpi") exists.

In the BDJO directory, a file with an extension "bdjo" ("XXXXX.bdjo") exists.

In the JAR directory, a file with an extension "jar" ("YYYYY.jar") exists.

In the META directory, an XML file ("ZZZZZ.xml") exists.

The following explains these files.

<AV Clip>

Firstly, files with the extension "m2ts" will be explained. The file attached with the extension "m2ts" is a digital AV stream in the MPEG-TS (Transport Stream) format. The digital AV stream is generated by multiplexing a video stream, one or more audio streams, a graphics stream and so on. The video stream represents the moving picture portion of the movie, and the audio stream represents the audio portion of the movie. In the case of the stream for 3D, a left-eye video stream and a right-eye video stream are prepared, and the left-eye data and the right-eye data are stored into the left-eye video stream and the right-eye video stream, respectively, and both the left-eye video stream and the right-eye video stream are assigned with the same "m2ts". To reduce the capacity for storing the streams, it is preferable to use such a codec (for example, MPEG-4, AVC, or MVC) that causes a mutual reference between the left-eye video stream and the right-eye video stream.

<PlayList Information>

A file attached with extension "mpls" is a file storing the PlayList (PL) information. The PL information is information that defines a playlist by referring to an AVClip. The playlist falls into two types: a playlist dedicated to 2D; and a playlist supporting both the 2D playback and the 3D playback. The playlist includes information indicating whether or not the 3D playback is available, and information indicating the resolution and frequency of the video.

<Clip Information>

A file attached with extension "clpi" is a file storing the clip information that corresponds to AVClips on a one-to-one basis. Since it is management information, the clip information includes information indicating the encoding format of the stream in the AVClip, frame rate, bit rate, resolution and the like, and EP map indicating the start position of the GOP. The clip information and the PL information described above are classified as "static scenarios".

<BD-J Object>

Next, the BD-J object is explained. A file attached with extension "bdjo" is a file storing the BD-J object. The BD-J object is information that defines a title by showing the correspondence between applications and AVClip sequences defined by the playlist information. The BD-J object includes "application management table", "reference values for playlist information", and "overlay information".

The "reference values for playlist information" indicates whether or not there is a playlist that is to be automatically played back at the same time as the corresponding title is started, and if there is, indicates the playlist information of the playlist. It is possible to use an application to control the playback of the playlist. However, the method has a problem that a time lag occurs before the application starts to be executed, and thus the playback of the playlist is delayed. The "reference values for playlist information" is often used to specifying a playlist to be automatically played back since it fastens the timing of starting the playback of the playlist. However, in the case where it is not determined which playlist should be played back until the application is executed (for example, in the case where the application selects a playlist in accordance with an input made by the user), it is possible to use the BD-J object including the "reference values for playlist information" that indicates that "there is no" playlist that is to be automatically played back.

The "overlay information" indicates how to overlay the planes used in the title.

The application management table is a list of information indicating applications whose life cycles are defined in units of titles.

The application management table includes application detail information which stores, for each application, a character sequence indicating the name of the target application, and "icon locator" that indicates the location of an icon associated with the target application. The icon locator indicates the address of an icon included in the Java™ archive file.

Next, Java™ applications written in the application management table will be described. Each Java™ application is composed of one or more xlet programs having been loaded into a heap memory (also called work memory) of a virtual machine. The application is constituted from the xlet programs having been loaded into the work memory, and data.

The substance of such a Java™ application is a Java™ archive file (YYYYY.jar) stored in the JAR directory under the BDMV directory, shown in FIG. 17.

<Metafile>

The metafile (ZZZZZ.xml) stored in the META directory stores various information concerning the movie work recorded on the disc. The metafile may store such information as a name and an image of the disc, information on the creator of the disc, and names of titles. Up to now, the BD-ROM 100 has been explained. The metafile is not an absolutely necessary file. Some BD-ROMs do not store the metafile.

This completes the explanation of the BD-ROM.

The following describes the playback device 200 in detail.

Figure 18:
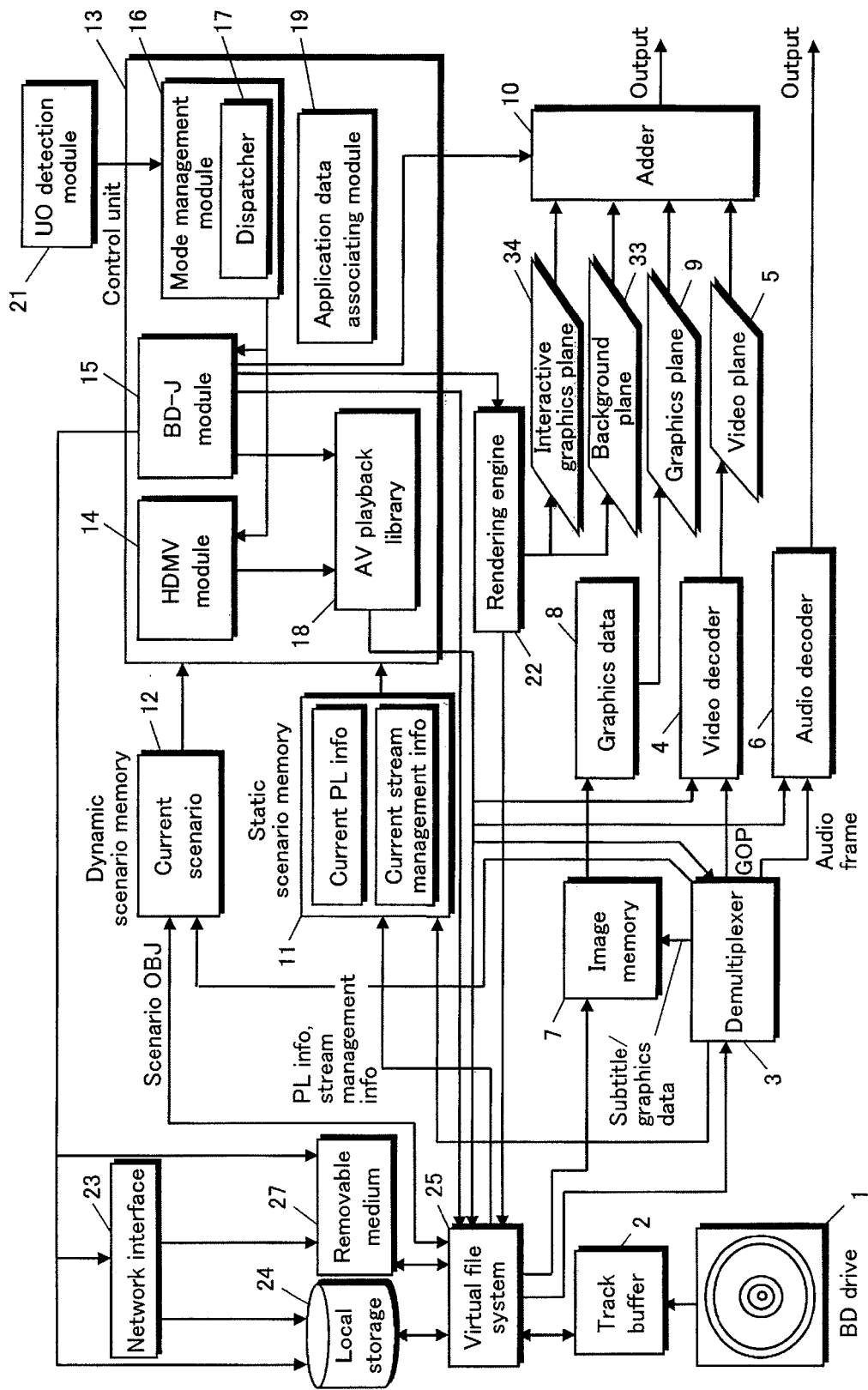
FIG. 18 is a block diagram showing the internal structure of the playback device.

FIG. 18 is a block diagram showing the internal structure of the playback device of the present embodiment. As shown in FIG. 18, the playback device includes a BD-ROM drive 1, a track buffer 2, a demultiplexer 3, a video decoder 4, a video plane 5, an audio decoder 6, an image memory 7, a graphics decoder 8, a graphics plane 9, an interactive graphics plane 34, a background plane 33, an adder 10, a static scenario memory 11, a dynamic scenario memory 12, a control unit 13, an HDMV module 14, a BD-J module 15, an UO detection module 21, a mode management module 16, a dispatcher 17, an AV playback library 18, an application data associating module 19, a network interface 23, a local storage 24, a virtual file system 25, and a removable medium 27.

The BD-ROM drive 1 performs the loading/ejection of the BD-ROM, and performs accesses to the BD-ROM.

The track buffer 2 is a FIFO memory in which the access units read from the BD-ROM are stored by the First-In-First-Out method.

The demultiplexer 3 obtains a plurality of video frames and a plurality of audio frames constituting GOPs by demultiplexing the transport streams stored in the BD-ROM loaded in the BD-ROM drive 1 or stored in the local storage 24, and outputs the video frames to the video decoder 4 and outputs the audio frames to the audio decoder 6. The demultiplexer 3 stores the graphics streams into the image memory 7. The demultiplexing by the demultiplexer 3 includes a conversion process of converting the TS packets into PES packets.

The demultiplexer 3 outputs both the left-eye and right-eye video frames to the video decoder 4.

The video decoder 4 decodes the video frames output from the demultiplexer 3 to obtain non-compressed left-eye and right-eye pictures, and writes the non-compressed pictures onto the video plane 5. Also, the video decoder can reduce the size of the video in accordance with an instruction from an application.

The video plane 5 is a memory for storing the non-compressed left-eye and right-eye pictures.

The audio decoder 6 decodes the audio frames output from the demultiplexer 3 to obtain and output non-compressed audio data.

The image memory 7 is a buffer for storing the graphics stream read out from the demultiplexer 3.

The graphics decoder 8 decodes the graphics stream stored in the image memory 7, and writes the decoded graphics stream onto the graphics plane 9.

The rendering engine 22 renders the graphics in accordance with a graphics rendering instruction from the BD-J module 15, and stores the data into the interactive graphics plane 34 or the background plane 33.

The background plane 33 is a memory area for storing data. The data stored in the background plane 33 is displayed when the video is not played back, or when the video decoded by the video decoder 4 is reduced.

The interactive graphics plane 34 is a memory area for storing data.

The adder 10 overlays the images in the order of the background plane 33, video plane 5, graphics plane 9, and interactive graphics plane 34, and outputs the overlaid image to outside.

The static scenario memory 11 is a memory for storing a current PL and a current stream management information. The current PL is a current execution-target PL among a plurality of PLs recorded on the BD-ROM or the local storage 24. The current stream management information is current execution-target stream management information among a plurality of pieces of stream management information recorded on the BD-ROM or the local storage 24.

The dynamic scenario memory 12 is a memory for storing a current dynamic scenario which is to be supplied to the processes performed by the HDMV module 14 and the BD-J module. The current dynamic scenario is a current execution-target scenario among a plurality of scenarios recorded on the BD-ROM or the local storage 24.

The control unit 13 is a microcomputer system composed of ROM, RAM, and CPU. A program for controlling the playback device is recorded on the ROM. When the program is read out from the ROM into the CPU and operates in cooperation with the hardware resources, the functions of the HDMV module 14, BD-J module 15, mode management module 16, dispatcher 17, AV playback library 18, and application data associating module 19 are realized.

The HDMV module 14 is a DVD virtual player that is the main performer of the HDMV mode, and executes the current scenario program having been read into the dynamic scenario memory 12.

The BD-J module 15 is a Java™ platform that is composed of a Java™ virtual machine, a configuration, and a profile. The BD-J module 15 generates a current Java™ object from a Java™ class file having been read into the dynamic scenario memory 12, and executes the generated current Java™ object. The Java™ virtual machine converts the Java™ object, which has been written in a Java™ language, into the native code of the CPU in the playback device, and causes the CPU to execute the native code.

The mode management module 16 holds the mode management table included in "Index.BDMV" read out from the BD-ROM or the local storage 24, and controls the branch of the title. The mode management module 16 assigns a module to the dynamic scenario. More specifically, the mode management module 16 causes either the HDMV module 14 or the BD-J module 15 to execute the dynamic scenario. Also, when it causes the BD-J module 15 to execute the dynamic scenario, the mode management module 16 calls a BD-J object of the target title from the disc, and then instructs the overlay mode of the adder based on the BD-J object information, instructs the BD-J module to start the application, or instructs to start playing back the playlist.

The dispatcher 17 selects, from a plurality of UOs, UOs that are suitable for the current mode of the playback device, and passes the selected UOs to the module that executes the mode. For example, upon receiving UOs such as upward, downward, leftward, or rightward and "activate" during the execution of the HDMV mode, the dispatcher 17 outputs these UOs to the module that executes the HDMV mode.

The AV playback library 18 executes an AV playback function or a playlist playback function in accordance with a function call from the HDMV module 14 or the BD-J module 15. The AV playback functions are a group of traditional functions succeeded from CD and DVD players, including: Play, Stop, Pause On, Pause Off, Still Off, Forward Play (with specification of the playback speed by an immediate value), Backward Play (with specification of the playback speed by an immediate value), Audio Change, Subpicture Change, and Angle Change. The playlist playback function is to perform, among such AV playback functions, Play or Stop in accordance with the playlist information.

The application data associating module 19 generates application association information based on the information recorded on the BD-ROM disc, calculation results in the device, and attribute information set by the application, by reading information relating to the application from the local storage 24, and updates the application association information.

The network interface 23 is used to download BD-ROM additional contents that have been published on the Internet. The BD-ROM additional contents are contents to be added to the original contents, such as sub-audio, subtitles, bonus images, and applications to be added. It is possible to control the network interface 23 from the BD-J module 15 so that an additional content published on the Internet can be downloaded onto the local storage 24.

The local storage 24 is a magnetic recording device such a hard disk embedded in the playback device. The removable medium 27 is a storage medium that is inserted through an external slot, and representatives thereof are flash and magnetic.

Figure 19:
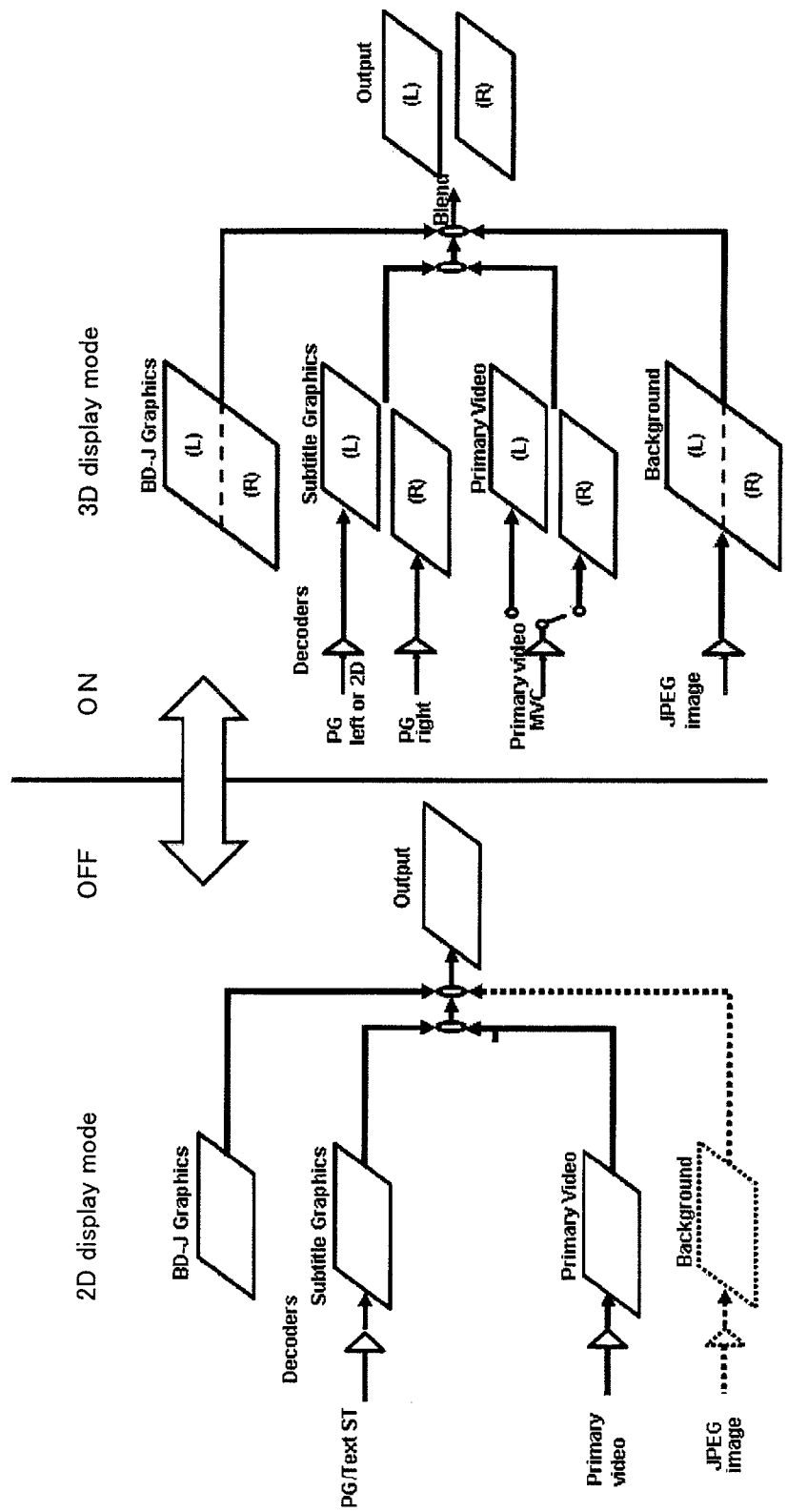
FIG. 19 shows the difference between the 2D and 3D display modes performed by the playback device.

FIG. 19 shows the difference between the 2D and 3D display modes performed by the playback device 200.

On the left-hand side of FIG. 19, an output model for the 2D display mode is shown. As shown in FIG. 19, displays for the left and right eyes are the same in the 2D display mode.

On the right-hand side of FIG. 19, an output model for the 3D display mode is shown. As shown in FIG. 19, respective different displays are provided to the left and right eyes in the 3D display mode so that they generate a parallax between the eyes, which creates a 3D effect that the object in the screen appears to be in front of the screen.

The adder 10 performs the 2D overlay or the 3D overlay to realize a necessary display mode. When the adder 10 performs the 2D overlay, the output is the 2D display mode. When the adder 10 performs the 3D overlay, the output is the 3D display mode. When switching between the 2D display mode and the 3D display mode occurs, a re-authentication is performed by a protocol (HDCP) used for the copyright protection of HDMI, and the screen continues to be black for several seconds.

When the adder 10 performs the 3D overlay, the overlay method changes depending on the stereo mode of the interactive graphics plane, video plane, or background plane.

Figure 20:
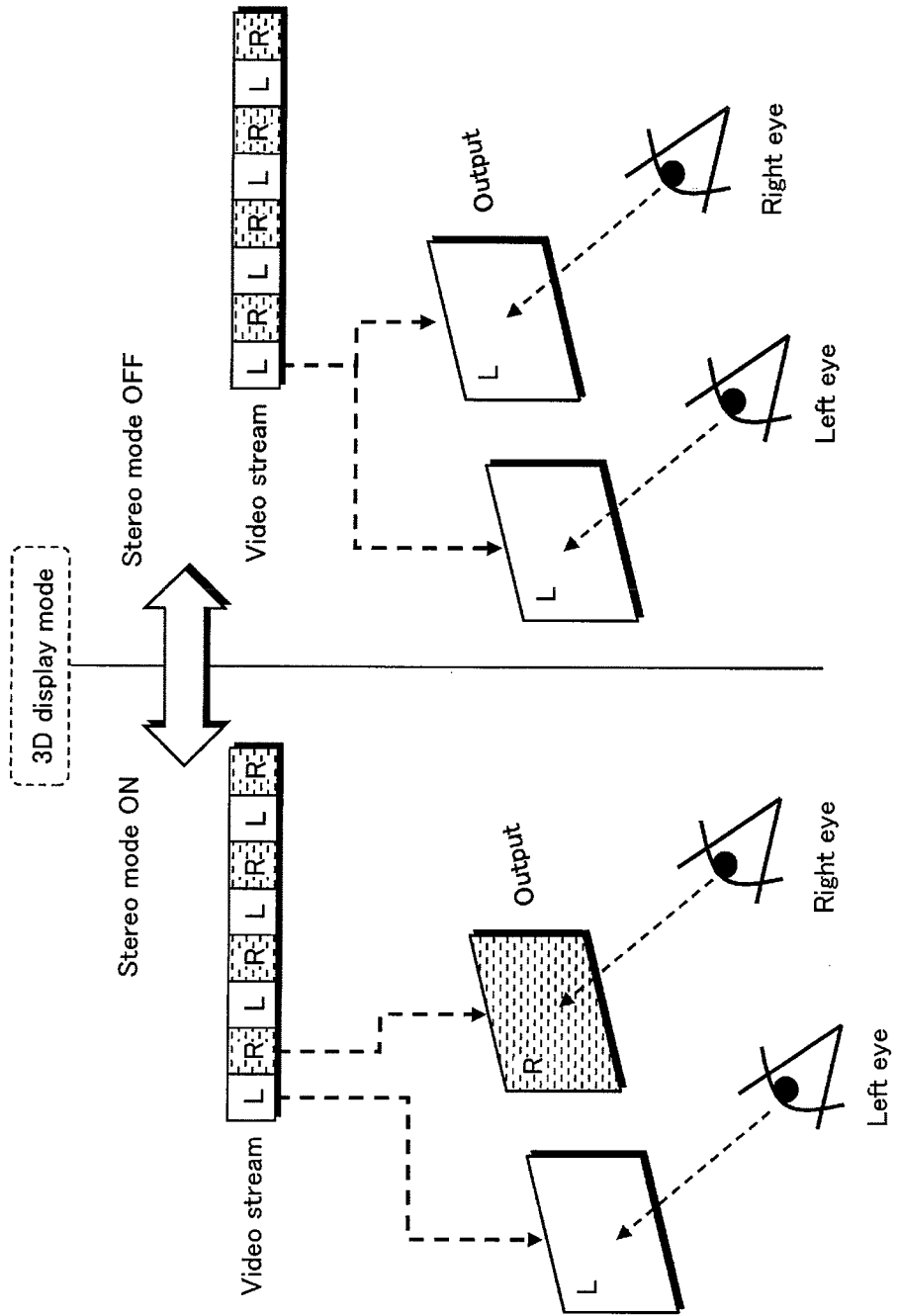
FIG. 20 shows the difference between the cases where the stereo mode of the video plane is ON and OFF.

FIG. 20 shows the difference between the cases where the stereo mode of the video plane is ON and OFF. In FIG. 20, the two images with the label "output" are images that are output by the HDMI after the overlay performed by the adder 10. When the stereo mode is ON, the left and right eyes view different images, and when the stereo mode is OFF, the left and right eyes view images for which only the data for the left eye in the video stream is used. As a result, the video appears to be flat when the stereo mode is OFF.

Figure 21:
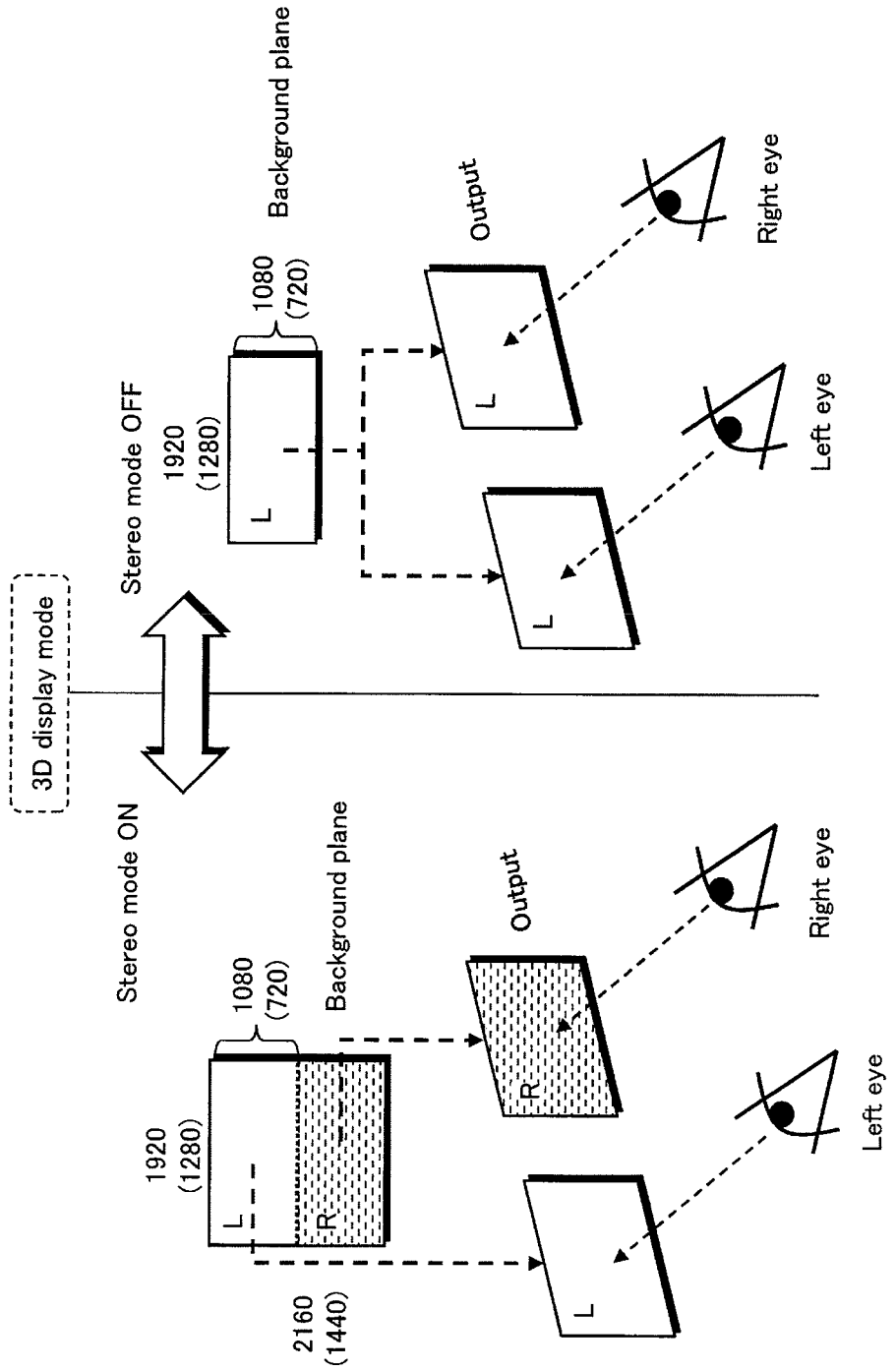
FIG. 21 shows the difference between the cases where the stereo mode of the background plane is ON and OFF.

Similarly, FIG. 21 shows the difference between the cases where the stereo mode of the background plane is ON and OFF. The background plane rendered by the rendering engine 22 stores data for the left eye and right eye. When the stereo mode is ON, the upper portion of the background plane is displayed for the left eye, and the lower portion of the background plane is displayed for the right eye. When the stereo mode is OFF, the upper portion of the background plane is displayed for both the left eye and right eye. As a result, the background appears to be flat.

Figure 22:
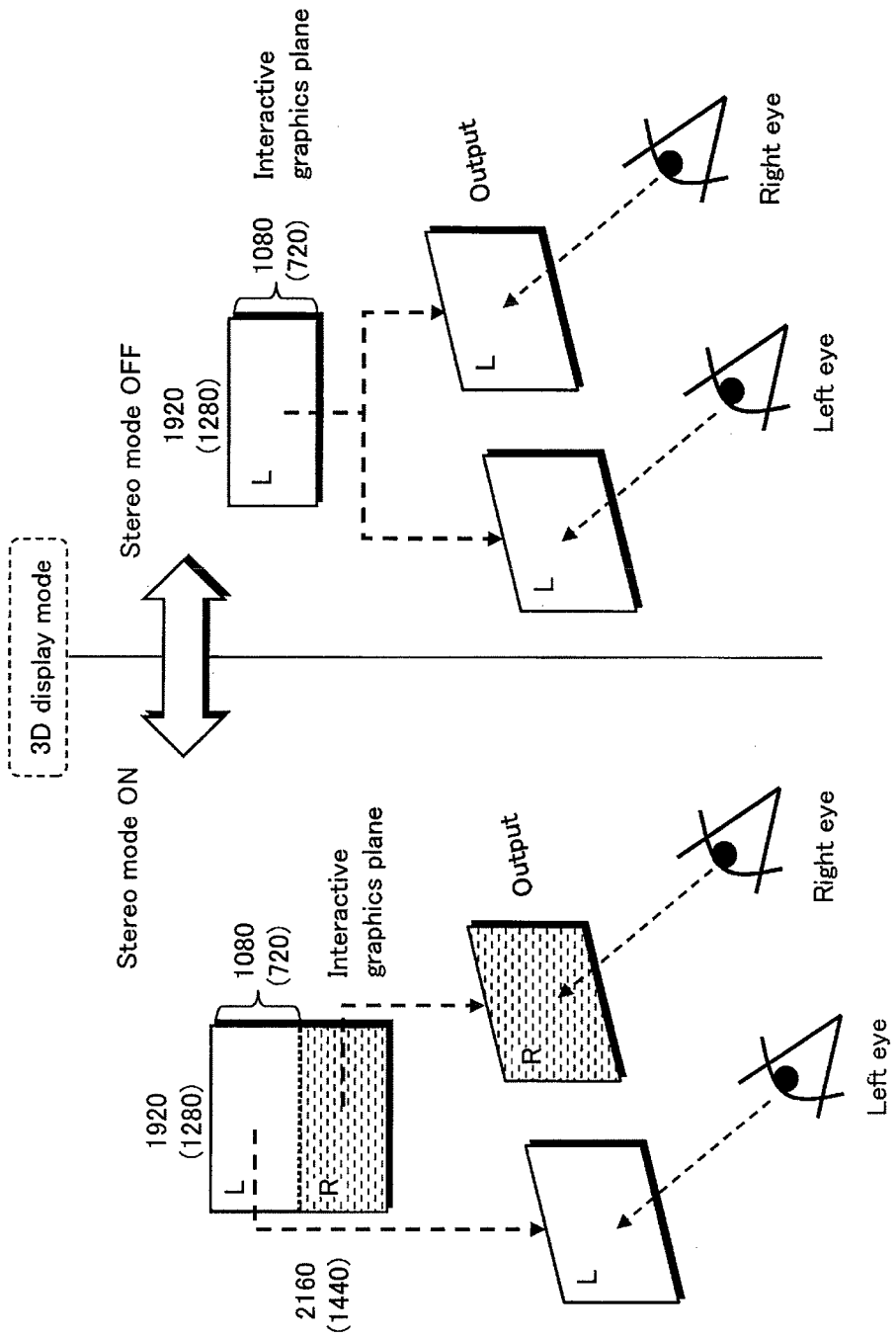
FIG. 22 shows the difference between the cases where the stereo mode of the interactive graphics plane is ON and OFF.

Similarly, FIG. 22 shows the difference between the cases where the stereo mode of the interactive graphics plane is ON and OFF.

Figure 23:
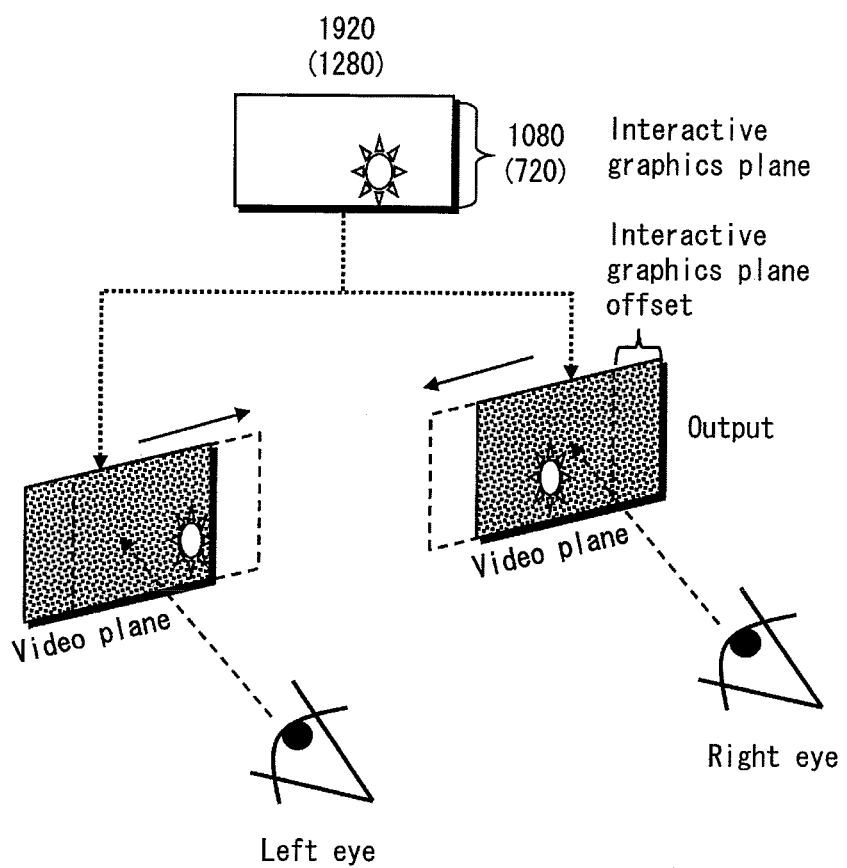
FIG. 23 shows how the viewing is produced by using the offset.

When the stereo mode is OFF, the interactive graphics plane can produce a pseudo pop-up image by using the offset. FIG. 23 shows how the viewing is produced by using the offset. As shown in FIG. 23, the interactive graphics plane is shifted rightward in the overlay for the left eye and shifted leftward in the overlay for the right eye, so that the image of the interactive graphics plane appears to pop up from the screen.

Figure 24:
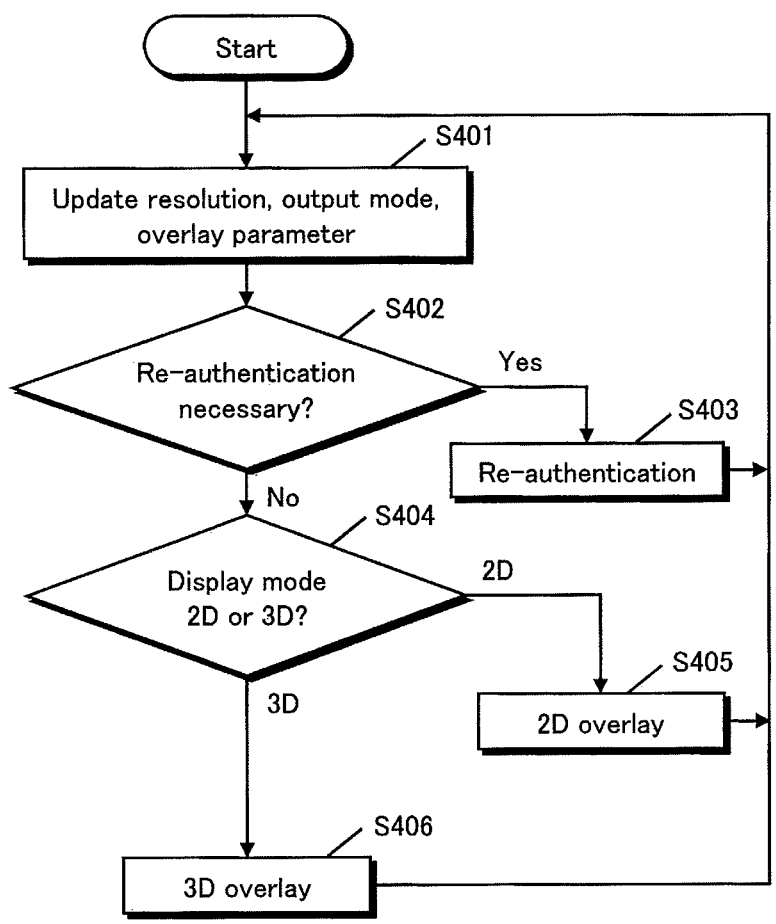
FIG. 24 is a flowchart showing the overlay process performed by the adder.

The following describes the overlay process performed by the adder 10 with reference to the flowchart shown in FIG. 24.

Figure 29:
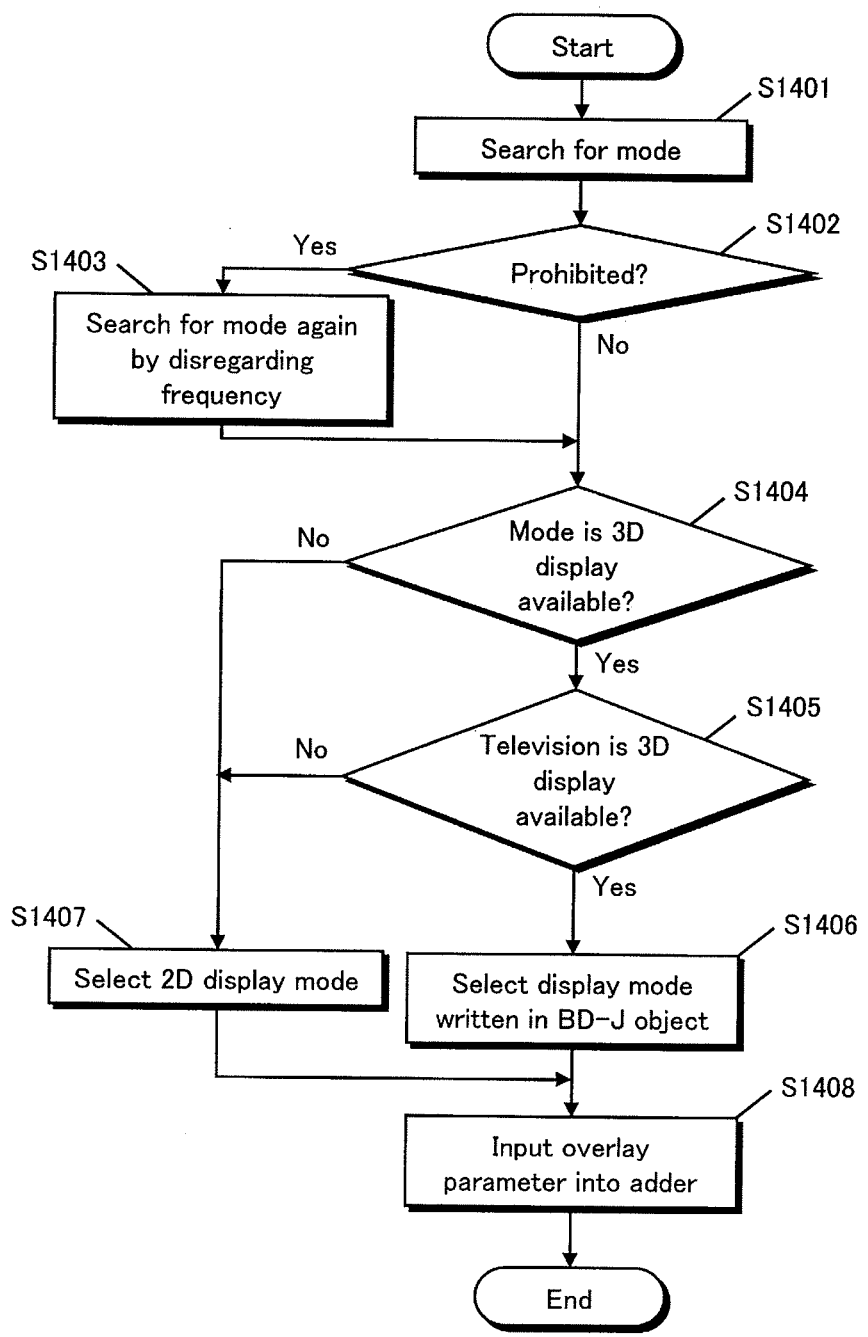
FIG. 29 is a flowchart showing the process of selecting a mode for performing the overlay when there is no playlist that is to be automatically played back.
Figure 31:
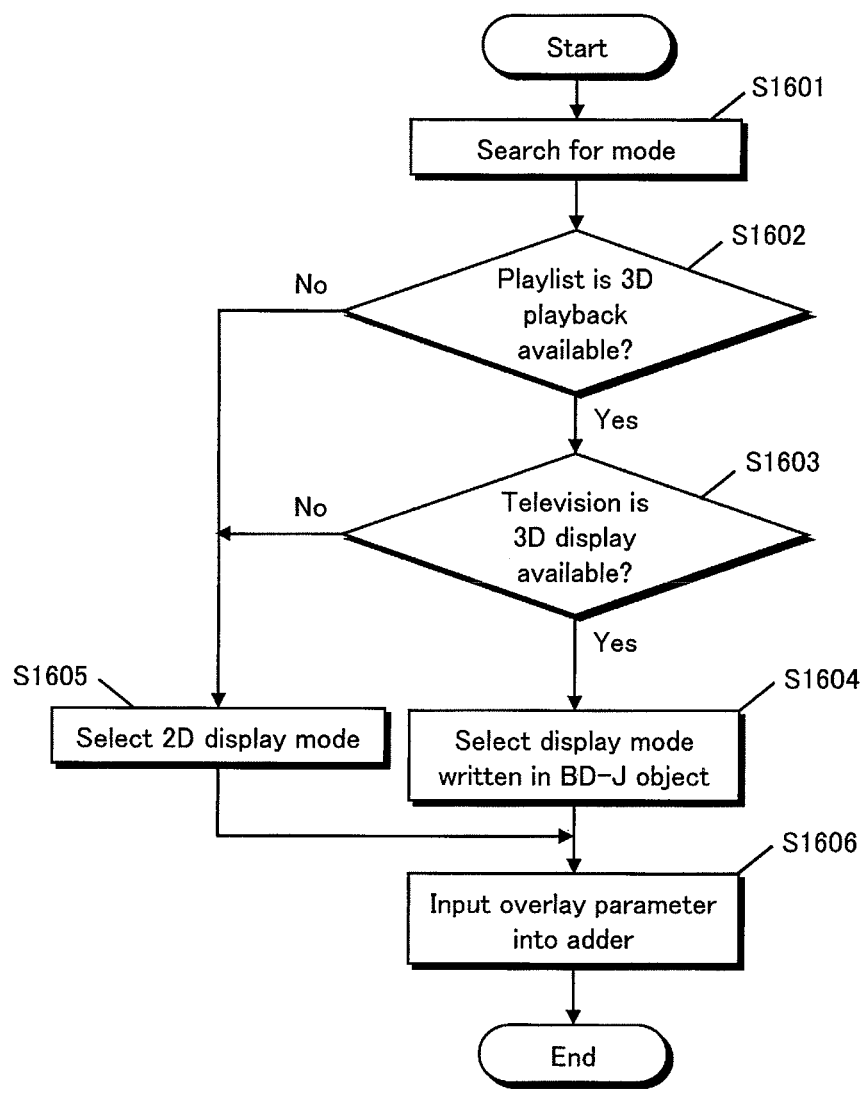
FIG. 31 is a flowchart showing the process of selecting a mode for performing the overlay when there is a playlist that is to be automatically played back.

First, the adder 10 updates the overlay parameters such as the "resolution of overlay" and "display mode" (S401). The overlay parameters are input by the mode management module 16 as shown in the flowcharts of FIGS. 29 and 31, which will be explained later, and may be input by applications as well. The input data is updated at this timing in the adder 10.

Next, it is judged whether or not a re-authentication by the mutual authentication protocol HDCP, which is used in the HDMI connection, is necessary (S402). The re-authentication is necessary when the "resolution of overlay" and "display mode" have changed from previous ones.

The actual re-authentication is performed when the re-authentication is necessary (S403). In general, it takes several seconds for the re-authentication to be performed, and during the re-authentication, the overlay and output are not performed, and the screen of a commercial television is in the state of mute (black screen). After the re-authentication, the process shown in FIG. 19 is executed again.

Next, either 2D overlay or 3D overlay is selected based on the "display mode" (S404).

When it is in the 2D display mode, the 2D overlay is performed (S405). After the overlay, the process shown in FIG. 19 is executed again.

When it is in the 3D display mode, the 3D overlay is performed (S404). After the overlay, the process shown in FIG. 19 is executed again.

As described above, it is possible to perform a continuous image output by repeating the process shown in FIG. 19. Also, when the re-authentication becomes necessary, the re-authentication is started immediately.

Figure 25:
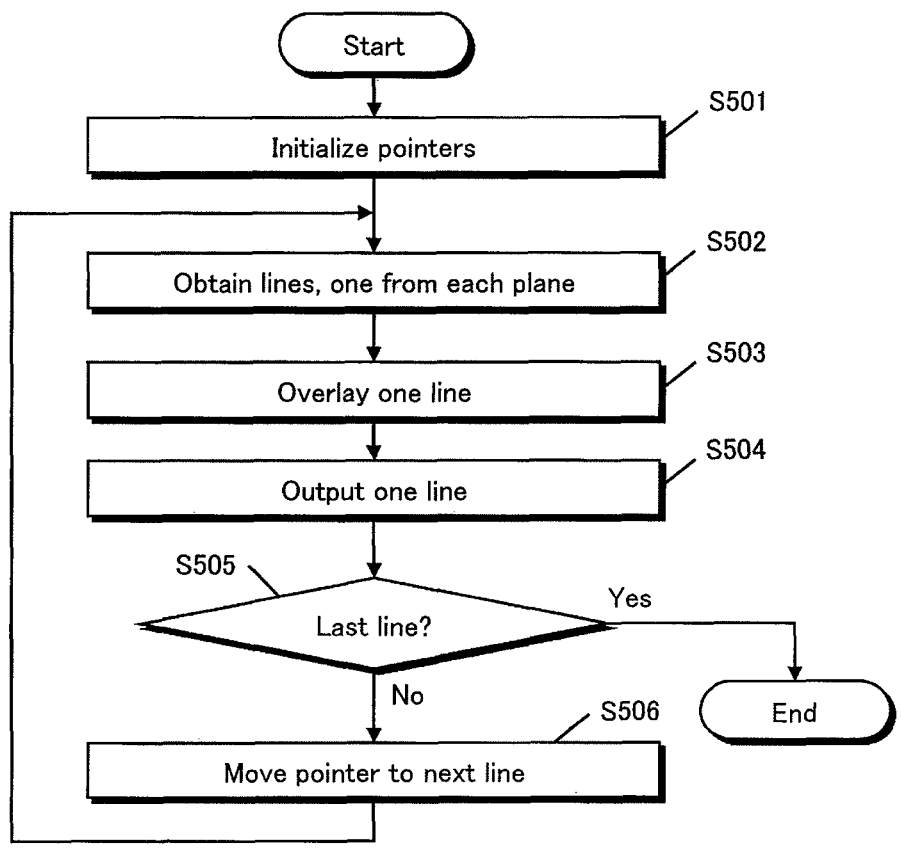
FIG. 25 is a flowchart showing the 2D overlay process performed by the adder.

The following describes the 2D overlay process performed by the adder 10 with reference to the flowchart shown in FIG. 25.

First, the internal pointer indicating four planes used in the 2D overlay is initialized as the start of the planes (S501).

Next, lines of data, one from each plane, indicated by the internal pointer are obtained (S502).

A calculation is performed on the obtained lines of data (S503). This is what is called the Porter-Duff alpha blending process.

The lines of data, one for each plane, after the alpha blending is output from the HDMI (S504).

When the line being processed is the last line, the process ends (S505). The number of lines to be processed depends on the "resolution of overlay". For example, when the overlay is performed with the resolution of 1920×1080, 1080 lines need to be overlaid.

When it is judged that the line being processed is not the last line, the internal pointer indicating the four planes is moved to the next line (S506). After this, the process is continued from S502.

Figure 26:
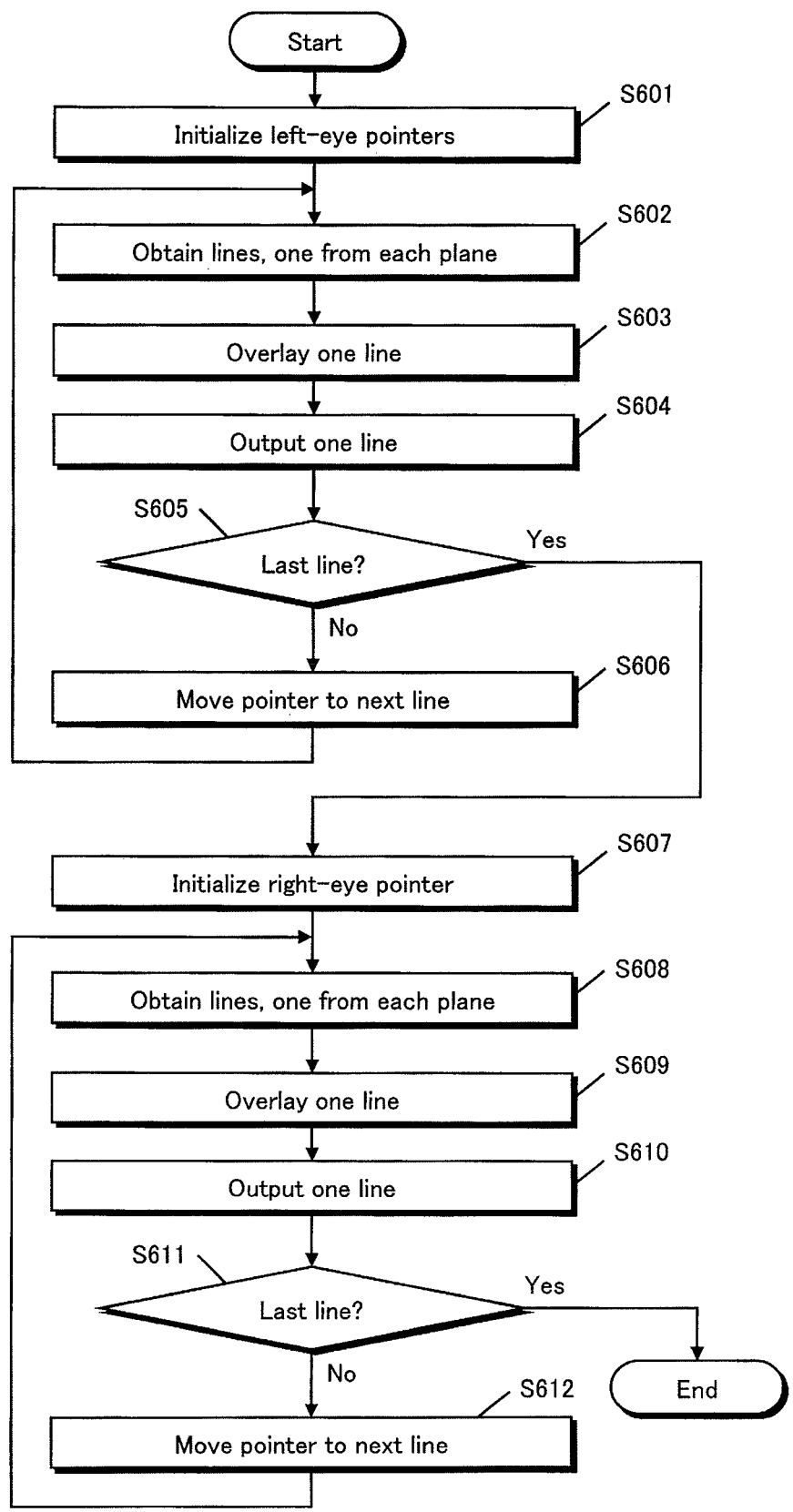
FIG. 26 is a flowchart showing the 3D overlay process performed by the adder.

The following describes the 3D overlay process performed by the adder 10 with reference to the flowchart shown in FIG. 26.

First, the internal pointer indicating four planes used in the overlay for the left eye is initialized as the start of the planes (S601). Here, when the overlay parameter "interactive graphics plane overlay mode" indicates the stereo mode OFF, the internal pointer of the interactive graphics plane is shifted by the number of pixels indicated by the value of "interactive graphics plane overlay offset".

Next, lines of data, one from each plane, indicated by the internal pointer are obtained (S602).

A calculation is performed on the obtained lines of data (S603). This is what is called the Porter-Duff alpha blending process.

The lines of data, one for each plane, after the alpha blending is output from the HDMI (S604).

When the line being processed is the last line (S605), the process proceeds to the process for the right eye (S607). The number of lines to be processed depends on the "resolution of overlay". For example, when the overlay is performed with the resolution of 1920×1080, 1080 lines need to be overlaid.

When it is judged that the line being processed is not the last line, the internal pointer indicating the four planes is moved to the next line (S606). After this, the process is continued from S602.

After the process for the left eye is completed, the process for the right eye is performed. First, the internal pointer indicating four planes used in the overlay for the right eye is initialized as the start of the planes (S607). Here, the internal pointer is initialized to point to the planes for the right eye when the plane overlay mode is stereo mode ON, and to point to the planes for the left eye when the plane overlay mode is stereo mode OFF.

Also, as is the case with S601, the process for the left eye, when the overlay parameter "interactive graphics plane overlay mode" indicates the stereo mode OFF, the internal pointer of the interactive graphics plane is shifted by the number of pixels indicated by the value of "interactive graphics plane overlay offset".

Next, lines of data, one from each plane, indicated by the internal pointer are obtained (S608).

A calculation is performed on the obtained lines of data (S609). This is what is called the Porter-Duff alpha blending process.

The lines of data, one for each plane, after the alpha blending is output from the HDMI (S610).

When the line being processed is the last line (S611), the process ends.

The number of lines to be processed depends on the "resolution of overlay". For example, when the overlay is performed with the resolution of 1920×1080, 1080 lines need to be overlaid.

When it is judged that the line being processed is not the last line, the internal pointer indicating the four planes is moved to the next line (S612). After this, the process is continued from S608.

FIG. 27 shows overlay parameters required for the overlay performed by the adder 10 and available values for the overlay parameters. There are three sets of available values for the "overlay resolution". The first set of values is: horizontal 1920 pixels, vertical 1080 pixels, and frequency of 23.976 Hz for the progressive mode. The second set of values is: horizontal 1280 pixels, vertical 720 pixels, and frequency of 59.94 Hz for the progressive mode. The third set of values is: horizontal 720 pixels, vertical 480 pixels, and frequency of 59.94 Hz for the interlace mode.

As the "display mode", the 3D display mode or the 2D display mode is available.

The "interactive graphics plane overlay mode", "background plane overlay mode", and "video plane overlay mode" are valid only in the 3D display mode, and are each in the state of "stereo mode ON" or "stereo mode OFF".

The "interactive graphics plane overlay offset" can be used only in the 3D display mode and when the "interactive graphics plane overlay mode" is in the state of "stereo mode OFF", and the offset value is a positive or negative integer that indicates the number of pixels to be offset.

FIG. 28 is provided for a detailed explanation of the "overlay information" in the BD-J object recorded on the medium in the present embodiment. The "overlay information" indicates the state of the adder 10 that needs to be set when a title is started.

The overlay resolution indicates the resolution used in the overlay performed by the adder 10.

The overlay frequency indicates the frequency used in the overlay performed by the adder 10.

The display mode indicates whether the output is the 2D display mode or the 3D display mode. The previous state may be maintained as well.

Each of the "interactive graphics plane overlay mode", "background plane overlay mode", and "video plane overlay mode" indicates whether the overlay is performed in the state of "stereo mode ON" or "stereo mode OFF". The previous state may be maintained as well.

The "interactive graphics plane overlay offset" is an integer as an offset. When it is "0", it means that the previous state is maintained, and when it is a value in the range from "1" to "127", "64" is subtracted from the value to derive the actual offset.

In this example, when the information other than the "overlay resolution" is set to "0", it means that the previous state is maintained. Here, the advantageous effects produced by this arrangement will be described. The "overlay information" exists in the BD-J object recorded on the medium dedicated to the 2D playback that is used before the present embodiment, and the information of the overlay resolution has already been written therein. However, the information does not exist after the overlay resolution is defined as shown in FIG. 28, but the "reserve" area exists for the purpose of padding. Value "zero" is written certainly in the reserve area on the older BD-ROM discs, and older playback devices certainly disregard the reserve area.

That is to say, the BD-J object on the older BD-ROM discs that are not in conformance with the definition shown in FIG. 28 certainly has values "zero" in the items other than the overlay resolution, thereby preventing the playback device 200 from malfunctioning. Conversely, if the BD-J object on the newer BD-ROM discs that are in conformance with the definition shown in FIG. 28 has a value concerning the 3D playback, older playback devices do not malfunction.

In this way, in any combinations, any playback device, old or new, can play back any BD-ROM disc.

The following describes in detail the process in which, when the playback device 200 starts a title, the adder 10 selects a mode for performing the overlay when the "reference values for playlist information" indicates that there is no playlist that is to be automatically played back, with reference to the flowchart shown in FIG. 29.

First, the "overlay resolution" and "overlay frequency" in the overlay information are searched for a mode (S1401).

It is judged whether or not the selected mode is prohibited (S1402).

When it is judged that the selected mode is prohibited, the "overlay resolution" in the overlay information is searched for a mode again by disregarding the "overlay frequency" so that a not-prohibited overlay mode can be used (S1403). In general, prohibited modes are not used. This step is a fail safe, and is necessary for the playback to be continued without being stopped even if there is a problem in the BD-ROM.

Next, it is judged whether or not the 3D display mode is to be used (S1404). According to the list shown in FIG. 30, the 3D display mode is not available in the mode 9.

When the 3D display mode is available, it is judged whether or not the television is 3D display available (S1405). The information of the television has been notified from the television to the playback device via the HDMI cable, and thus the playback device 200 holds the information that indicates whether or not the television is 3D display available.

When the television is 3D display available, the display mode written in the BD-J object is selected (S1406). The display mode written in the BD-J object may be any of "2D display mode", "3D display mode", and "the previous state is maintained". When it is "the previous state is maintained", the previous display mode is obtained from the adder 10 and the obtained mode is used.

When the mode is not 3D display available, or when the television is not 3D display available, the information written on the BD-J object is disregarded, and the 2D display mode is forcibly selected (S1407).

The selected overlay parameter is input to the adder 10 (S1408). Based on the overlay parameter, the process shown in the flowchart of FIG. 24 is performed, and the re-authentication is performed only once depending on the necessity.

After the process shown in the flowchart of FIG. 29 is performed, the mode management module 16 starts an application based on the application information included in the BD-J object.

As described above, an overlay parameter including the frequency and display mode is selected when a title is started. This makes it possible to perform the re-authentication only once. Also, the re-authentication can be performed before an application is started or in parallel with it. This reduces the time required for an image output to be started.

FIG. 30 shows a list of overlay modes supported by the playback device 200. For each combination of an overlay resolution and an overlay frequency, any of three cases are possible: (1) any display is prohibited; (2) only 2D display is available; and (3) both 2D and 3D displays are available.

The following describes in detail the process in which, when the playback device 200 starts a title, the adder 10 selects a mode for performing the overlay when the "reference values for playlist information" indicates that there is a playlist that is to be automatically played back, with reference to the flowchart shown in FIG. 31.

First, the resolution and frequency of the video used in the playlist to be automatically played back are searched for a mode (S1601). When a prohibited mode is specified, it indicates an abnormal state and the disc is not authentic. The playback may be stopped at this point in time.

Next, it is judged whether or not the playlist is 3D display available (S1602). The playlist may be supported for only the 2D playback, or for both the 2D and 3D playbacks. When the playlist is supported for only the 2D playback, the 2D display mode is forcibly selected (S1605).

When the playlist is 3D display available, it is judged whether or not the television is 3D display available (S1603). The information of the television has been notified from the television to the playback device via the HDMI cable, and thus the playback device 200 holds the information that indicates whether or not the television is 3D display available.

When the television is 3D display available, the display mode written in the BD-J object is selected (S1604). The display mode written in the BD-J object may be any of "2D display mode", "3D display mode", and "the previous state is maintained". When it is "the previous state is maintained", the previous display mode is obtained from the adder 10 and the obtained mode is used.

When the playlist is not 3D display available, or when the television is not 3D display available, the information written on the BD-J object is disregarded, and the 2D display mode is forcibly selected (S1605).

The selected overlay parameter is input to the adder 10 (S1608). Based on the overlay parameter, the process shown in the flowchart of FIG. 24 is performed, and the re-authentication is performed only once depending on the necessity.

After the process shown in the flowchart of FIG. 31 is performed, the mode management module 16 starts the playlist that is to be automatically started, and starts an application based on the application information included in the BD-J object.

Figure 32:
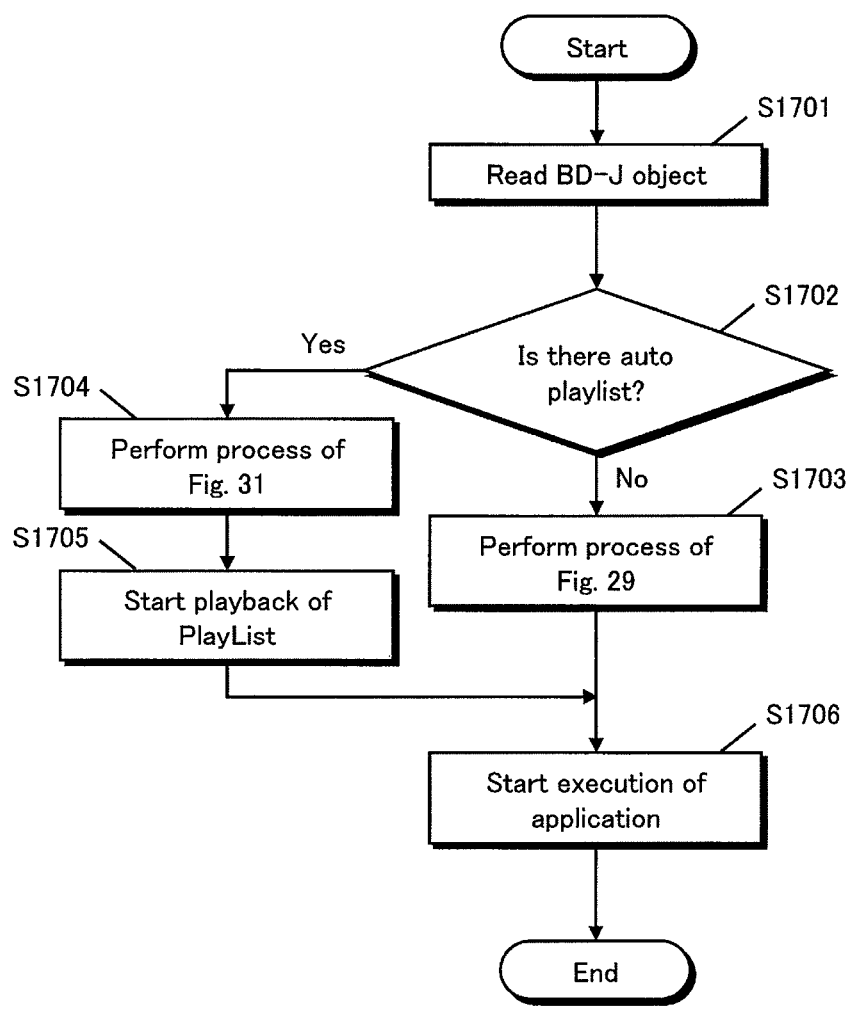
FIG. 32 is a flowchart showing the process performed by the mode management module when a title is started.

The following describes in detail the process performed by the mode management module when a title is started, with reference to the flowchart shown in FIG. 32.

First, the BD-J object, in which information regarding the target title is written, is read (S1701).

It is judged whether or not there is, in the BD-J object, a playlist that is to be automatically played back (S1702).

When there is no playlist to be played back, the process of FIG. 29 is performed (S1703).

When there is a playlist to be played back, the process of FIG. 31 is performed (S1704).

After this, the playlist to be played back starts to be played back (S1705).

Finally, the application written in the BD-J object starts to be executed (S1706). The application can change the overlay parameters after it is started.

In the processes shown in FIGS. 32, 31, and 29, especially steps S1604 and S1406 are important. Without these steps, the playback device cannot determine the display mode appropriately.

If an inappropriate display mode, namely a display mode that is not intended by the BD-ROM authoring, is selected, it becomes impossible to perform the authoring so that a playlist to be actually played back exists. In that case, there is no other choice but to explicitly switch to an appropriate display mode after an application is executed, and then play back the playlist. This causes a time lag of several tens of seconds before the image is output. This means that the information the user desires to see is not displayed on the screen for several tens of seconds. This would make the user uneasy.

Even without the steps S1604 and S1406, if the BD-ROM authoring is performed so that a playlist to be automatically played back exists, it is necessary to explicitly switch the display mode by an application after the application is executed. In that case, since the display mode is switched after the playlist is started, the start of the played-back video is displayed in an unintended state, and due to switching between display modes during the playback, the screen flashes.

As described above, by using the information included in the BD-J object, it is possible to solve many problems with respect to viewing. By setting the "display mode" in the overlay information explicitly to 2D or 3D, it is possible to complete the HDMI re-authentication and start a playback before an execution of an application is started. This reduces the time taken before output of an image. Also, by setting the "display mode" in the overlay information to "the previous state is maintained", when a bonus content, which can be played back in the 2D or 3D display mode, is to be played back, it is possible to start the bonus content smoothly without causing a re-authentication to occur.

Furthermore, by setting the "video plane overlay mode" in the overlay information in the BD-J object to "stereo mode ON", it is possible to cause the video to appear stereoscopic when the image is output; and by setting it to "stereo mode OFF", it is possible to prevent an interference from the graphics.

As described above, the introduction of the overlay information into the BD-J object produces advantageous effects that the number of re-authentications can be reduced, and that an uncomfortable feeling toward the video viewing can be removed. Note that the instances described above are mere examples, and there is no limit to the possibility of enhancing the authoring of the BD-ROM disc by using the BD-J object.

(Variations)

Up to now, the present invention has been described through embodiments thereof. However, the present invention is not limited to the above-described embodiments.

The present invention may be a computer program including program code that allows a computer to operate, or may be a digital signal representing the computer program.

Also, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal.

Also, the present invention may be the computer program or the digital signal transmitted via an electric communication line, a wireless or wired communication line, or a network of which the Internet is representative.

Furthermore, by transferring the computer program or the digital signal via the recording medium, or by transferring the computer program or the digital signal via the network or the like, the computer program or the digital signal may be executed by another independent computer system.

The present invention may be implemented as an LSI for controlling the playback device described in the embodiments above. Each of the functional blocks may be realized as one chip, and part of all of the functional blocks may be realized as one chip.

Although the term LSI is used here, it may be called IC, LSI, super LSI, ultra LSI or the like, depending on the level of integration.

Also, the integration method is not limited to the LSI, but may be realized by a dedicated circuit or a general-purpose processor. It is also possible to use the FPGA (Field Programmable Gate Array) with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

In Embodiment 1, a recording medium (for example, a semiconductor memory such as an SD card or a compact flash) is used as a readable/writable recording medium to which preserved data is transferred. However, the characteristics of the present invention do not depend on the physical property of the recording medium, but are applicable to other readable/writable recording mediums. For example, when the data is recorded on an external hard disk drive or the like, the same effects as described above can be produced.

In Embodiment 1, a playback device having a playback function for playing back the BD-ROM is described. However, the present invention is applicable to a playback device having a recording function as well as the playback function.

The present invention may be any combination of the above-described embodiments and modifications.

[Industrial Applicability]

The present invention relates to a technology for causing the playback device 200, which plays back a stereoscopic video stream, to display the stereoscopic video stream overlaid with the subtitle or graphics, and in particular is applicable to a stereoscopic video playback device which outputs stereoscopically not only the stereoscopic video stream but also the subtitle or graphics being overlaid therewith.

REFERENCE SIGNS LIST

100 recording medium
200 playback device
300 operation device
400 display device
500 glasses
600 transmission path

The invention claimed is:

1. A playback apparatus for reading a byte-code application from a recording medium on which an index table, an operation mode object, and the byte-code application are recorded, and performing a playback control in accordance with the byte-code application, comprising:
   a manager that selects a current title from a plurality of titles specified by the index table;
   a display controller that initializes a display rate of a display device by using display rate initialization information, including a display rate applied to playlist information specifying video data, in the operation mode object corresponding to the current title;
   a platform that starts the byte-code application indicated in an application management table in the operation mode object corresponding to the current title;
   a graphics plane that stores graphics data drawn by the byte-code application; and
   a playback controller that plays back the video data specified by the playlist information selected by the byte-code application,
   wherein the graphics data are output to the display device with the initialized display rate during a period from a starting of the byte-code application until a selection of the playlist information by the byte-code application, and
   wherein no video data is played back by the playback controller during the period.

2. A playback method, for use in a playback device, for reading a byte-code application from a recording medium on which an index table, an operation mode object, and the byte-code application are recorded, and performing a playback control in accordance with the byte-code application, the playback method comprising:
   selecting a current title from a plurality of titles specified by the index table;
   initializing a display rate of a display device by using display rate initialization information, including a display rate applied to playlist information specifying video data, in the operation mode object corresponding to the current title;
   starting the byte-code application indicated in an application management table in the operation mode object corresponding to the current title;
   storing graphics data, drawn by the byte-code application, in a graphics plane included in the playback device; and
   playing back the video data specified by the playlist information selected by the byte-code application,
   wherein the graphics data are output to the display device with the initialized display rate during a period from the starting of the byte-code application until a selection of the playlist information by the byte-code application, and
   wherein no video data is played back during the period.

3. A non-transitory computer-readable recording medium storing a program for causing a computer to read a byte-code application from a recording medium on which an index table, an operation mode object, and the byte-code application are recorded, and perform a playback control in accordance with the byte-code application, the program causing the computer to execute:
   selecting a current title from a plurality of titles specified by the index table;
   initializing a display rate of a display device by using display rate initialization information, including a display rate applied to playlist information specifying video data, in the operation mode object corresponding to the current title;
   starting the byte-code application indicated in an application management table in the operation mode object corresponding to the current title;
   storing graphics data, drawn by the byte-code application, in a graphics plane included in the computer; and
   playing back the video data specified by the playlist information selected by the byte-code application,
   wherein the graphics data are output to the display device with the initialized display rate during a period from the starting of the byte-code application until a selection of the playlist information by the byte-code application, and
   wherein no video data is played back during the period.

* * * * *